United States Patent
Ishiguro et al.

(10) Patent No.: US 7,505,599 B2
(45) Date of Patent: Mar. 17, 2009

(54) INFORMATION PROCESSING SYSTEM AND METHOD FOR MANAGING ENCRYPTED DATA WITH TAG INFORMATION

(75) Inventors: Ryuji Ishiguro, Tokyo (JP); Yoshitomo Osawa, Kanagawa (JP); Tateo Oishi, Saitama (JP); Tomoyuki Asano, Kanagawa (JP); Atsushi Mitsuzawa, Tokyo (JP)

(73) Assignee: Sony Corporation (JP)

( * ) Notice: Subject to any disclaimer, the term of this patent is extended or adjusted under 35 U.S.C. 154(b) by 873 days.

(21) Appl. No.: 09/980,952

(22) PCT Filed: Apr. 4, 2001

(86) PCT No.: PCT/JP01/02929
§ 371 (c)(1),
(2), (4) Date: Mar. 18, 2002

(87) PCT Pub. No.: WO01/78299
PCT Pub. Date: Oct. 18, 2001

(65) Prior Publication Data
US 2003/0076958 A1 Apr. 24, 2003

(30) Foreign Application Priority Data
Apr. 6, 2000 (JP) ............................. 2000-105329
Jun. 15, 2000 (JP) ............................. 2000-179692
Oct. 18, 2000 (JP) ............................. 2000-317803

(51) Int. Cl.
*H04L 9/00* (2006.01)
(52) U.S. Cl. ....................................... 380/278; 380/280

(58) Field of Classification Search ................. 380/278, 380/280
See application file for complete search history.

(56) References Cited

U.S. PATENT DOCUMENTS
5,748,736 A 5/1998 Mittra
6,049,878 A 4/2000 Caronni et al.

FOREIGN PATENT DOCUMENTS
JP 10-040255 2/1998

(Continued)

OTHER PUBLICATIONS

JP 11-187013-A Machine-Assisted Translation, Feb. 3, 2006, Thompson, pp. 1-30.*

(Continued)

*Primary Examiner*—Kambiz Zand
*Assistant Examiner*—Jacob Lipman
(74) *Attorney, Agent, or Firm*—Lerner, David, Littenberg, Krumholz & Mentlik, LLP

(57) ABSTRACT

An enabling key block (EKB) used in an encrypted key distributing tree structure is generated by forming a simplified 2-branch or multi-branch type tree with a terminal node or leaf which is capable of decrypting on the basis of a key corresponding to a node or a leaf of the Simplified tree. Further, the EKB includes a tag for indicating a position of an encrypted key in the tree. The tag not only discriminates position but also stores data for judging the presence of encrypted key data within the EKB. As such, a considerable reduction in data quantity is realized, and the decrypting process in a device is also simplified.

24 Claims, 45 Drawing Sheets

FOREIGN PATENT DOCUMENTS

| | | |
|---|---|---|
| JP | 11-187013 A | 7/1999 |
| JP | 2000-031922 | 1/2000 |
| WO | WO-01/03364 A1 | 1/2001 |
| WO | WO-01/03365 A1 | 1/2001 |

OTHER PUBLICATIONS

Waldvogel, M., et al., "The VersaKey Framework: Versatile Group Key Management", IEEE Journal on Selected Areas in Communications, vol. 17, No. 9, pp. 1614 to 1631, Sep. 1999, pp. 1616, right col. to p. 1621, left col.

Wong, C. K. et al., "Secure Group Communications Using Key Graphs" Proceedings of ACM SIGCOMM'98, pp. 68 to 79, Sep. 2, 1998, 3.4 Leaving a tree key graph (http://www.acm.org/sigcomm/sigcomm98/tp/technical.html).

Chang, et al, "Key Management for Secure Internet Multicast Using Boolean Function Minimization Techniques", Proceedings of Inocom'99, vol. 2, p. 689-698 Mar. 24, 1999 II. Key Management Scheme (http://www.ieee-infocom.org/1999/).

Wallner et al., "Key Management for Multicast: Issues and Architectures", Network Working Group.

* cited by examiner

| VERSION : t | |
|---|---|
| INDEX | ENCRYPTED KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG.4A

| VERSION : t | |
|---|---|
| INDEX | ENCRYPTED KEY |
| 000 | Enc(K000, K(t)00) |
| 001 | Enc(K(t)001, K(t)00) |
| 0010 | Enc(K0010, K(t)001) |

FIG.4B

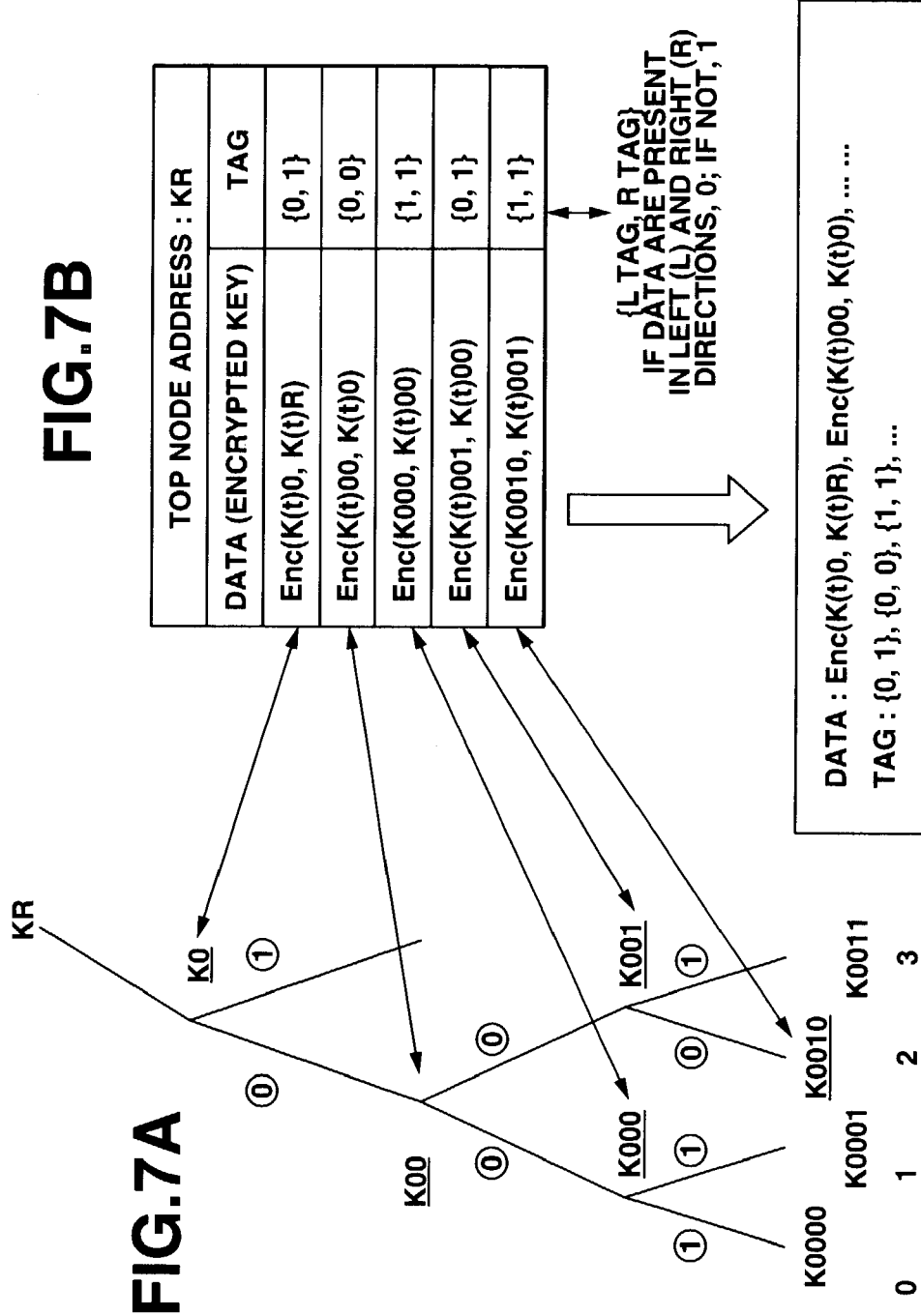

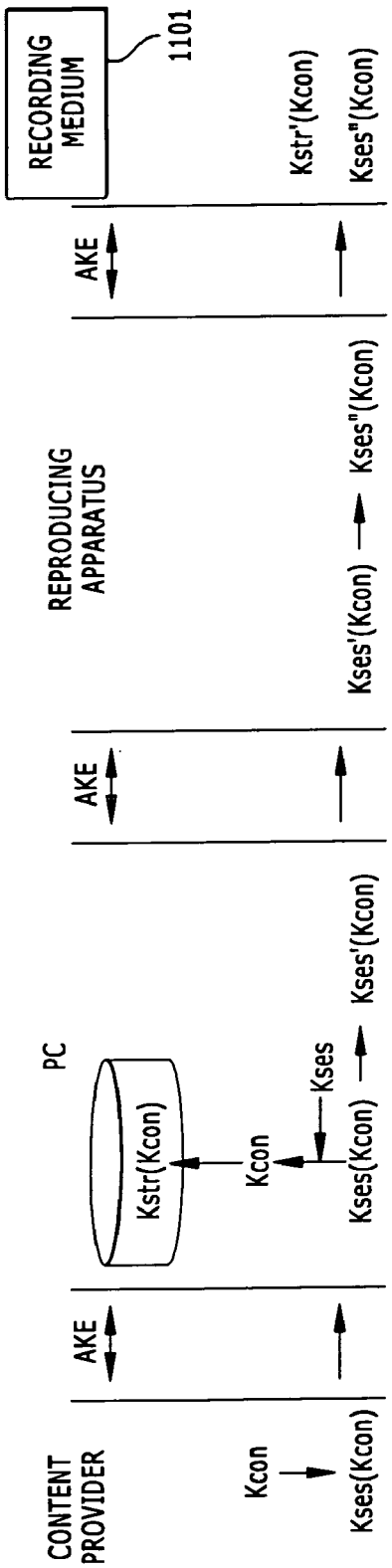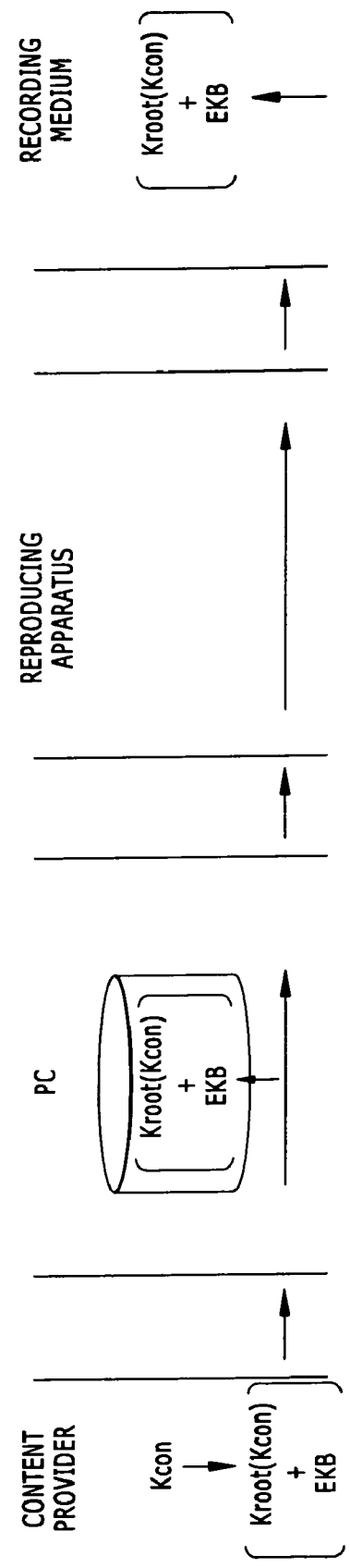
FIG. 11A
FIG. 11B

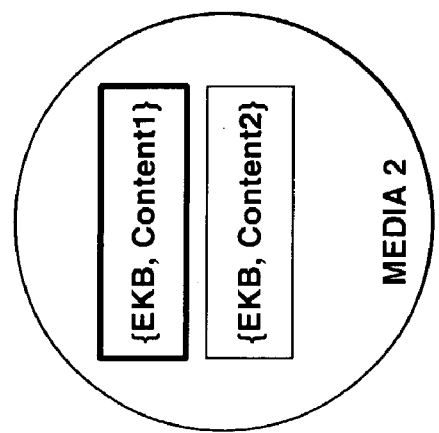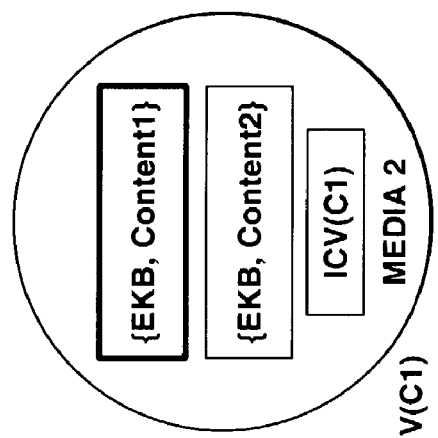
FIG.21A
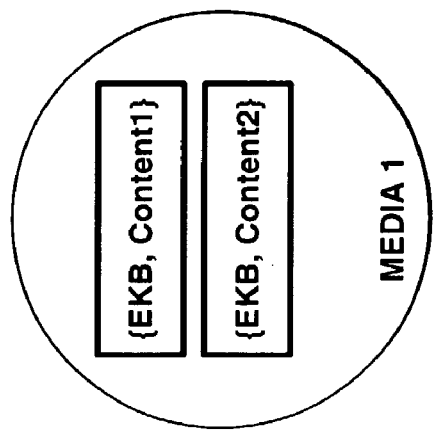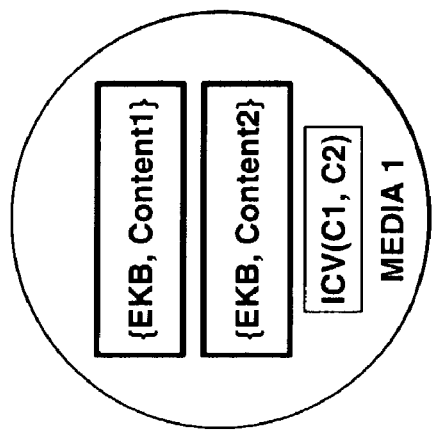
FIG.21B

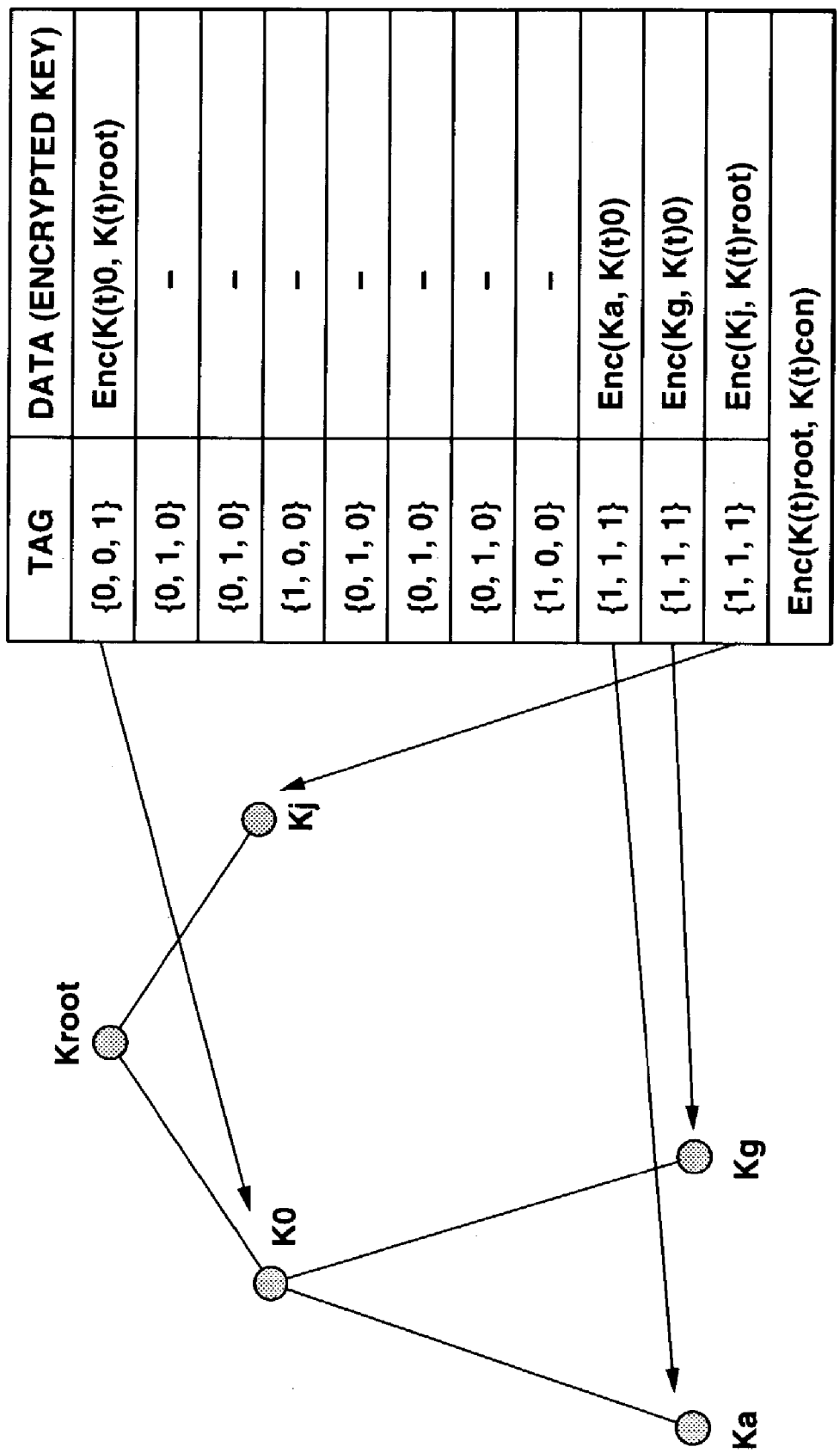

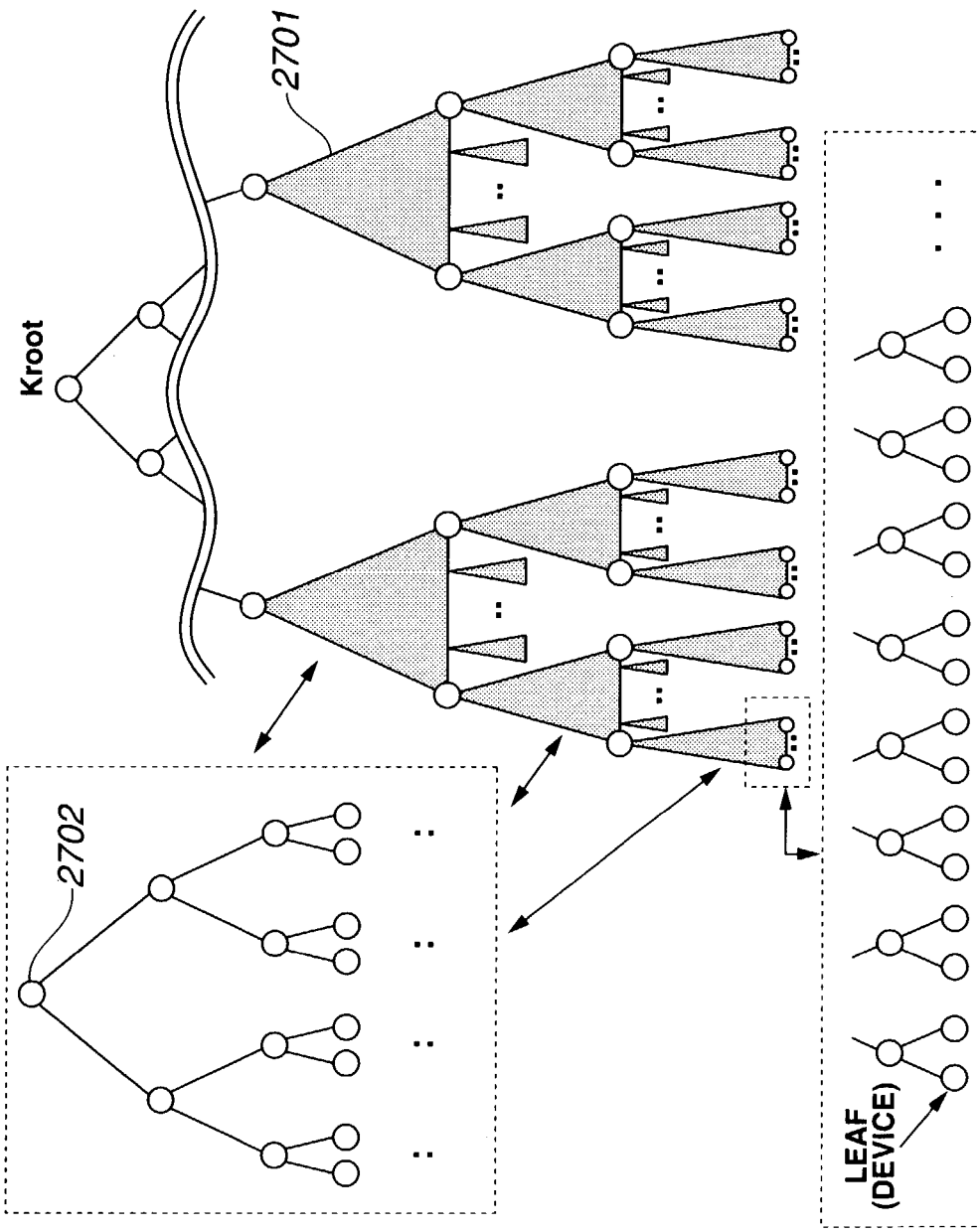

FIG. 35A  FIG. 35B  FIG. 35C  FIG. 35D

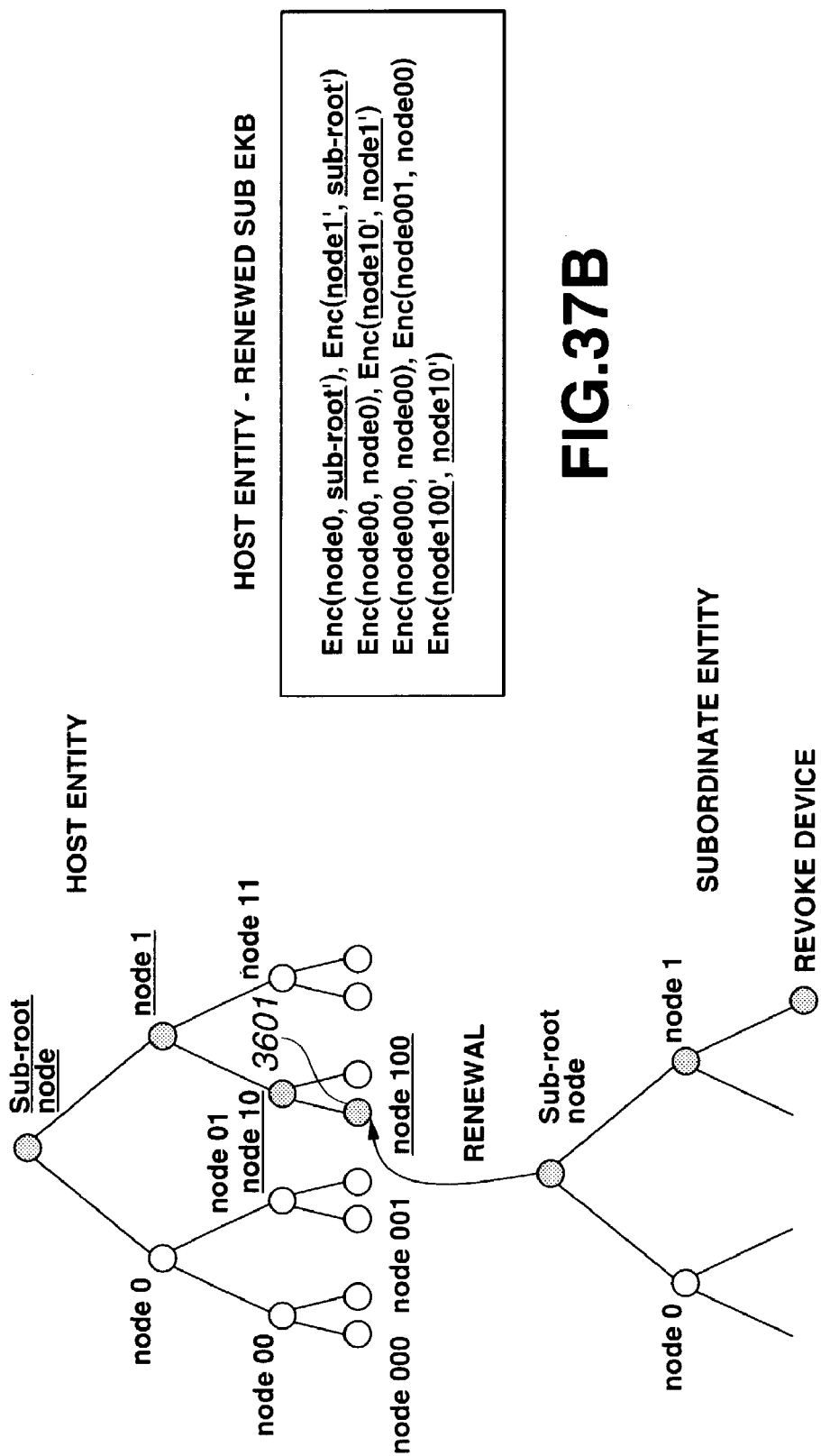

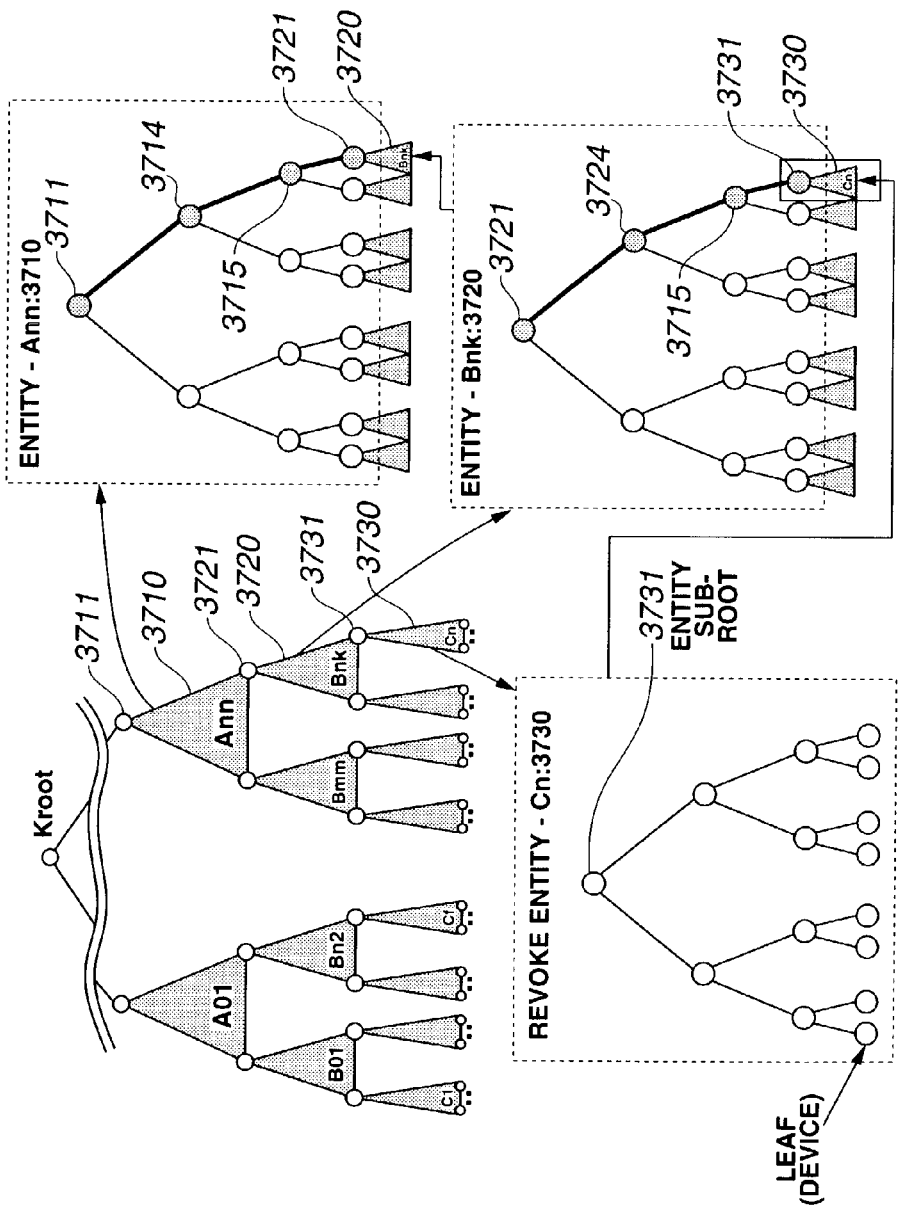
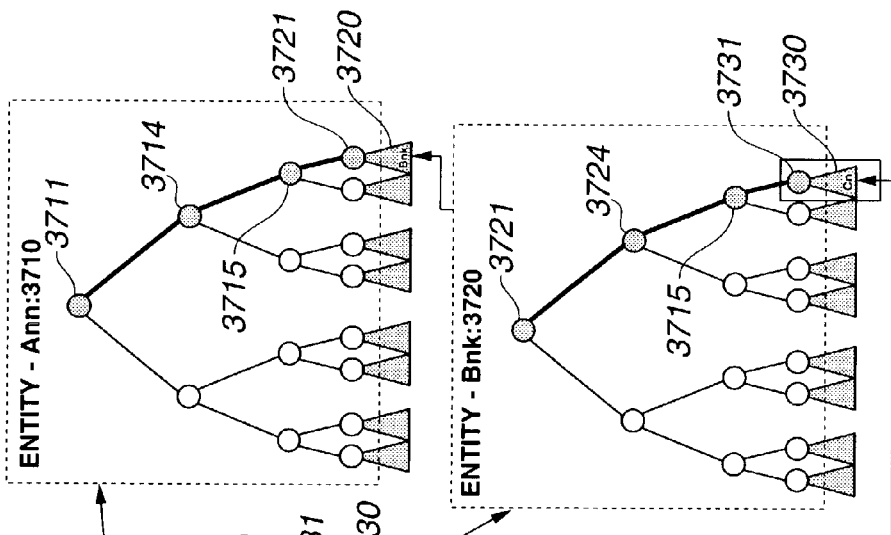
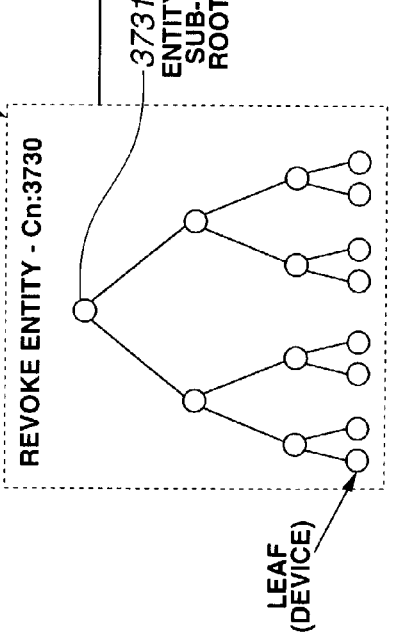
FIG.38A
FIG.38B
FIG.38C
FIG.38D

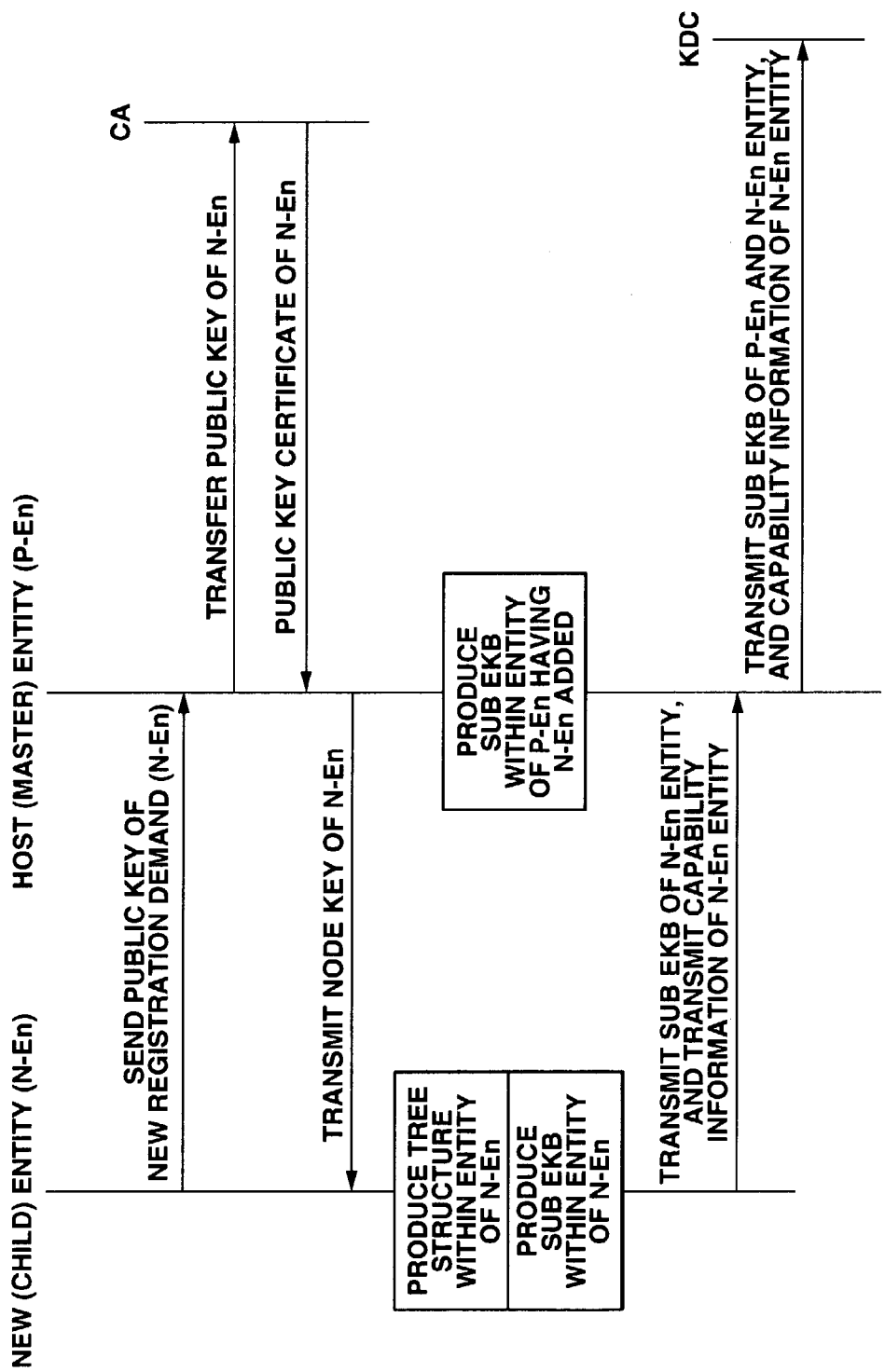

INFORMATION PROCESSING SYSTEM AND METHOD FOR MANAGING ENCRYPTED DATA WITH TAG INFORMATION

CROSS-REFERENCE TO RELATED APPLICATIONS

The present application is a national phase entry under U.S.C. § 371 of International Application No. PCT/JP01/02929, filed Apr. 4, 2001, published in Japanese, which claims priority from JP2000-105329, filed Apr. 6, 2000, JP2000-179692, filed Jun. 15, 2000 and JP2000-317803, filed Oct. 18, 2000.

BACKGROUND OF THE INVENTION

The present invention relates to an information processing system, an information processing method, an information recording medium, and a program distributing medium, and particularly, to a system and a method for distributing an encryption processing key in a system involving encryption processing. Particularly, the invention relates to an information processing system, an information processing method, an information recording medium, and a program distributing medium, which uses a tree-structured hierarchical key distributing system, reconstructs a hierarchical key distributing tree according to a distributing device to reduce the amount of data contained in a distributing key block to thereby reduce distributing message size, relieve loads of a content key distribution or data distribution when various keys are renewed, and provide data safely.

Recently, various software data (which will be hereinafter called contents) such as game programs, voice data, image data, and so on have been actively circulated through a network such as an internet, or storage media capable of being circulated such as a DVD, CD, etc. These contents are reproducible by a PC (Personal Computer), or by mounting a memory medium, or are stored in a recording device within a recording and reproducing apparatus attached to a PC and the like.

Information apparatuses such as a video game apparatus, PC and the like, have an interface for receiving the contents from a network or for getting access to a DVD, CD and the like, and further have control means necessary for reproducing the contents, along with RAM, ROM and the like used as a memory region for programs and data.

A user can reproduce various contents such as music data, image data, or programs through the information apparatuses or a display, a speaker and the like connected thereto.

Contents, such as game programs, music data, image data and the like, are generally held in their distribution rights by owners and sales agents. Accordingly, in distribution of these contents, there is a predetermined use limitation, that is, the use of contents is granted only to proper users so that reproduction without permission is not allowed.

One procedure for limiting use to authorized users is through encryption processing. For example, various contents such as voice data, image data, game programs and the like are encrypted prior to distribution, and means for decrypting the encrypted contents, that is a decryption key, is given only to persons confirmed to be a proper user.

Data encryption and decryption using keys is well known.

There are a variety of data encrypting and decrypting methods using an encryption key and a decryption key, but there is, as one example therefor, a system called a "common key encryption system." In the common key encryption system, an encryption key and a decryption key are made to be common. The common key (content key) is given to a proper user so as to eliminate data access by an invalid user. An illustration of a common key system is DES (Data Encryption Standard).

The encryption key and the decryption key as described above can be obtained by applying a unidirectional function such as a hash function on the basis of a pass-word or the like, for example. As used herein, a unidirectional function is a function from which it is very difficult to obtain an input conversely from an output. For example, a pass-word (determined by a user) is used as an input to the unidirectional function, and the encryption key and the decryption key are produced on the basis of the output. It is nearly impossible, from the encryption key and the decryption key thus obtained, to conversely obtain the pass-word.

Another type of system is the "public key encryption system." The public key encryption system user, a public key for encryption. The document encrypted by the public key can be subjected to decrypting by a private key corresponding to the public key. The private key is owned by the individual who issued the public key, and the document encrypted by the public key can be decrypted by the individual having the private key (content key). A typical public key encryption system is RSA (Rivest-Shamir-Adleman) encryption. As such, it is possible to provide a system for enabling decryption of encrypted contents only by a proper user.

In the content distributing systems as described above, contents are encrypted to provide them to users, and a content key is provided for decrypting the encrypted contents for use by a proper user. There is proposed a variation in which a content key for preventing invalid copies of the content key itself is encrypted before being provided to the proper user, and the encrypted content key is decrypted using a decryption key owned only by the proper user.

The judgment whether or not a user is proper is generally carried out by executing authenticating processing before distribution of contents or content keys, for example, between a content provider who is a transmitter of contents and a user's device. In general authenticating processing, confirmation is made of a mating party, and a session key effective only for communication is produced. When authentication is established, data, for example, contents or a content key, is encrypted using the produced session key for communication. The authenticating system includes mutual authentication using a common key encryption system, and an authentication system using a public key system. In the authentication using a common key, the common key must be available system wide which is inconvenient at the time of renewal processing. Further, in the public key system, the computation load is large along with requiring larger amounts of memory. The provisioning of such a processing means on each device is not desirable.

SUMMARY OF THE INVENTION

It is an object of the present invention to provide an information processing system, an information processing method, an information recording medium, and a program distributing medium, which enables the safe transmission of data to a proper user without relying on the mutual authentication processing between a transmitter and a receiver of data as described above, and reconstructs a hierarchical key distribution tree according to a distribution tree in order to reduce the amount of data contained in a distribution key block to thereby reduce the size of an encryption key, reduce the load of data transmission, and reduce the processing requirements for obtaining an encryption key in each device.

An information processing system according to the present invention is one for distributing encrypted message data that is capable of only being used in not less than one selected device. The device comprising: encryption processing means for holding a different key set of a node key, which is peculiar to each node in a hierarchical tree structure having a plurality of different devices as leaves, and a leaf key, which is peculiar to each device, and executing a decrypting process of encrypted message data distributed to the device using the key set; wherein the encrypted message data distributed to the device has data encrypted with a renewal node key, which is obtained by decrypting an enabling key block (EKB). The enabling key block (EKB) includes a data part comprising encrypted key data, and a tag part, which is position discrimination data of the encrypted key data in the hierarchical tree structure. The EKB includes encrypted key data into which the renewal node key of at least one of the node keys in a group comprising nodes and leaves of the hierarchical tree structure is encrypted by a node key or a leaf key in the group.

Further, in one embodiment of the information processing system according to the present invention, the encrypted key data is data into which a node key of the hierarchical tree structure is encrypted using a subordinate node key or a subordinate leaf key, and position discrimination data stored in the tag part comprises a tag indicating whether there is encrypted key data at a subordinate left and right node, or leaf position of a node.

Further, in one embodiment of the information processing system according to the present invention, the encrypted key data comprises only keys corresponding to a node or a leaf of a reconstructed hierarchical tree that is reconstructed by selecting paths constituting a simplified 2-branched type tree with terminal nodes or leaves with which the enabling key block (EKB) can be decrypted at the lowest stage to omit unnecessary nodes, and position discrimination data stored in the tag part includes data indicating whether the encrypted key corresponding to the tag of the enabling key block (EKB) is stored or not.

Further, in one embodiment of the information processing system according to the present invention, the encrypted key data comprises a key corresponding to a node or a leaf of a reconstructed hierarchical tree that is reconstructed by selecting paths constituting a simplified 2-branched type tree with terminal nodes or leaves with which the enabling key block (EKB) can be decrypted at the lowest stage to omit unnecessary nodes, and position discrimination data stored in the tag part includes tags for indicating whether there is encrypted key data at a left and a right node or a leaf position at a subordinate node, and data for indicating whether the encrypted key corresponding to the tag is stored or not.

Further, in one embodiment of the information processing system according to the present invention, the reconstructed hierarchical tree is a tree constituted by selecting a sub-root, which is a top node of an entity defined as a subset tree of devices having a common element.

Further, in one embodiment of the information processing system according to the present invention, the encrypted key data comprises, (in a simplified multi-branched type tree having a terminal node or a leaf with which the enabling key block (EKB) can be decrypted at the lowermost stage) keys corresponding to a top node and terminal nodes or leaves, of a reconstructed hierarchical tree that is reconstructed by selecting paths directly connecting the terminal nodes or leaves and a top of the multi-branched type tree to omit an unnecessary node, and position discrimination data stored in the tag part that includes data indicating whether an encrypted key corresponding to the tag of the enabling key block (EKB) is stored or not.

Further, in one embodiment of the information processing system according to the present invention, the reconstructed hierarchical tree is a tree having not less than three branches connecting the top node (of a simplified multi-branched type tree) with terminal nodes or leaves.

Further, in one embodiment of the information processing system according to the present invention, the encryption processing means in the device sequentially extracts the encrypted key data with data of the tag part in the enabling key block (EKB), executes a decrypting process to obtain the renewal node key, and decrypts the encrypted message data with the obtained renewal node key.

Further, in one embodiment of the information processing system according to the present invention, the message data is a content key that can be used as a decryption key for decrypting content.

Further, in one embodiment of the information processing system according to the present invention, the message data is an authentication key used in the authentication process.

Further, in one embodiment of the information processing system according to the present invention, the message data is a key for generating an integrity check value (ICV) of the content.

Further, in one embodiment of the information processing system according to the present invention, the message data is program code.

Further, an information processing method according to the present invention is one for distributing encrypted message data capable of, only being used in not less than one selected device. The method comprising: an enabling key block (EKB) generating step for generating an enabling key block (EKB) comprising a data part including encrypted key data into which the renewal node key of at least one of the node keys in a group comprising, nodes and leaves of the hierarchical tree structure is renewed is encrypted with a node key or a leaf key in the group, and a tag part, which is position discrimination data in the hierarchical tree structure of encrypted key data stored in the data part; and a message data distribution step for generating message data encrypted with the renewal node key to distribute it to a device.

Further, one embodiment of the information processing method according to the present invention comprises a decrypting processing step of executing a decrypting process on the encrypted message data using the key set in a device holding a different key set of a node key, which is peculiar to each node in the hierarchical structure, and a leaf key peculiar to each device.

Further, in one embodiment of the information processing method according to the present invention, the enabling key block (EKB) generating step includes a step of encrypting a node key of the hierarchical tree structure using a subordinate node key, or a subordinate leaf key, to generate the encrypted key data, and a step of generating a tag indicating whether there is encrypted key data at a node, or leaf position, at subordinate left and right positions of a node position.

Further, in one embodiment of the information processing method according to the present invention, the enabling key block (EKB) generating step includes a step of generating a reconstructed hierarchical tree by selecting paths of a simplified 2-branched type tree with a terminal node or leaf capable of decrypting the enabling key block (EKB) at the lowest stage to omit unnecessary nodes; a step of generating an enabling key bock (EKB) using only a key corresponding to a node or leaf of the reconstructed hierarchical tree; and a step of storing data indicating whether an encrypted key corresponding to a tag of the enabling key block (EKB) is stored in the tag part or not.

Further, in one embodiment of the information processing method according to the present invention, the step of generating the reconstructed hierarchical tree includes a tree generating processing executed by selecting a sub-root, which is a top node of an entity defined as a subset tree of devices having a common element.

Further, in one embodiment of the information processing method according to the present invention, the enabling key block (EKB) generating step includes a step of generating (in the simplified branched type tree with a terminal node, or leaf, capable of decrypting the enabling key bock (EKB) at the lowest stage) the reconstructed hierarchical tree by selecting a path for directly connecting the terminal node, or leaf, with the top of the multi-branched type tree; and a step of storing data indicating whether an encrypted key (corresponding to a tag of the enabling key bock (EKB)) is stored in the tag part or not.

Further, in one embodiment of the information processing method according to the present invention, the reconstructed hierarchical tree generated is generated as a tree having not less than three branches connecting a top node (of a simplified multi-branched type tree) and a terminal node, or leaf.

Further, in one embodiment of the information processing method according to the present invention, the decrypting processing step includes a renewal node key obtaining step for obtaining the renewal node key by sequentially extracting encrypted key data stored in the data part on the basis of position discrimination data stored in the tag part of the enabling key block (EKB); and a message data decrypting step for executing decryption of the encrypted message data with the renewal node key.

Further, in one embodiment of the information processing method according to the present invention, the message data is a content key capable of being used as a decryption key for decrypting the content data.

Further, in one embodiment of the information processing method according to the present invention, the message data is an authentication key used in the authentication process.

Further, in one embodiment of the information processing method according to the present invention, the message data is a key for generating an integrity check value (ICV) of contents.

Further, in one embodiment of the information processing method according to the present invention, the message data is program code.

Further, an information recording medium according to the present invention stores an enabling key block (EKB). The EKB comprises a data part, including encrypted key data into which the renewal node key of at least one of the node keys in a group comprising nodes and leaves of the hierarchical tree structure is encrypted with a node key or a leaf key in the group, and a tag part, which is position discrimination data in the hierarchical tree structure of encrypted key data stored in the data part, and message data encrypted by the renewal node key.

Further, in one embodiment of the information recording medium according to the present invention, the encrypted key data included in the enabling key block (EKB) is data into which the node key of the hierarchical tree structure is encrypted using a subordinate node key or a subordinate leaf key; and the position discrimination data stored in the tag part is a tag indicating whether there is key data at the node, or of leaf, position at the subordinate left and right positions of the node position.

Further, in one embodiment of the information recording medium according to the present invention, the encrypted key data comprises a key corresponding to a node, or a leaf, of a reconstructed hierarchical tree that is reconstructed by selecting paths of a simplified 2-branched type tree with a terminal node, or leaf, capable of decrypting the enabling key block (EKB) at the lowest stage to omit unnecessary nodes; and the position discrimination data stored in the tag part includes data indicating whether an encrypted key corresponding to the tag of the enabling key block (EKB) is stored or not.

A program distributing medium according to the present invention is one for distributing a computer program to execute on a computer system a process of generating an enabling key block (EKB) into which a renewal node key of at least one of the node keys in a group comprising nodes and leaves of the hierarchical tree structure is encrypted with a node key or a leaf key in the group. The computer program includes a step of generating a reconstructed hierarchical tree by selecting a path of a simplified 2-branched type tree with a terminal node, or a leaf, capable of decrypting the enabling key block (EKB) at the lowest stage to omit an unnecessary node; a step of generating the enabling key block (EKB) on the basis of only a key corresponding to a node or leaf of the reconstructed hierarchical tree; and a step of storing data indicating whether an encrypted key corresponding to a tag of the enabling key block (EKB) is stored or not.

In one aspect of the present invention, distribution of an encryption key in accordance with a hierarchical tree is used to suppress the distributing message quantity necessary for key renewal as small as possible. That is, the key distribution method in which each apparatus is arranged in each leaf by n-division is used to distribute, for example, a content key, which is an encryption key of content data, or an authentication key used in authentication processing or a program code along with an enabling key block through recording medium or a communication circuit.

Further, the enabling key block comprises an encrypted key data part and a tag part, which shows a position of the encrypted key, whereby the amount of data is reduced to enable rapid execution of a decrypting process in a device. In accordance with an aspect of the invention, only the proper device is able to distribute decodable data safely.

It is noted that the program distributing medium according to the present invention is a medium for distributing a computer program in the form that can be read by a computer to a general computer system capable of executing, for example, various program codes. The medium includes recording media such as CD, FD, MO, etc., or a transfer medium such as a network, whose form is not particularly limited.

Such a program distributing medium defines a cooperative relationship between a computer program and a distributing medium. In other words, a computer program is installed in a computer system through the distributing medium to exhibit the cooperative operation in the computer system to obtain the operation and effects described herein.

The other objects, features and advantages of the present invention will be apparent from the detailed description with reference to the embodiments and the accompanying drawings of the present invention.

BRIEF DESCRIPTION OF THE DRAWINGS

FIGS. 4A and 4B are views each showing an example of an enabling key block (EKB) used in the distribution of various keys and data in the information processing system according to the present invention.

FIGS. 7A to 7C are views illustrating a tag of an enabling key block (EKB) in the information processing system according to the present invention.

FIGS. 11A and 11B illustrate a comparison between processing in the information processing system according to the present invention and conventional processing.

FIGS. 21A and 21B are views for use in explaining a copy preventive function where an applicable content integrity check value (ICV) is stored in a medium in the present invention.

FIGS. 26A and 26B are views for use in explaining a simplified enabling key block (EKB) in the information processing system of the present invention.

FIGS. 28A to 28C are views for use in explaining entity control of a hierarchical tree structure in the information processing system of the present invention.

FIGS. 37A and 37B are views for use in explaining a renewal sub-EKB at the time of a device revocation in the information processing system of the present invention.

FIGS. 38A to 38D are views for use in explaining entity revoke processing in the information processing system of the present invention.

FIG. 45 is a view illustrating capability notice processing in the information processing system of the present invention.

DETAILED DESCRIPTION

Figure 1:
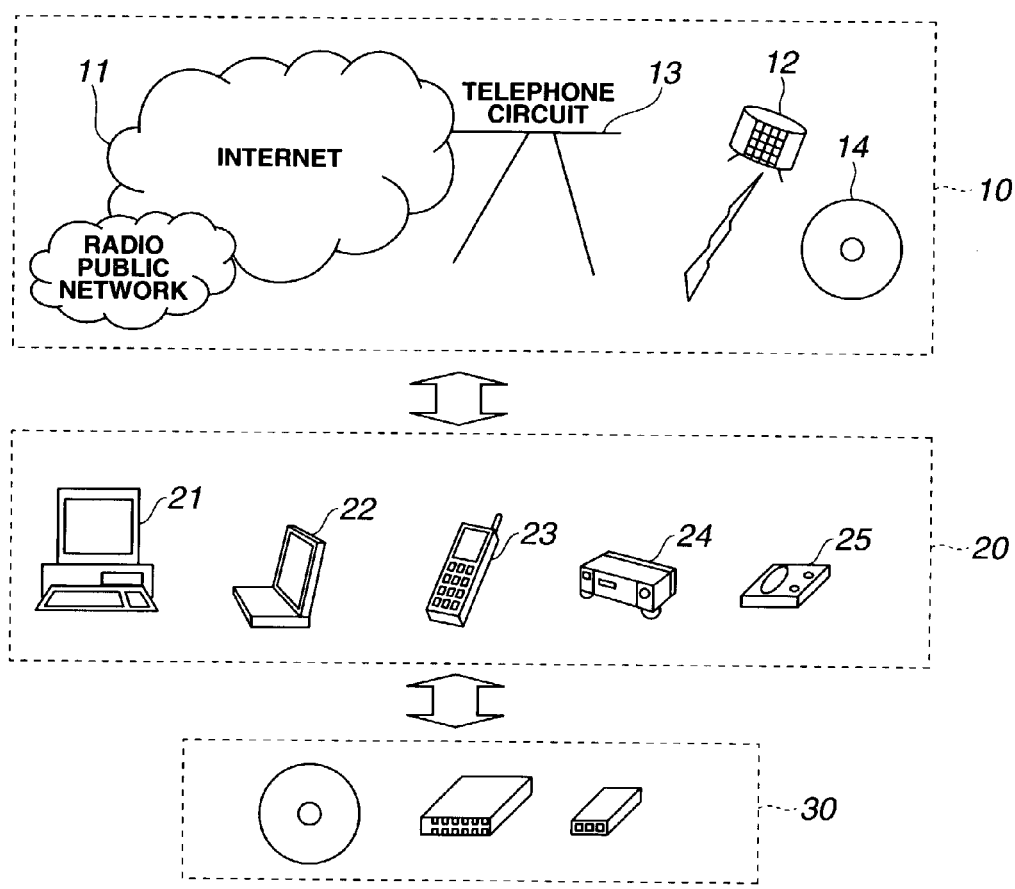
FIG. 1 is a view of an example of an information processing system according to the present invention.

FIG. 1 shows an example of a content distributing system to which the data processing system of the present invention can be applied. The content distributing side 10 transmits encrypted content, or an encrypted content key, to various content reproducible apparatuses on the content receiving side 20. The apparatus on the content receiving side 20 decrypts the received encrypted content or the received encrypted content key, to obtain the content, or the content key, and carries out reproduction of image data and voice data or execution of various programs. The exchange of data between the content distributing side 10 and the content receiving side 20 is executed through a network such as an internet or through a circulatable recording medium such as DVD, CD.

The data distributing means on the content distributing side 10 includes an internet 11, a broadcasting satellite 12, a telephone circuit 13, media 14 such as DVD, CD, etc., and on the other hand, the devices on the content receiving side 20 include a personal computer (PC) (21 or 22) portable apparatuses 23 such as a portable device (PD), a portable telephone, PDA (Personal Digital Assistants), etc., a recording and reproducing unit 24 such as DVD, CD players, and a reproduction exclusive-use unit 25 such as a game terminal. In these devices on the content receiving side 20, contents distributed from the content distributing side 10 are obtained from communication means such as a network, or from a media 30.

Figure 2:
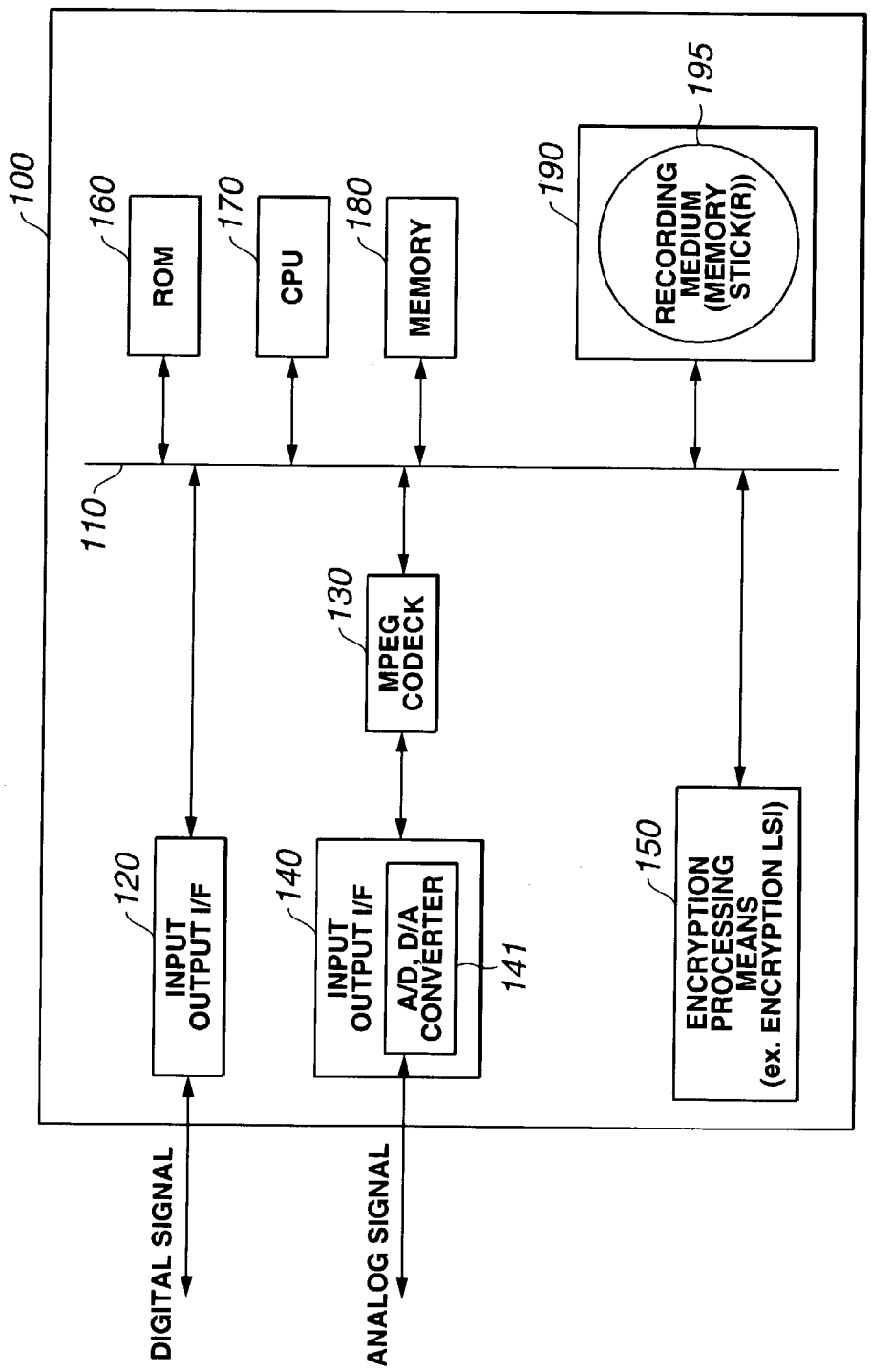
FIG. 2 is a block diagram showing an example of a recording and reproducing apparatus that can be applied in the information processing system according to the present invention.

FIG. 2 shows a block diagram of a recording and reproducing device 100 as one example of devices on the content receiving side 20 shown in FIG. 1. The recording and reproducing device 100 has an input/output I/F (Interface) 120, a MPEG (Moving Picture Experts Group) codec 130, an I/F (Interface) 140 provided with A/D, D/A converter 141, an encryption processing means 150, ROM (Read Only Memory) 160, CPU (Central Processing Unit) 170, a memory 180, and a drive 190 for a recording medium 195, which are connected to each other by a bus 110.

The input/output I/F 120 receives a digital signal comprising various contents such as an image, voice, a program, etc., and provide the content to the bus 110, and, conversely, receives a digital signal from the bus 110 and provides it to the outside. The MPEG codec 130 decrypts MPEG coded data supplied through the bus 110 to output it to the input/output I/F 140, and MPEG-decrypts a digital signal supplied from the input/output I/F 140 to output it to the bus 110. The input/output I/F 140 contains an A/D, D/A converter 141 therein. The input/output I/F 140 receives an analog signal representing content supplied from the outside, which is subjected to A/D (Analog Digital) conversion by the A/D, D/A converter 141 whereby the signal is output as a digital signal to the MPEG codec 130. Conversely, a digital signal from the MPEG codec 130 is subjected to D/A (Digital Analog) conversion by the A/D, D/A converter 141, which is output as an analog signal to the outside.

The encryption processing means 150 comprises, for example, an LSI (Large Scale Integrated circuit) chip, for performing encrypting, decrypting or authentication processing of a digital signal supplied through the bus 110, and for providing encrypted data and decrypted data to the bus 110. The encryption processing means 150 can be also realized by not only the one chip LSI but by a combination of various software and/or hardware.

ROM 160 stores program data processed by the recording and reproducing device. The CPU 170 executes programs stored in the ROM 160 and the memory 180 to thereby control the MPEG codec 130 and the encryption processing means 150. The memory 180 is for example, a non-volatile memory, which stores a program that is executed by the CPU 170, data necessary for operation of CPU 170, and a key set used in the encryption processing executed by the device. The key set will be explained later. The drive 190 drives the recoding medium 195 capable of recording and reproducing digital data to thereby read (reproduce) digital data from the recording medium 195 to output it to the bus 110, and supplies digital data supplied through the bus 110 to the recording medium 195 for recording.

The recording medium 195 is a medium capable of storing digital data, for example, an optical disk such as DVD, CD, an optical magnetic disk, a magnetic disk, a magnetic tape, or a semiconductor memory such as RAM, and in the present embodiment, the medium can be detachably mounted on the drive 190. However, the recording medium 195 may be housed in the recording and reproducing device 100.

The encryption processing means 150 shown in FIG. 2 may comprise a single one-chip LSI, and may also be realized by a combination of software and a hardware.

Next, an arrangement for holding an encryption processing key in each device and a data distributing arrangement where encrypted data are distributed from the content distributing side 10 shown in FIG. 1 to each device on the content receiving side 20 will be described using FIG. 3.

Figure 3:
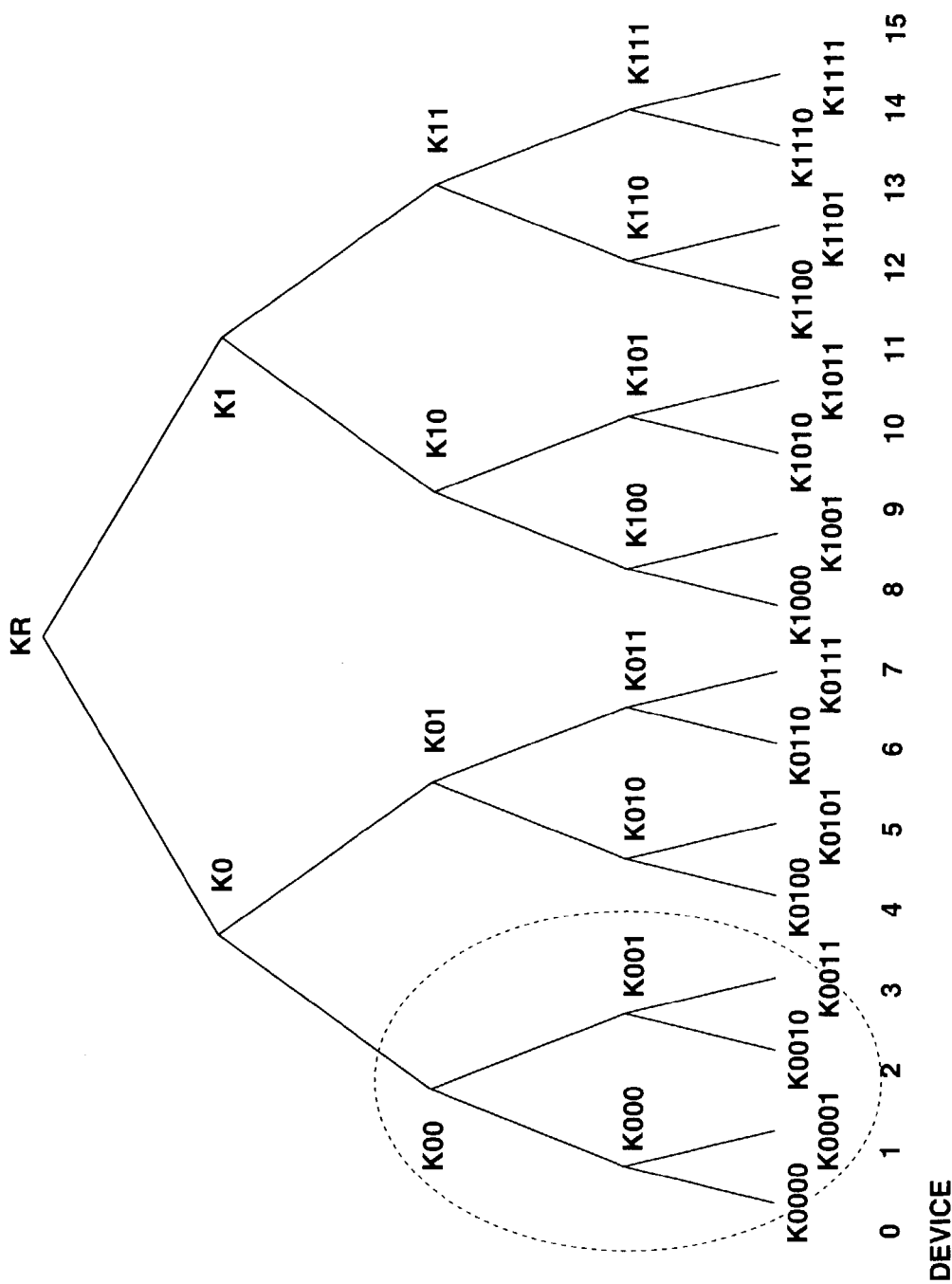
FIG. 3 shows an illustrative tree for use in explaining the encryption processing of various keys and data in the information processing system according to the present invention.

Numbers 0 to 15 shown in the lowest stage in FIG. 3 are individual devices on the content receiving side 20. That is, each leaf of the hierarchical tree structure shown in FIG. 3 corresponds to a device.

Each of devices 0 to 15 stores a key set comprising the keys assigned to each node from its own leaf to a root (node keys) and its leaf key, in the hierarchical tree shown in FIG. 3. This key set is determined at the time of manufacture or at the time of shipment, or afterwards. K0000 to K1111 shown in the lowest stage of FIG. 3 are respectively leaf keys assigned to devices 0 to 15, and keys from KR to K111 described in the second node from the lowest stage are node keys.

For example, a device 0 has a key set comprising a leaf key K0000 and node keys K000, K00, K0, KR. A device 5 has a key set comprising K0101, K010, K01, K0, KR. A device 15 has a key set comprising K1111, K111, K11, K1, KR. In the tree of FIG. 3, only 16 devices (0 to 15) are described, and the tree structure illustrates a well balanced a 4-stage tree. However, many more devices may be accommodated in a tree, and the parts of a tree may have different numbers of stages.

Further, each device included in the tree structure shown in FIG. 3 includes various recording media, for example, DVD, CD, MD of the embedded type or the type detachably mounted on the device, or devices of various types using a flash memory or the like. Further, various application services may coexist. In this context, the hierarchical tree structure shown in FIG. 3 is applied.

In the system in which various devices and applications coexist, for example, a portion surrounded by the dotted line in FIG. 3, that is, the devices 0, 1, 2 and 3 are illustratively set as a single group using the same recording medium. For example, with respect to the device included in the group surrounded by the dotted line, processing is executed such that common content is encrypted and sent from a provider, a content key used in common to devices is sent, or payment data for content charges is also encrypted and output from each device to a provider or a settlement organization. Similarly, an organization (such as a content provider or a settlement organization) for carrying out data transmission to and from the devices executes processing treating the devices 0, 1, 2, 3 as one group. A plurality of such groups are present in the tree of FIG. 3. The organization functions as a message data distributing means.

Node keys and leaf keys may be collectively controlled by a single key control center, or may be controlled on a group basis by the message data distributing means. These node keys and leaf keys are subjected to renewal processing when a key is leaked. This renewal processing is executed by a key control center, a provider or a settlement organization.

In this tree structure, as will be apparent from FIG. 3, three devices 0, 1, 2 and 3 included in one group hold common node keys K00, K0, KR. By utilizing these common node keys, for example, a common content key can be distributed to only devices 0, 1, 2, 3. For example, if the node key K00 is set as a content key, only the devices 0, 1, 2, 3 can utilize key K00 as a common content key. Further, if encrypted data Enc(K00, Kcon) is distributed to the devices 0, 1, 2, 3 through a network or by being stored in the recording medium, only the devices 0, 1, 2, 3 can decrypt the encrypted data Enc(K00, Kcon) using the common node key K00 to obtain the content key: Kcon. (As used herein, the notation Enc(Ka, Kb) indicates data into which Kb is encrypted by Ka.)

Further, where at the time t, keys: K0011, K001, K00, K0 and KR owned by the device 3 are analyzed by a hacker and then exposed, it is necessary for protecting subsequent data transmission to the group in to separate out the device 3 from the group. To this end, node keys: K001, K00, K0, KR are respectively renewed to new keys K(t)001, K(t)00, K(t)0, K(t)R, which renewed keys are sent to the devices 0, 1, 2. (As used herein, K(t)aaa indicates a renewal of key Kaaa at time t.)

The distributing of a renewal key will now be described. Renewal of a key is executed by storing a table comprising a block of data called "enabling key block (EKB)" in a network, for example, or in a recording medium for supply to the devices 0, 1 and 2. The enabling key block (EKB) comprises a decryption key for distributing a newly renewed key to a device corresponding to each leaf of the tree structure shown in FIG. 3. The enabling key block (EKB) is sometimes called a key renewal block (KRB: Key Renewal Block).

In the enabling key block (EKB) shown in FIG. 4A, only those keys that need to be renewed comprise the EKB. As will be apparent from FIG. 3, the device 0 and the device 1 require K(t)00, K(t)0, K(t)R as renewal node keys, and the device 2 requires K(t)001, K(t)00, K(t)0, K(t)R as renewal node keys.

As shown in FIG. 4A, a plurality of encrypted keys are included in the EKB. The encrypted key in the lowest stage is Enc(K0010, K(t)001). This is a renewal node key K(t)001 encrypted by a leaf key K0010 of the device 2, and the device 2 is able to decrypt this encrypted key by its leaf key to obtain K(t)001. By using K(t)001 obtained by decrypting, an encrypted key Enc(K(t)001, K(t)00) in the second stage from the bottom can be decrypted to obtain a renewal node key K(t)00. Sequentially, an encrypted key Enc(K(t)00, K(t)0) in the second stage from the top of the EKB of FIG. 4A is decrypted to obtain a renewal node key K(t)0, and an encrypted key Enc(K(t)0, K(t)R) in the first stage from the top of the EKB of FIG. 4A is decrypted to obtain K(t)R.

On the other hand, in the devices 0 and 1 a node key K000 is not included to be renewed. The renewal keys are K(t)00, K(t)0 and K(t)R. The devices 0 and 1 decrypt an encrypted key Enc(K000, K(t)00) in the third stage from the top of the EKB of FIG. 4A to obtain K(t)00, and thereafter, an encrypted key Enc(K(t)00, K(t)0) in the second stage from the top of the EKB of FIG. 4A is decrypted, and an encrypted key Enc(K(t)0, K(t)R) in the first stage from the top of the EKB of FIG. 4A is decrypted to obtain K(t)R. By doing so, the devices 0, 1 and 2 can obtain a renewed key K(t)R. The index in the EKB of FIG. 4A shows the absolute address of a node key and a leaf key used as a decryption key.

Where renewal of a node key: K(t)0, K(t)R in the upper stage in the tree structure shown in FIG. 3 is unnecessary, and renewal processing of only the node key K00 is necessary the enabling key block (EKB) shown in FIG. 4B can be used to distribute a renewal nod key K(t)00 to the devices 0, 1 and 2.

The EKB shown in FIG. 4B can be used, for example, to distribute a new common content key to a specific group. Illustratively, it is supposed that the devices 0, 1, 2 and 3 shown by the dotted line in FIG. 3 use a recording medium, and a new common content key K(t)con is necessary. At this time, Enc(K(t)00, K(t)con) is distributed with the EKB shown in FIG. 4B to devices 0, 1 and 2. By this distribution, distribution of data not decrypted in the apparatus of other groups such as a device 4 becomes enabled.

That is, if the devices 0, 1, and 2 decrypt the encrypted sentence using K(t)00 obtained by processing the EKB of FIG. 4B, a content key, K(t)con, at the time can be obtained.

Figure 5:
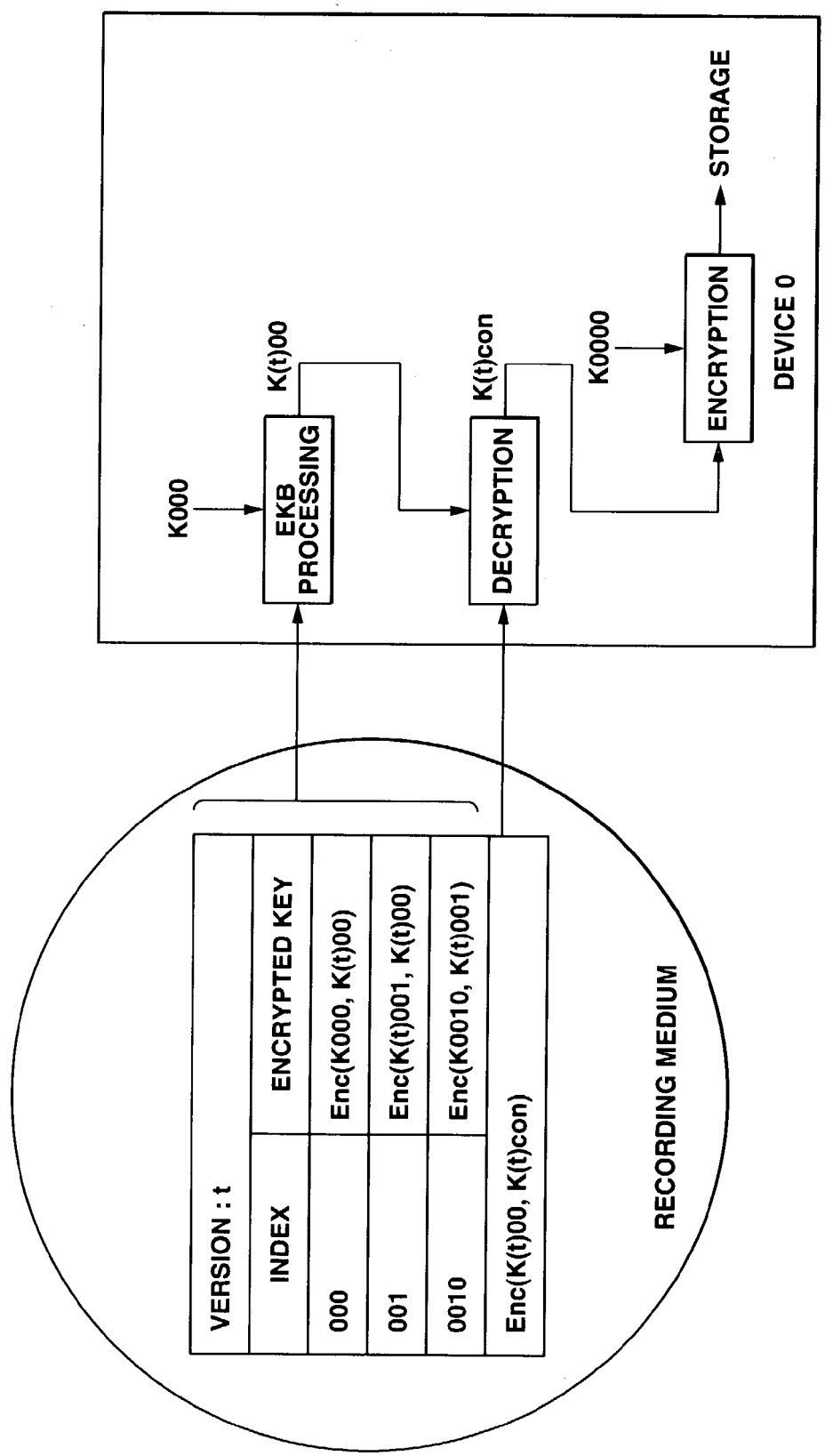
FIG. 5 is a view showing an example of distribution and decrypting using an enabling key block in the information processing system according to the present invention.

FIG. 5 shows an example for obtaining a content key, K(t)con, at the time t, in a device 0, which receives, through a recording medium, data Enc(K(t)00, K(t)con) (into which the new common content key K(t)con is encrypted using K(t)00) and the EKB shown in FIG. 4B. That is, this is an example in which encrypted message data in an EKB is a content key K(t)con.

As shown in FIG. 5, a device 0 uses a node key K000 stored in advance by itself to produce a renewal node key K(t)00 from the EKB by the EKB processing similar to that described above. Further, a renewal content key K(t)con is decrypted using the renewal node key K(t)00 and is encrypted by a leaf key K0000 owned by device 0 and then stored for later use.

Figure 6:
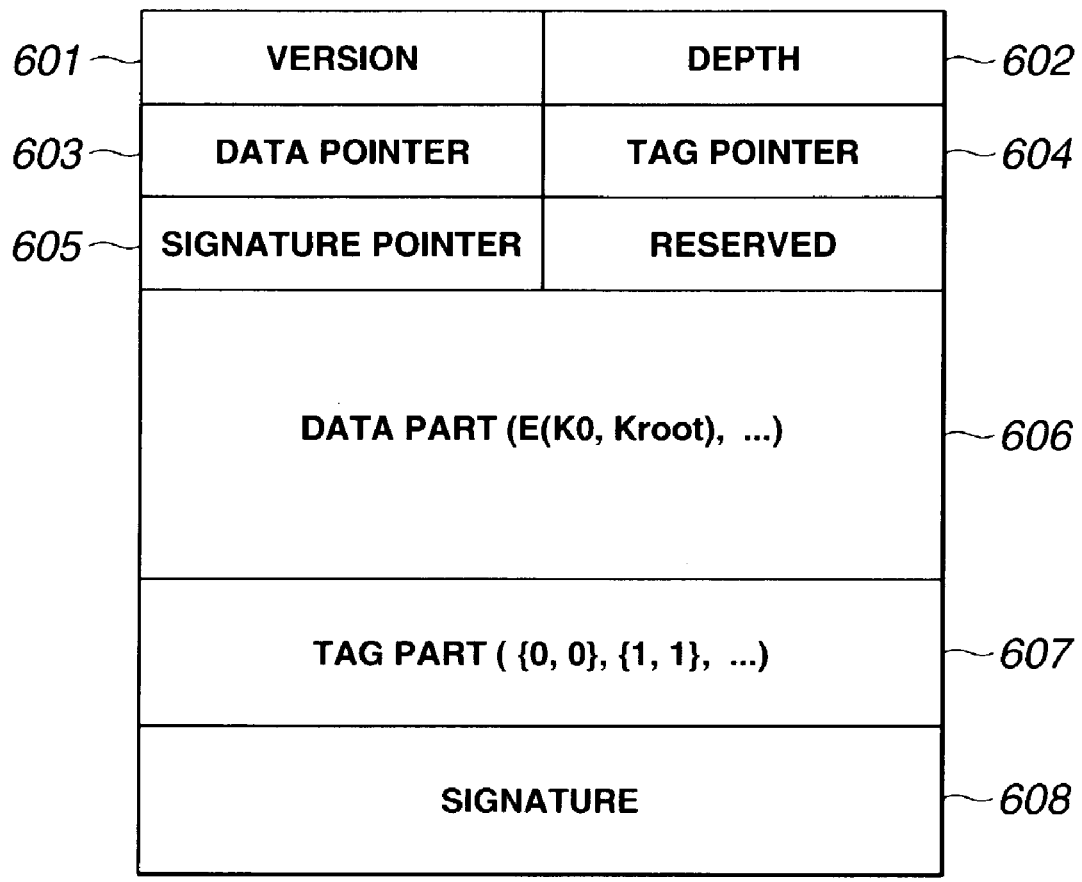
FIG. 6 is a view showing an illustrative format of an enabling key block (EKB) in the information processing system according to the present invention.

FIG. 6 shows an example of a format of the enabling key block (EKB). A version 601 is a discriminator showing the version of the enabling key block (EKB). The version is for use in discriminating between the latest EKB and a content. The depth 602 provides the number of hierarchies of a hierarchical tree with respect to a device of the distributing destination of the enabling key block (EKB). A data pointer 603 is a pointer for indicating a position of data part of the enabling key block (EKB), and a tag pointer 604 is a pointer for indicating a position of a tag part of the EKB, and a signature pointer 605 is a pointer for indicating a position of the signature part of the EKB.

Data part 606 stores, for example, various encrypted keys in connection with a renewal node key as shown in FIG. 5.

Tag part 607 is a tag for indicating a positional relationship of encrypted node keys and leaf keys stored in the data part. An attaching rule of this tag will be described with reference to FIGS. 7A to 7C. FIGS. 7A to 7C show an example for sending the enabling key block (EKB) described previously in FIG. 4A as data. The data at that time is as shown in FIG. 7B. An address of a top node included in an encrypted key at that time is used as a top node address. In this case, since a renewal key of a root key K(t)R is included, a top node address is KR. At this time, for example, data Enc(K(t)0, K(t)R) in the uppermost stage is at a position shown in the hierarchical tree shown in FIG. 7A. (The next data is Enc(K (t)00, K(t)0), which is at a position under on the left hand of the previous data in the tree. Where data exists, a tag is set to 0, and where data does not exist, a tag is set to 1. The tag is set as (left (L) tag, right (R) tag). Here, since data exists at the left of the data at the top stage Enc(K(t)0, K(t)R), L tag=0, and since data does not exist to the right, R tag=1. Tags are set to all the data to constitute a row of data and a row of tags as, shown in FIG. 7C.

The tag is set in order to show at which position of the tree structure data Enc(Kxxx, Kyyy) is positioned. Since the key data Enc(Kxxx, Kyyy) . . . are mere enumerated data of simply encrypted keys, a position on the tree of an encrypted key stored as data can be discriminated by the aforementioned tag.

Alternatively, for example, data as shown below can be provided using the node index placed in correspondence to the encrypted data as shown in FIGS. 4A and 4B previously without using the aforementioned tag:

1. 0: Enc(K(t)0, K(t)root)
2. 00: Enc(K(t)00, K(t)0)
3. 000: Enc(K(t)000, K(t)00)
4. . . .

However, using such an index as shown above results in a larger size EKB, which is not preferable in distribution through a network. On the other hand, use of the aforementioned tag as index data allows discrimination of a key position using less data.

Returning to FIG. 6, the EKB format will be further described. The signature is an electronic signature executed, for example, by a key control center, a content provider, a settlement organization or the like which issued the enabling key block (EKB). The device which received the EKB confirms, by authentication of the signature, that it is an enabling key block (EKB) issued by a valid enabling key block (EKB) issuer, While in the aforementioned example, only the content key is sent along with the EKB, a description will be made hereinafter in which encrypted content is also sent.

Figures 8A, 8B:
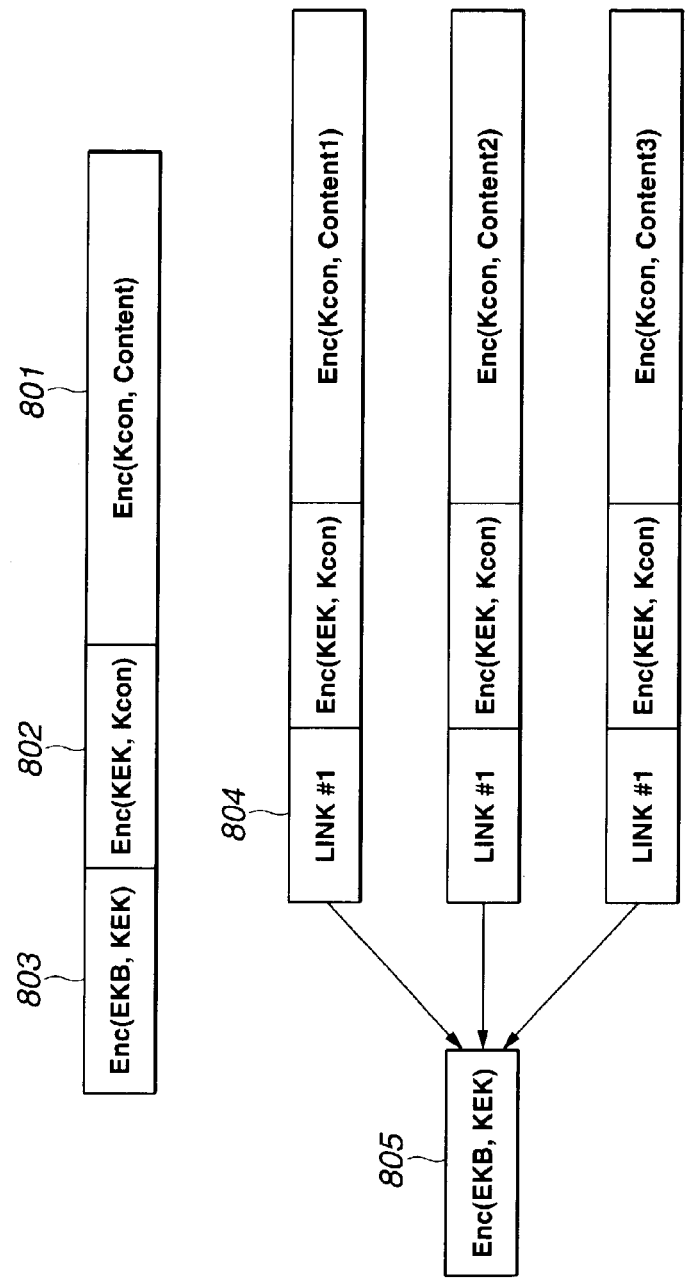
FIGS. 8A and 8B are views illustrating an enabling key block (EKB) and the distribution of content keys and contents in the information processing system according to the present invention.

This is shown in FIGS. 8A and 8B. In FIG. 8A, Enc(Kcon, content) 801 is data in which content is encrypted by a content key(Kcon), Enc(KEK, Kcon) 802 is data in which a content key (Kcon) is encrypted by a content key-encryption key (KEK), and Enc(EKB, KEK) 803 is data in which a content KEK is encrypted by an enabling key block (EKB).

Here, the content key-encryption key (KEK) may be a node key (K000, K00 . . . ) or a root key (KR) itself, and may be a key encrypted by a node key (K000, K00 . . . ) or a root key (KR).

FIG. 8B shows an example where a plurality of contents are recorded in media, which makes use of the same Enc(EKB, KEX) 805. In such a case, the same Enc(EKB, KEK) is not added to each data, but data showing a link to Enc(EKB, KEK) is added to each data.

Figure 9:
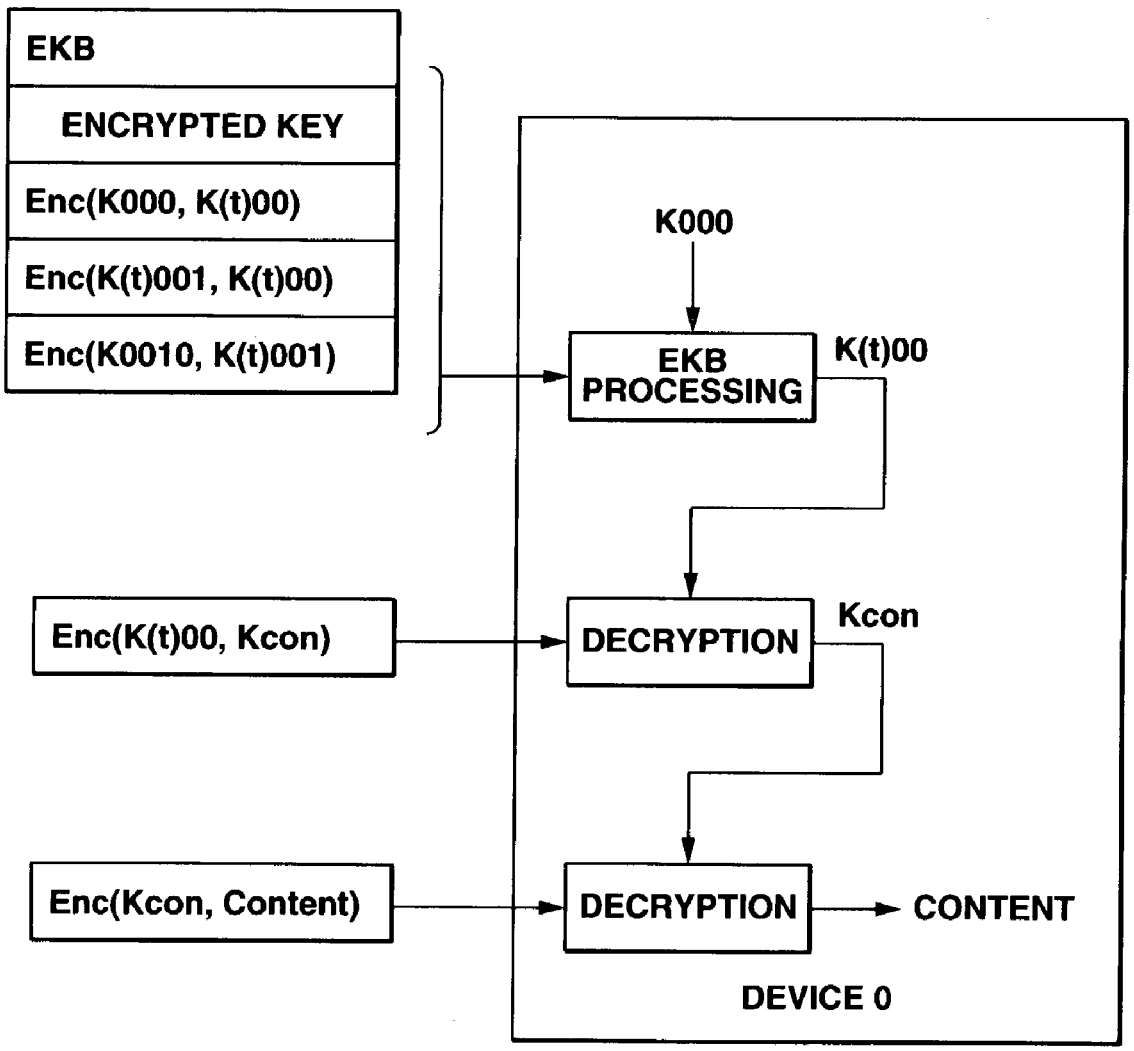
FIG. 9 is a view showing an example of processing in a device with respect to an enabling key block (EKB), content keys, and contents in the information processing system according to the present invention.

FIG. 9 shows an example where a content encryption key KEK is a renewal node key K(t)00 obtained by renewal of the node key K00 shown in FIG. 3. In this case, if in a group surrounded by the dotted line in FIG. 3, the device 3 is revoked, for example, due to the leak of a key, data having an enabling key bock (EKB) shown in FIG. 9 and data into which a content key (Kcon) is encrypted by a content key encryption key (KEK=K(t)00), and data into which a content is encrypted by a content key (Kcon) are distributed to members of the other groups, that is, devices 0, 1, 2 whereby the devices 0, 1 and 2 can obtain the content.

The right side in FIG. 9 shows the decrypting procedure in the device 0. The device 0, first, obtains a content key encryption key (KEK=K(t)00) from the received EKR by performing a decrypting process using a leaf key K000 held by itself. Then, the device 0 obtains a content key Kcon decrypted by the key K(t)00, and further carries out decrypting by the content key Kcon. The device 0 can use the content as a result of the above process. The devices 1, 2 are also able to obtain a content key encryption key (KEK=K(t)00) by processing the EKB in a similar fashion and are able to use the content similarly.

The devices 4, 5, 6 . . . of the other groups shown in FIG. 3 are not able to obtain a content key encryption key (KEK=K (t)00) using a leaf key and a node key held by themselves even if they receive the same EKB as mentioned above. The revoked device 3 is likewise not able to obtain the content key encryption key (KEK=K(t)00) by a leaf key and a node key, and only the device having the proper right is able to decrypt and use the content.

If the distribution of a content key making use of the EKB is used, in a manner as described, the encrypted content can be distributed safely to only valid users.

An enabling key block (EKB), a content key, an encrypted content or the like can be safely distributed through a network, but the enabling key block (EKB), the content key and the encrypted content can also be stored in a recording medium such as DVD, CD and provided to a user. In this case, content distribution can be further limited by a simple structure.

Figure 10:
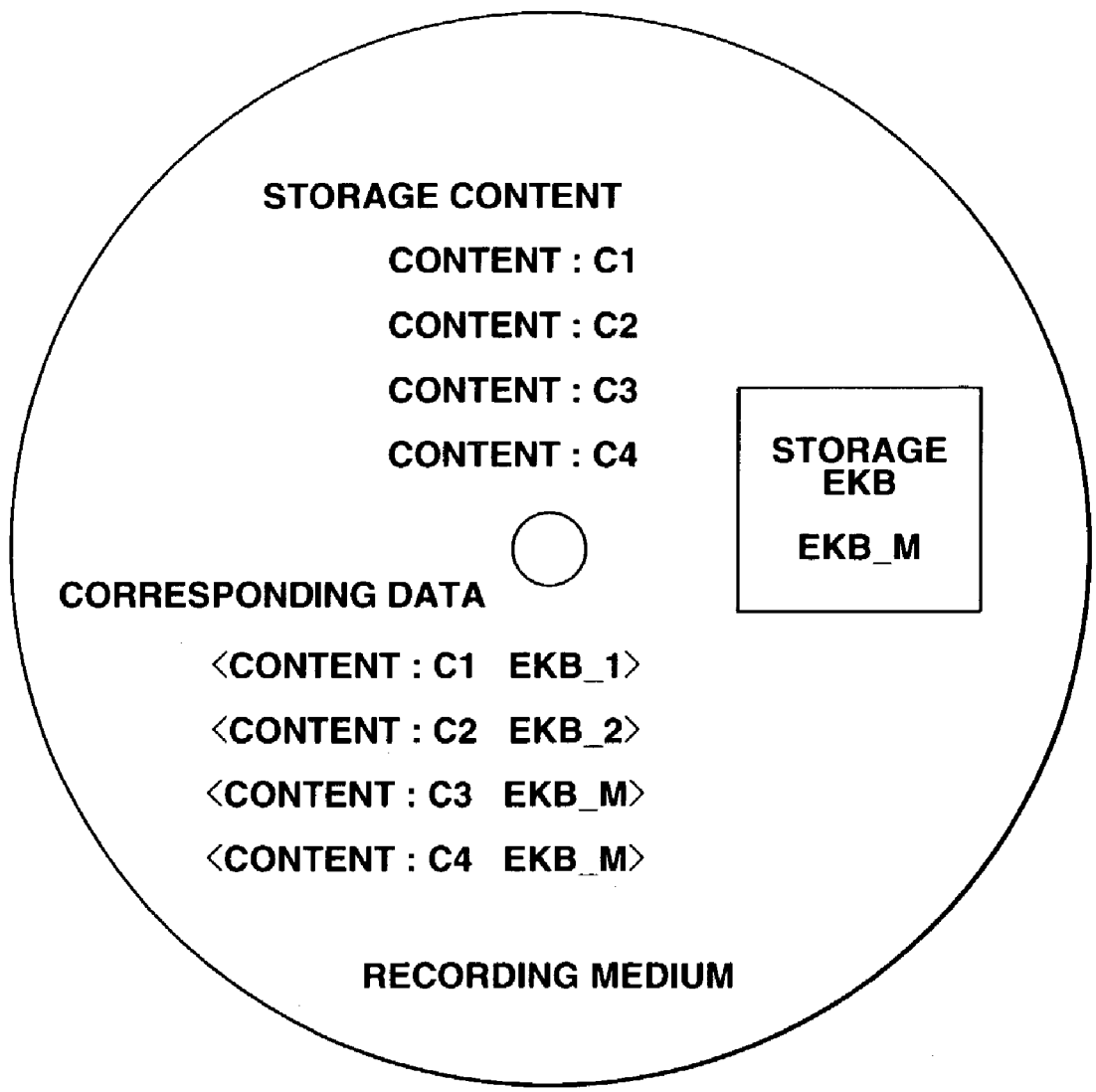
FIG. 10 is a view illustrating the case where an enabling key block (EKB) and contents are stored in the information processing system according to the present invention.

FIG. 10 shows an example of constitution in which an enabling key block (EKB) is stored together with an encrypted content in a recording medium. In the example shown in FIG. 10, stored in the recording medium are contents C1 to C4, data associating an enabling key block corresponding to each stored content, and an enabling key block of version M (EKB_M). For example, EKB_1 is used to produce a content key Kcon1 having a content C1 encrypted, and for example, EKB_2 is used to produce a content key Kcon2 having a content C2 encrypted. In this example, an enabling key block of version M (EKB_M) is stored in a recording medium. Since contents C3, C4 are placed in correspondence to the enabling key block (EKB_M), the contents C3, C4 can be obtained by decrypting the enabling key block (EKB_M). Since EKB_1, EKB_2 are not stored in the recording medium, it is necessary to obtain EKB_1, EKB_2 by new distribution means, for example, network distribution or distribution by a recording medium.

FIGS. 11A and 11B show a comparative example between a content key distribution using EKB and conventional content key distribution where a content key is circulated among a plurality of devices. FIG. 11A shows the conventional approach, and FIG. 11B shows an example making use of an enabling key block (EKB) according to the present invention. In FIGS. 11A and 11B, Ka (Kb) indicates data in which Kb is encrypted by Ka.

As shown in FIG. 11A, processing has been heretofore carried out in which validity of a data transmit-receiver is confirmed, authentication processing and authentication and key exchange (AKE) are executed between devices to co-own a session key, Kses, and a content key Kcon is encrypted by the session key, Kses, under the condition that the authentication is established to effect transmission.

For example, in the PC shown in FIG. 11A, it is possible to decrypt a content key, Kcon, encrypted by the session key, Kses, and further possible to encrypt Kcon by a stored key, Kstr, held by the PC itself to store, Kstr (Kcon) in its own memory.

In FIG. 11A, authentication processing as shown in FIG. 11A is executed so that content keys are encrypted by the respective session keys to effect distribution even where data is desired to be distributed in the form capable of being used for only a recording device 1101 shown in FIG. 11A. The PC or the reproducing device is likewise able to use a session key produced in the authentication process and co-owned to decrypt an encrypted content key.

On the other hand, in an example making use of an enabling key block (EKB) shown in FIG. 11B, an enabling key block (EKB), and data (Kroot (Kcon)) having a content key Kcon encrypted by a node key or a root key obtained by processing the enabling key block (EKB) are distributed from a content provider, whereby the content key Kcon can be decrypted and obtained only by the apparatus capable of processing the distributed EKB.

Accordingly, for example, the useable enabling key block (EKB) is produced only on the right end in FIG. 11B, and the enabling key block (EKB), and data having an encrypted content key Kcon are sent together whereby the PC, the reproducing apparatus or the like present cannot execute processing of the EKB by a leaf key or node key owned by itself. Accordingly, the useable content key can be distributed to only a valid device without executing processes such as authentication, the production of a session key, and the process for encrypting a content key Kcon by the session key as illustrated in FIG. 11A.

Where the useable content key is desired to be distributed to PC, a recording and reproducing unit also, an enabling key block (EKB) capable of being processed is produced and distributed to thereby obtain a common content key.

In the distribution of data used in the enabling key block (EKB) or a key described above, since an enabling key block (EKB) and a content or a content key which are transferred between devices always maintain the same encryption form, there is the possibility that an invalid copy is produced due to the so-called replay attack, which records a data transmission channel and transfers it again later. For preventing such an attack as described, there is an effective means for executing an authentication and key exchange process similar to those of the prior art between data transfer devices. Now, a description is made of an arrangement in which an authentication key, Kake, used when the authentication process and key exchange process are executed, is distributed to a device using the aforementioned enabling key block (EKB), whereby the authentication process is in conformity with a common key system having a common authentication key as a safe private key. That is, this is an example in which encrypted message data of the EKB is used as an authentication key.

Figure 12:
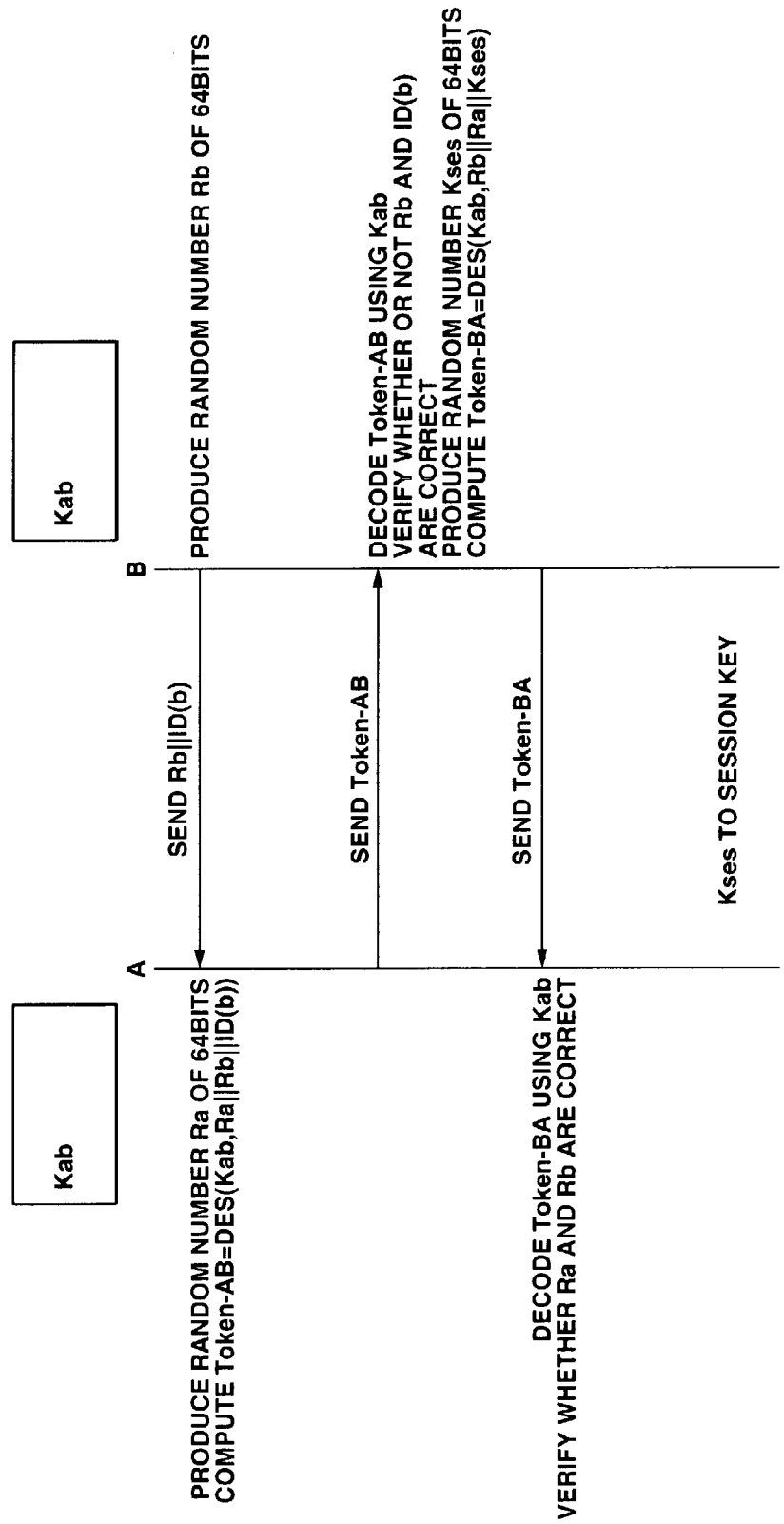
FIG. 12 is a view showing an authentication processing sequence according to an applicable common key encryption system in the information processing system according to the present invention.

FIG. 12 shows a mutual authentication method (ISO/IEC 9798-2) using a common key encryption system. While in FIG. 12, DES is used as the common key encryption system, other systems may be used as long as they are the common key encryption system. In FIG. 12, first, B produces the random number Rb of 64 bits, and Rb and ID (b), which is its own ID, are transmitted to A. A, which receives them, newly produces the random number Ra of 64 bits, and data (Ra, Rb, ID(b)) are encrypted using a key Kab in the CBC mode of DES and transmitted to B. The key Kab is a key to be stored in a recording element as a private key common to A and B. According to the encrypting processing by the key Kab using the CBC mode of DES, for example, an initial value and Ra are subjected to an exclusive OR; in the DES encryption part, the key Kab is used for encrypting to generate an encrypted text E1. The encrypted text E1 and Rb are subjected to an exclusive OR; in the DES encryption part, a key Kab is used for encrypting to generate encrypted text E2. The encrypted text E2 and ID (b) are subjected to an exclusive OR; and in the DES encryption part, a key Kab is used for encrypting to generate encrypted text (Token-AB). The token-AB [E1, E2, E3] is transmitted to B.

B decrypts the received token-AB, a key Kab (authentication key) likewise stored in a recording element as a common private key. First, B decrypts encrypted text E1 by authentication key Kab to obtain the random number Ra. Next, encrypted text E2 is decrypted by authentication key Kab, and the result therefrom and E1 are subjected to exclusive OR to obtain Rb. Finally, encrypted text E3 is decrypted by an authentication key Kab, and the result therefrom and E2 are subjected to exclusive OR to obtain ID (b). B authenticates that A is valid if Ra and ID (b) out of Ra, Rb and ID (b) thus obtained are coincided with the ones transmitted by B.

Next, B produces a session key (Kses) to be used after authentication (Producing method: To use the random number). Then, Rb, Ra and Kses are encrypted in that order using an authentication key Kab in the CBC mode of DES and are returned to A.

A, which received the above data, decrypts the received data by authentication key Kab. A decrypting method of the received data is similar to the decrypting process of B, which is therefore omitted in its detail. A authenticates that B is valid if Rb and Ra out of Rb, Ra and Kses thus obtained are coincided with the ones transmitted by A. When passed the authentication. After authentication, the session key, Kses, is used as a common key for secret communication after authentication.

Where invalidity is found when the received data are authenticated, processing is interrupted as a failure of mutual authentication.

In the above-described authentication process, A and B co-own a common authentication key Kab. The common authentication key Kab is distributed to a device using the enabling block key (EKB).

For example, with reference to FIG. 12, there may be employed the arrangement in which out of A or B, the other encrypts an authentication key Kab by an enabling key block (EKB) to transmit it to the other, or the arrangement in which a third party produces an enabling key bock (EKB) that can be used by both devices A and B for the devices A and B to encrypt an authentication key Kab by the enabling key block (EKB) to distribute it.

Figure 13:
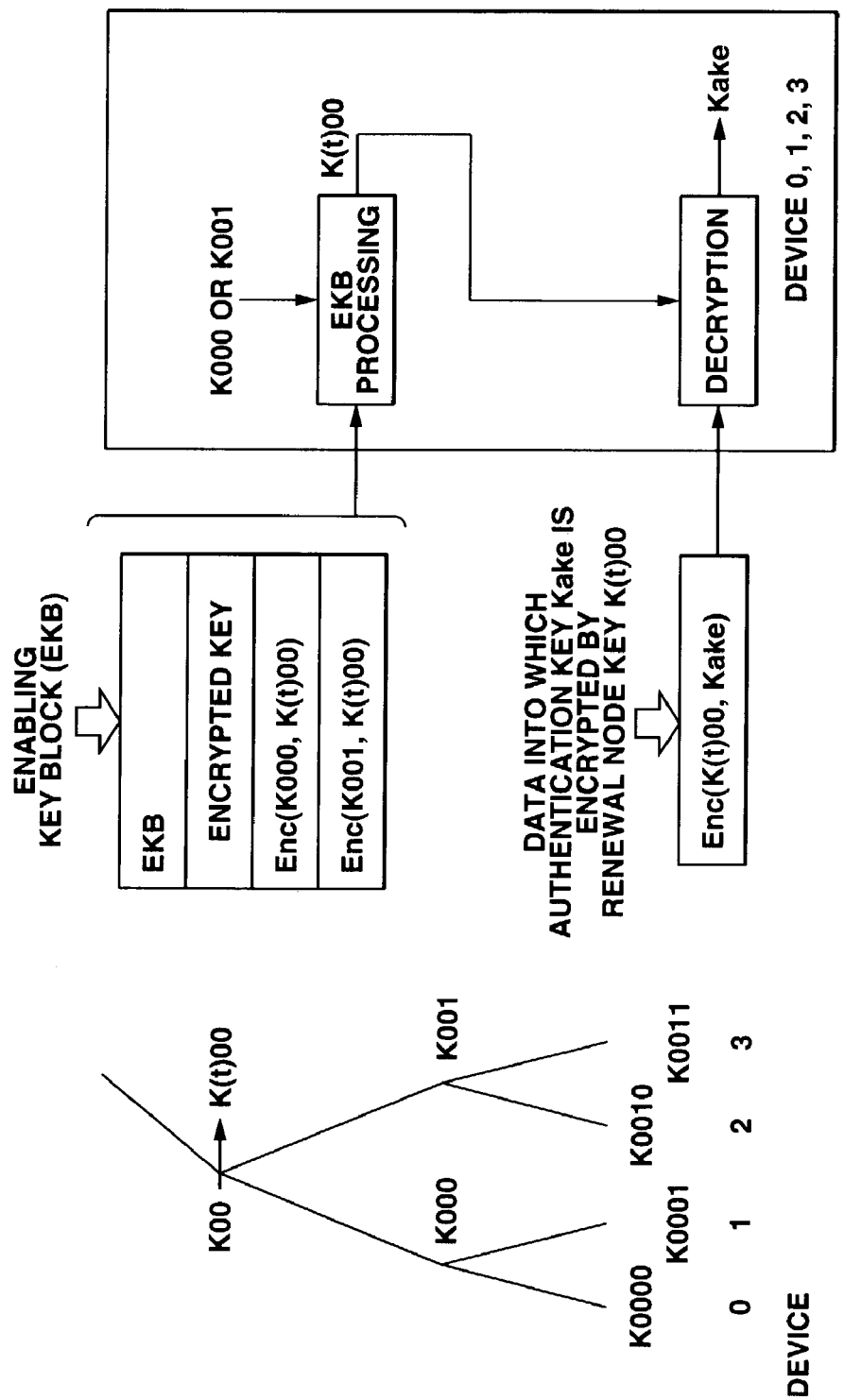
FIG. 13 is a view showing an enabling key block (EKB), data distribution with an authentication key, and processing by a device in the information processing system according to the present invention.
Figure 14:
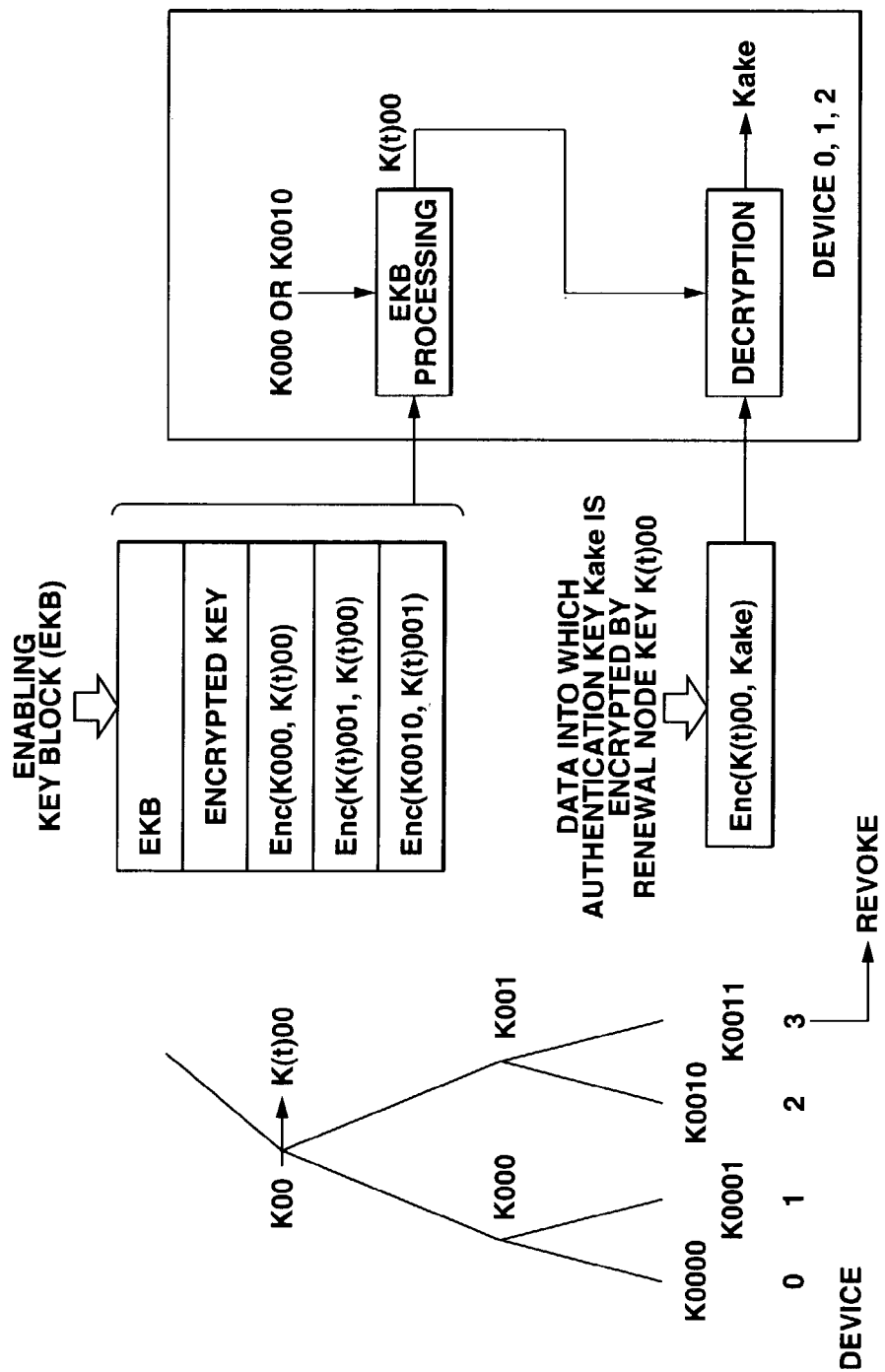
FIG. 14 is another view showing an enabling key block (EKB), data distribution with an authentication key, and processing by a device in the information processing system according to the present invention.

FIGS. 13 and 14 show examples in which an authentication key, Kake, common to a plurality of devices is distributed by an enabling key block (EKB). FIG. 13 shows an example in which a decodable authentication key, Kake, is distributed to devices 0, 1, 2 and 3, and FIG. 14 shows an example in which the device 3 out of the devices 0, 1, 2 and 3 is revoked to distribute a decodable authentication key to only the devices 0, 1 and 2.

In the example of FIG. 13, a node key K(t)00 is renewed using a node key and a leaf key in the devices 0, 1, 2, 3 by producing a decodable enabling key block (EKB), along with data (b) having an authentication key Kaka decrypted by the renewed node key K(t)00. First, the respective devices, as shown on the right side of FIG. 13, processes (decrypts) EKB to thereby obtain a renewed node key K(t)00, and then decrypts an authentication key: Enc(K(t)00, Kake) encrypted using the obtained node key K(t)00 to obtain the authentication key Kake.

In the other devices 4, 5, 6, 7..., even if the same enabling key block (EKB) is received, the node key K(t)00 renewed by processing EKB cannot be obtained, and therefore, an authentication key can be sent to only the valid device safely.

On the other hand, FIG. 14 shows an example in which the device 3 is revoked. A decodable enabling key block (EKB) is produced with respect to the only other members of the group, that is, the devices 0, 1 and 2 for distribution. Data having (a) an enabling key block (EKB) and (b) an authentication key (Kake) (encrypted by the node key (K(t)00)) are distributed.

On the right side of FIG. 14, the decrypting procedure is shown. First, the devices 0, 1 and 2 obtain an enabling node key (K(t)00) by performing a decrypting process using a leaf key or a node key owned by itself from the received enabling key block. Next, the devices obtain the authentication Key Kake by decrypting Enc(k(t)00,Kake).

The devices 4, 5, 6 . . . in the other group shown in FIG. 3 cannot obtain a renewal node key (K(t)00) using a leaf key and a node key owned by itself even if similar data (EKB) is received. Similarly, in the revoked device 3, the renewal node key (K(t)00) cannot be obtained by a leaf key and a node key owned by itself. Thus, only the device having a valid right is able to decrypt an authentication key for use.

If distribution of an authentication key making use of an EKB is used, only the valid right holder is able to distribute a decodable authentication key safely with less data quantity.

Figure 15:
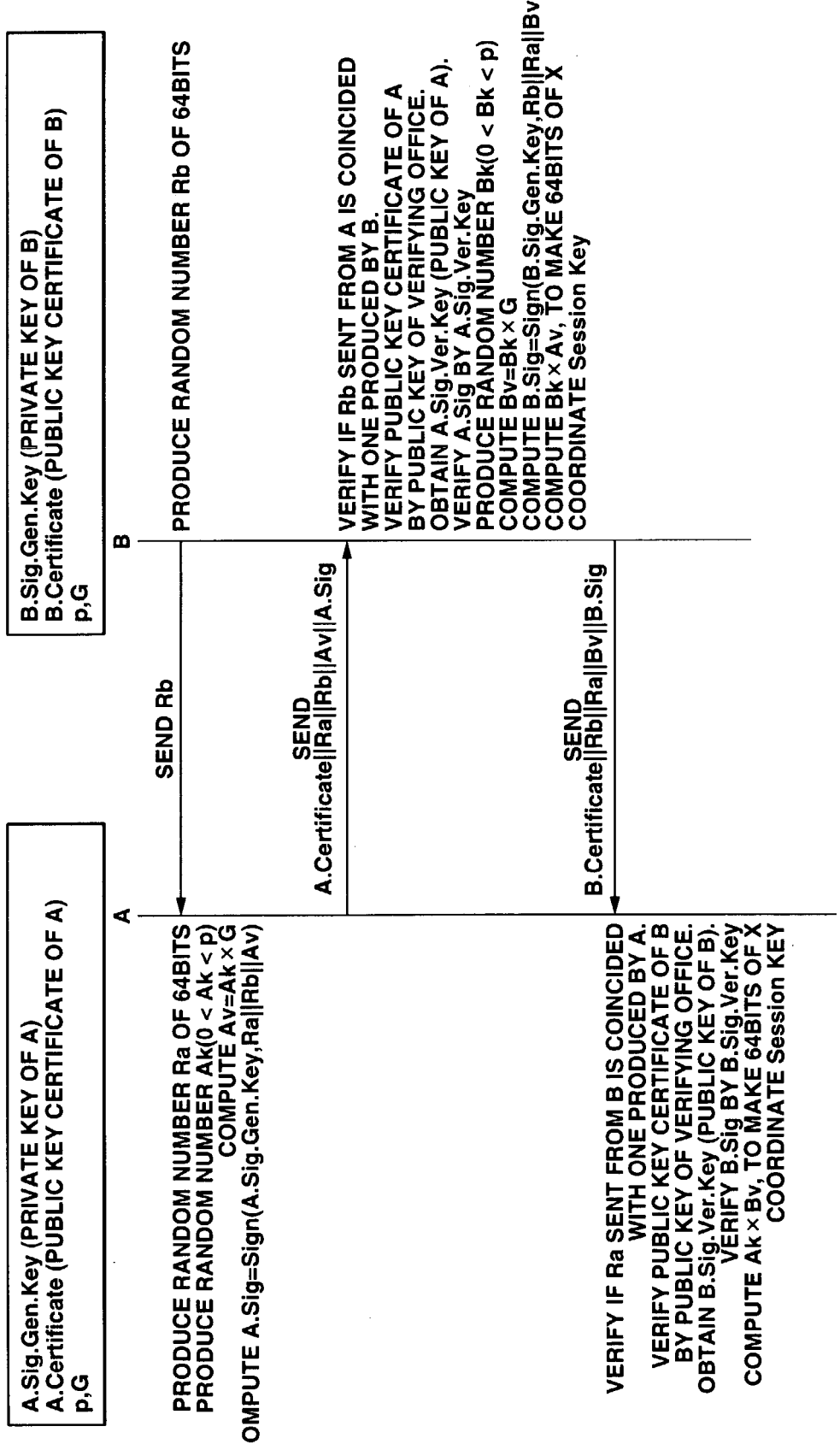
FIG. 15 is a view showing an authentication processing sequence by a public key encryption system applicable in the information processing system according to the present invention.

In the following, the distribution process of the content key using a public key authentication and an enabling key block (EKB) will be described. First, a mutual authentication method using an elliptic curve encryption of 160-bit length, which is a public key encryption system, will be described with reference to FIG. 15. In FIG. 15, ECC is used as the public key encryption system, but any system may be used as long as it is a public key encryption system similar thereto. Further, the key size need not be 160 bits. In FIG. 15, first, B produces the random number Rb of 64 bits to transmit it to A. A, which received it, newly produces the random number Ra of 64 bits, the random number Ak smaller than the prime number p, and a point Av=Ak×G is obtained (Av is 160 bit). An electronic signature A.Sig is produced with respect to Ra, Rb, Av (X coordinate and Y coordinate, each 64 bits), which is returned, along with a public certificate of A, to B. An electronic signature comprising up to 448 bits in total is produced.

B, which received the public key certificate, Ra, Rb, Av, and the electronic signature A.Sig, authenticates if Rb transmitted by A is the same as the one produced by B. As a result, when they are the same, an electronic signature within the public key certificate of A is authenticated by a public key of an authentication office to take out a public key of A. The electronic signature A.Sig is authenticated using the public key of A.

Next, B produces the random number Bk which is smaller than the prime number p. A point Bv=Bk×G is obtained to produce an electronic signature B.Sig with respect to Rb, Ra, Bv (X coordinate and Y coordinate), which is returned to A along with a public key certificate of B.

A, which received the public key certificate, Rb, Ra, Av, and the electronic signature B.Sig of B authenticates if Ra transmitted by B is coincided with the one produced by A. As a result, when they are the same, an electronic signature within the public key certificate of B is authenticated by a public key of an authentication office to take out a public key of B. The electronic signature B. Sig is authenticated using the public key of B. After the authentication of an electronic signature has been succeeded, A authenticates B to be valid.

Where both of them have succeeded in authentication, B computes Bk×Av (since Bk is the random number, but Av is the point on the elliptic curve, scalar-times computation at the point on the oval curve is necessary), and A computes Ak×Bv, and uses the lower 64 bits of the X coordinate of these points as a session key for use thereafter (where a common key encryption is of 64 bit key length). Of course, a session key may be produced from the Y coordinate, and the coordinate need not be the lower 64 bits. Something in the secret communication after mutual authentication the transmission data is not only encrypted by a session key but is also applied with an electronic signature.

Where in the authentication of an electronic signature or authentication of the received data, invalidity is found, processing is interrupted due to a failure of mutual authentication.

Figure 16:
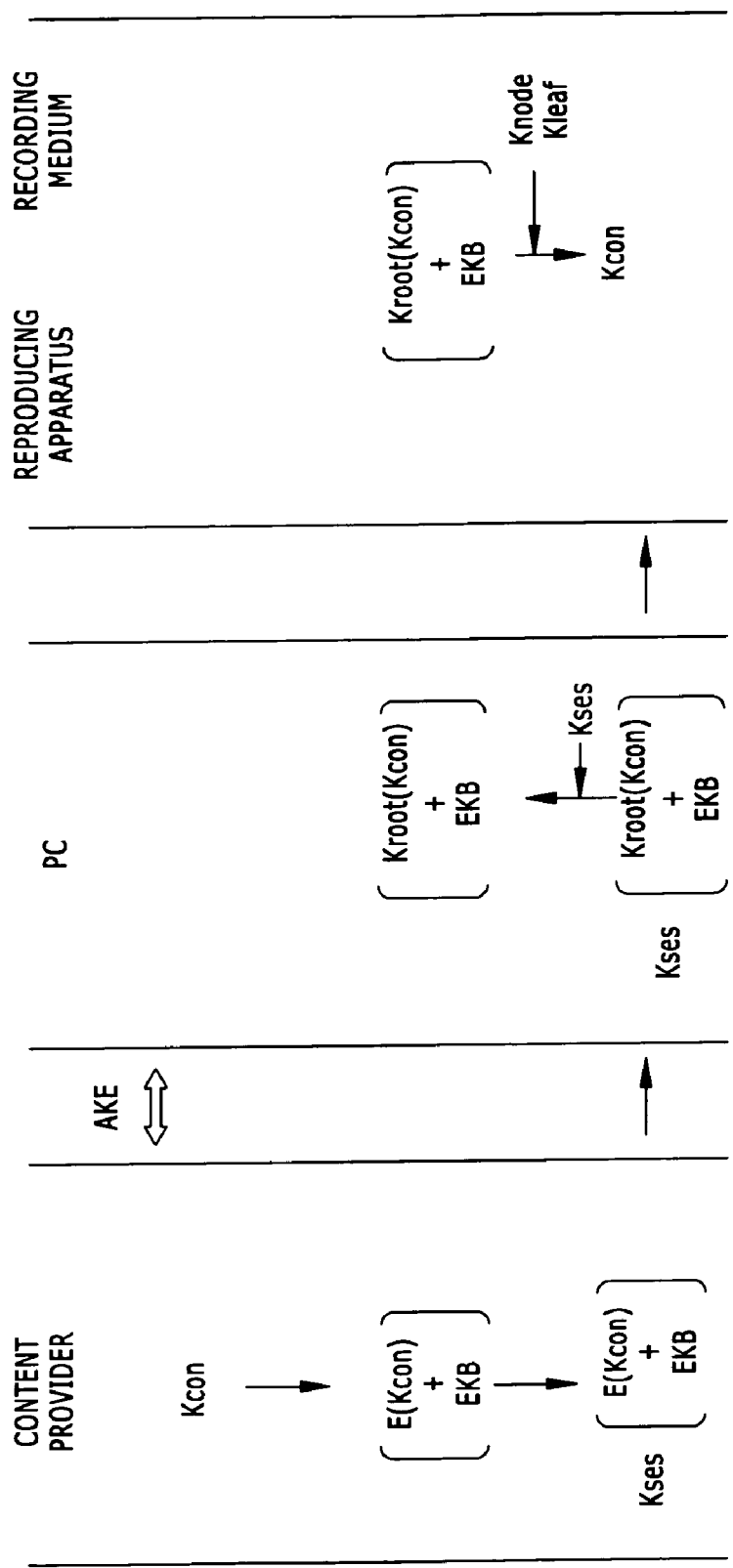
FIG. 16 is a view showing processing for distributing an enabling key block (EKB) and content keys using the authentication principle by a public key encryption system in the present invention.

FIG. 16 shows an example of a distribution process of content keys using a public key authentication and an enabling key block(EKB). First, the authentication process according to the public key system described above is executed between a content provider and a PC. The content provider produces a decodable EKB comprising a renewed node key and a content key encrypted with the renewable key (E(Kcon)). In addition, the EKB and E(Kcon) are encrypted using the session key Kses and transmitted to the PC.

The PC decrypts the received data using the session key, Kses and thereafter transmits it to a reproducing apparatus and a recording medium.

The reproducing apparatus and the recording medium receives the renewed key from the EKB as described earlier to further recover the content key, Kcon.

According to the above arrangement, since encrypted data using an EKB are transmitted under the condition of the authentication between a content provider and PC, for example, even in the case where a node key is leaked, positive data transmission to a mating party is enabled.

While in the above-described example, a description has been made of a method for encrypting a content key, an authentication key or the like using an enabling key block (EKB) to distribute it, an arrangement in which various program codes are distributed using an enabling key block (EKB) may be employed. That is, this is an example in which encrypted message data of an EKB is used as a program code.

Figure 17:
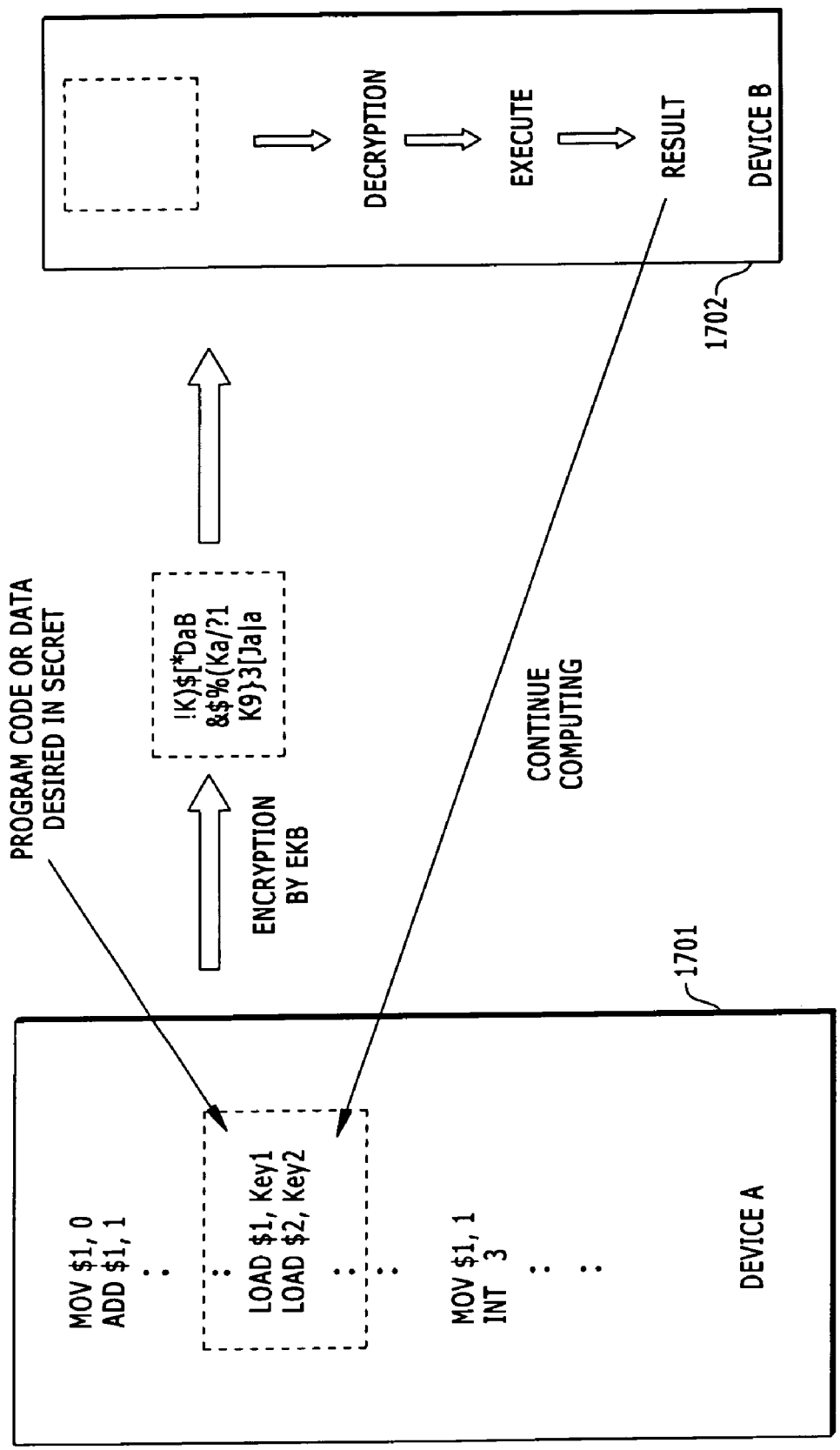
FIG. 17 is a view showing processing for distributing an enabling key block (EKB) and encrypted program data in the information processing system according to the present invention.

FIG. 17 shows an example in which a program code is encrypted by a renewal node key of an enabling key block (EKB) to transmit it between devices. A device 1701 transmits, to device 1702 an enabling key block (EKB) that can be decrypted by a node key and a leaf key of a device 1702, and a program code subjected to decrypting by a renewal node key contained in the enabling key block (EKB). The device 1702 processes the received EKB to obtain the renewal node key, and further executes decrypting of the program code by the obtained renewal node key.

In the example shown in FIG. 17, further, processing by the program code obtained in the device 1702 is executed to return the result to the device 1701, and the device 1701 further continues processing on the basis of the result.

As described above, the enabling key block (EKB) and the program code (subjected to decrypting processing by the renewal node key contained in the enabling key block (EKB)) are distributed whereby a program code capable of being decrypted in a specific device can be distributed to the specific device or the group shown in FIG. 3.

Next, a description will be made of the processing arrangement in which an integrity check value (ICV) is produced to correspond to the content. The presence or absence of the falsification of the content is judged by using the ICV.

The integrity check value (ICV) is, for example, computed using a hash function with respect to the content, and is computed by ICV=hash (Kicv, C1, C2, . . . ). Kicv is an ICV producing key. C1, C2 are content information. A message authentication code (MAC) of content information is also used.

Figure 18:
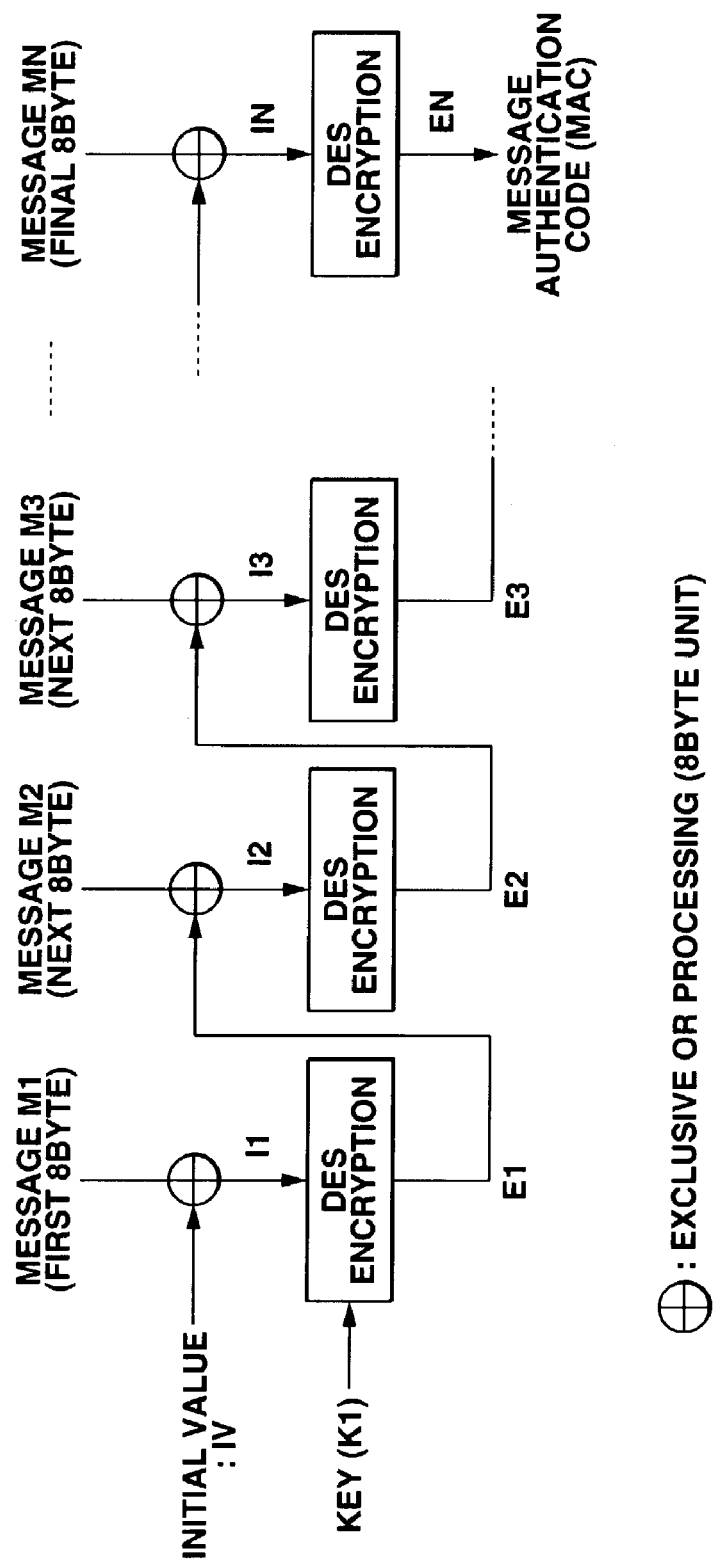
FIG. 18 is a view showing an example of MAC value production used in production of a content integrity check value (ICV) applicable in the present invention.

FIG. 18 shows an example for producing a MAC value using the DES encryption processing arrangement. As shown in FIG. 18, a message is divided into 8-bit units (hereinafter, the divided messages are M1, M2, . . . MN). First, the initial value (hereinafter, IV) and M1 are subjected to exclusive OR (the result of which is I1). Next, I1 is put into a DES encryption part to carry out encrypting using a key (hereinafter, K1) (the output is E1). Continuously, E1 and M2 are subjected to exclusive OR, the output of which, I2, is put into the DES encryption part, and is encrypted using the key 1 (the output E2). Thereafter, this procedure is repeated, and the encrypting processing applied to all of the messages. The last EN is the message authentication code (MAC).

The hash function is applied to the MAC value of the content and the ICV producing key to produce the integrity check value (ICV) of the content. An ICV produced for content for which no falsification is assured is compared with an ICV produced on the basis of new content. If the same ICV is obtained, the fact that the content is not falsified is assured, and if the ICVs are different, a judgment that falsification is present can be made.

Next, an arrangement in which the Kicv is sent by the enabling key block will be described. That is, this is an example in which encrypted message data of an EKB is an integrity check value (ICV) producing key.

Figure 19:
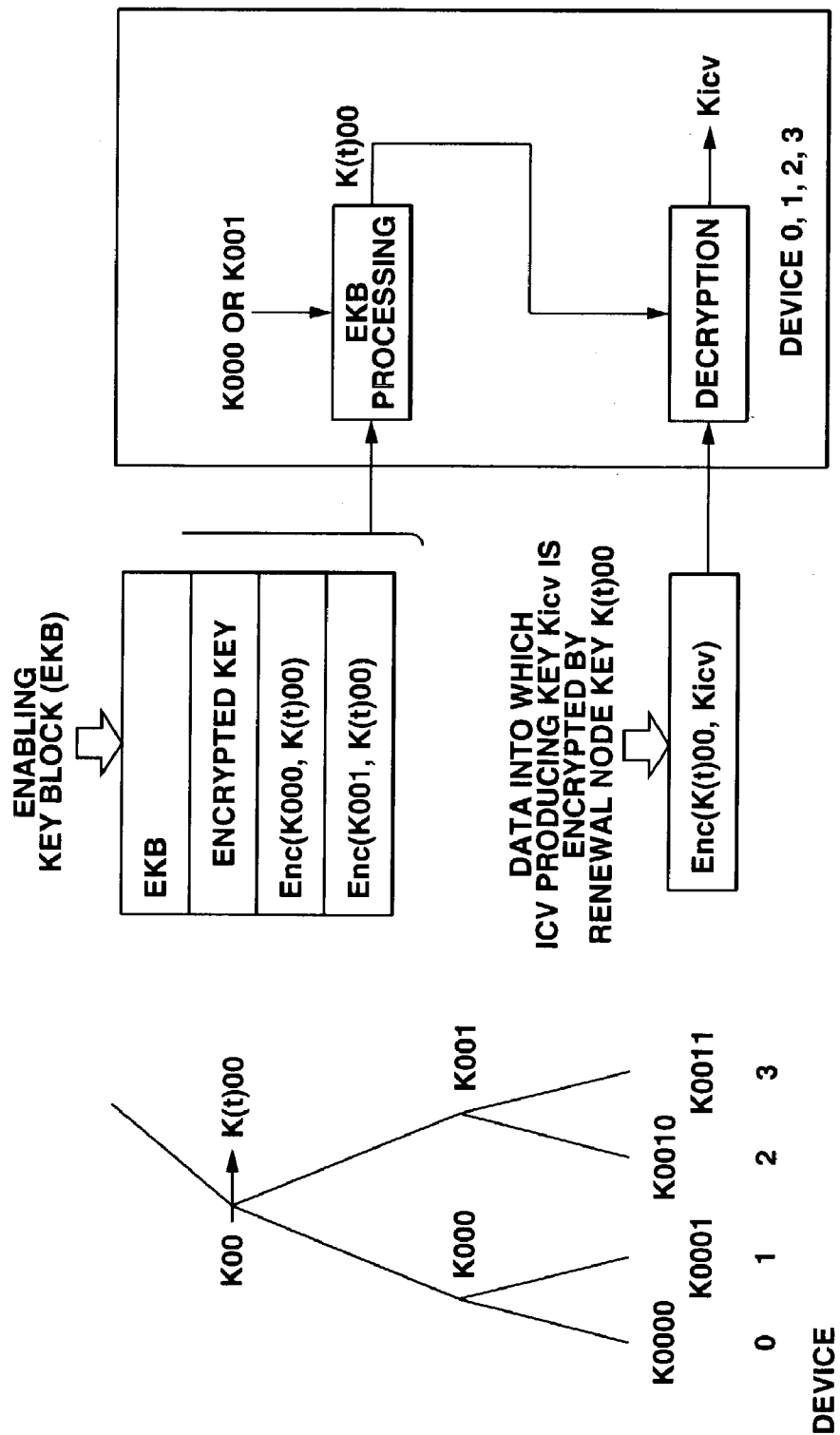
FIG. 19 is a view showing distribution of an enabling key block (EKB) and an ICV producing key, and illustrating processing in a device in the information processing system according to the present invention.
Figure 20:
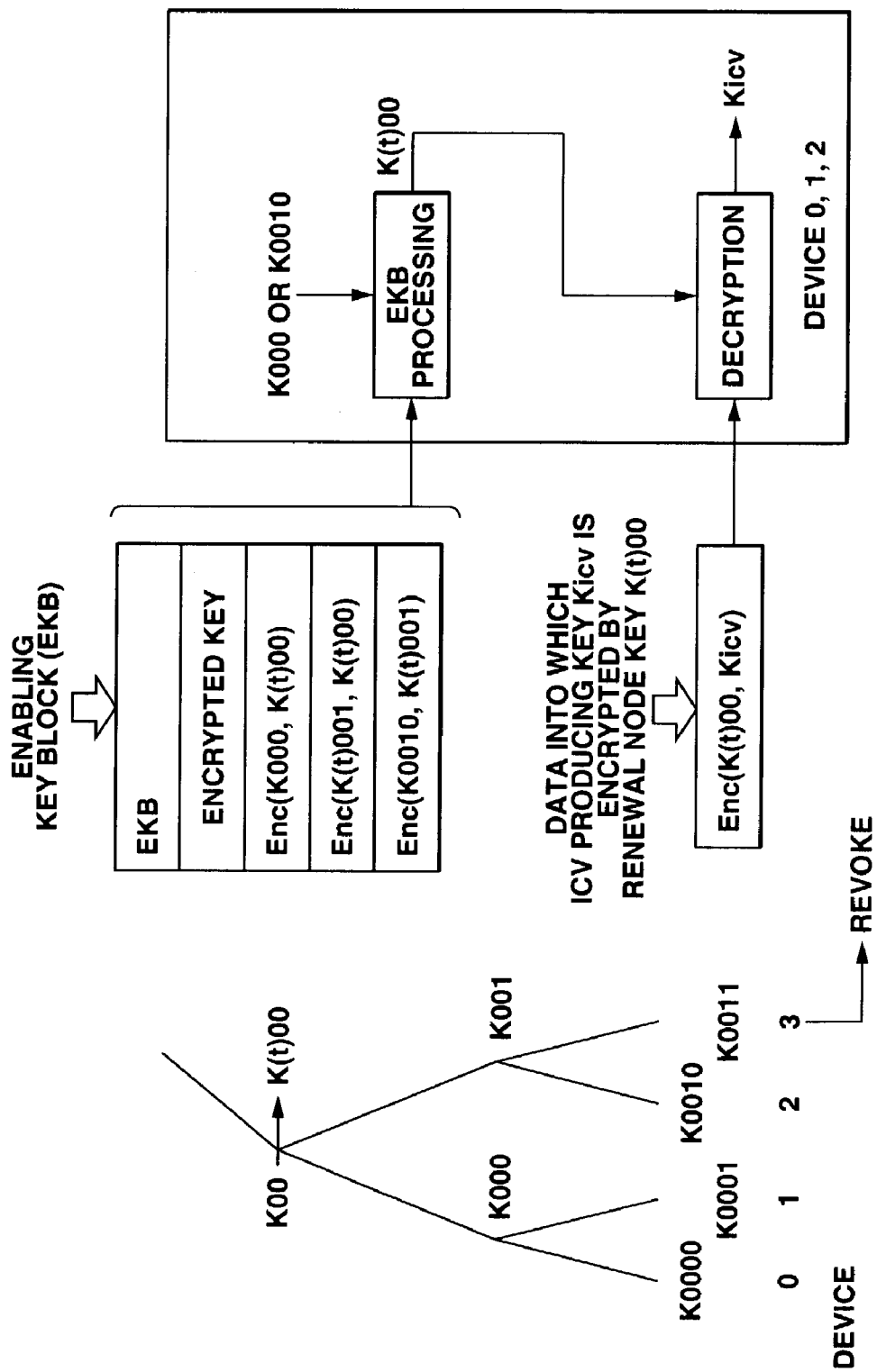
FIG. 20 is another view showing distribution of an enabling key block (EKB) and an ICV producing key, and illustrative processing in a device in the information processing system according to the present invention.

FIG. 19 and FIG. 20 show examples in which (where contents common to a plurality of devices are sent) an integrity check value producing key Kicv is distributed by the enabling key block (EKB). FIG. 19 shows an example in which the Kicv is distributed to devices 0, 1, 2 and 3, and FIG. 20 shows an example in which the device 3 is revoked, and the Kicv is distributed to only the devices 0, 1 and 2.

In the example of FIG. 19, a node key K(t)00 (renewed using a node key and a leaf key owned by the devices 0, 1, 2 and 3) along with data (b) having a Kicv encrypted by the renewed node key K(t)00 are distributed by producing a decodable enabling key block (EKB). As shown on the right side in FIG. 19, the respective devices first process (decrypt) the EKB to thereby obtain the renewed node key K(t)00, and subsequently decrypt a check value producing key: Enc(K(t) 00, Kicv) encrypted using the obtained renewed node key K(t)00 to obtain the check value producing key Kicv.

Since other devices 4, 5, 6, 7 . . . cannot obtain the renewed node key K(t)00 by processing the EKB by a node key and a leaf key owned by themselves even if the same enabling key block (EKB) is received, the check value producing key, Kicv, can be safely sent to only valid devices.

On the other hand, FIG. 20 is an example in which as a device 3 is, for example, revoked by leak of a key, in a group surrounded by the dotted frame of FIG. 3. A decodable enabling key block (EKB) is produced for distribution, with respect to the only other members of the group, that is, the devices 0, 1 and 2. Data having (a) an enabling key block (EKB) and (b) a check value producing key (Kicv) shown in FIG. 20 encrypted by the renewed node key (K(t)00) are distributed.

On the right side of FIG. 20, the decrypting procedure is shown. First, the devices 0, 1 and 2 obtain the renewed node key (K(t)00) by performing a decrypting process using a leaf key or a node key owned by itself from the received enabling key block. Next, the devices obtain a check value producing key, Kicv, by decrypting Enc (K(t)00, Kicv).

The devices 4, 5, 6 . . . outside the group shown in FIG. 3 cannot obtain the renewed node key (K(t)00) using a leaf key and a node key owned by themselves even if similar data (EKB) is received. Similarly, also in the revoked device 3, the renewed node key (K(t)00) cannot be obtained by a leaf key and a node key owned by itself. Only a device having a valid right is able to decrypt an authentication key for use.

If distribution of a check value reproducing key making use of an EKB is used, only a valid right holder is able to distribute a decodable check value producing key safely, and with less data overhead.

By using the integrity check value (ICV) of contents as described above, it is possible to eliminate invalid copies of an EKB and encrypted contents. For example, as shown in FIGS. 21A and 21B, there is a medium 0.1 in which a content C1 and a content C2 are stored along with an enabling key block (EKB) that is capable of providing content keys. The content C1 and C2 along with the associated EKB, are copied to a medium 2 without modification. The copied content can be used in a device capable of decrypting the associated EKBs.

However, in FIG. 21B there is provided an arrangement in which integrity check values (ICV (C1, C2)) are also stored corresponding to stored contents. The notation (ICV (C1, C2)) is representative of ICV=hash (Kicv, C1, C2) in which an integrity check value is computed using the hash function on the content C1 and the content C2. As shown in FIG. 21B, a content 1 and a content 2 are stored in the medium 1, and integrity check values (ICV (C1, C2)) produced on the basis of the content C1 and the content C2 are stored. Further, a content 1 is properly stored in the medium 2, and an integrity check values (ICV (C1)) produced on the basis of the content C1 is stored therein. In this example it is assumed, that (EKB, content 2) stored in the medium 1 is to be copied to the medium 2. In this process a content check value is newly produced, ICV (C1, C2). This is obviously different from the value of Kicv (C1) already stored in the medium 2. In the reproducing device media, ICV checking is executed prior to actually copying (EKB, content 2) to medium 2 and a judgment is made if the produced ICV and the stored ICV are the same. In this example, the ICVS are not the same and no copying occurs. If the ICVS had been identical, the copying would be permitted.

Furthermore, there can be provided an arrangement for enhancing safety, in which the integrity check value (ICV) of the contents is produced on the basis of data including a counter value. That is, ICV=hash (Kicv, counter+1, C1, C2, . . . ). Here, a counter (counter+1) is incremented for every rewrite. It is necessary to store the counter value in a secure memory.

Further, in an arrangement, in which the integrity check value (ICV) of the contents cannot be stored in the same medium as the contents, the integrity check value (ICV) of the contents is stored in a separate medium.

For example, where contents are stored in media for which no measures are taken to prevent copies (such as a read only memory or normal MO), there is the possibility that when the integrity check value (ICV) is stored in the same medium, rewriting of the ICV is done by an invalid user, thus failing to safely maintain the original ICV. In such a case, there can be provided an arrangement in which an ICV is safely stored in a medium on a host machine, and the ICV is used for copy control (for example, check-in/check-out, move), to thereby enable management of the ICV and checking for falsification of contents.

Figure 22:
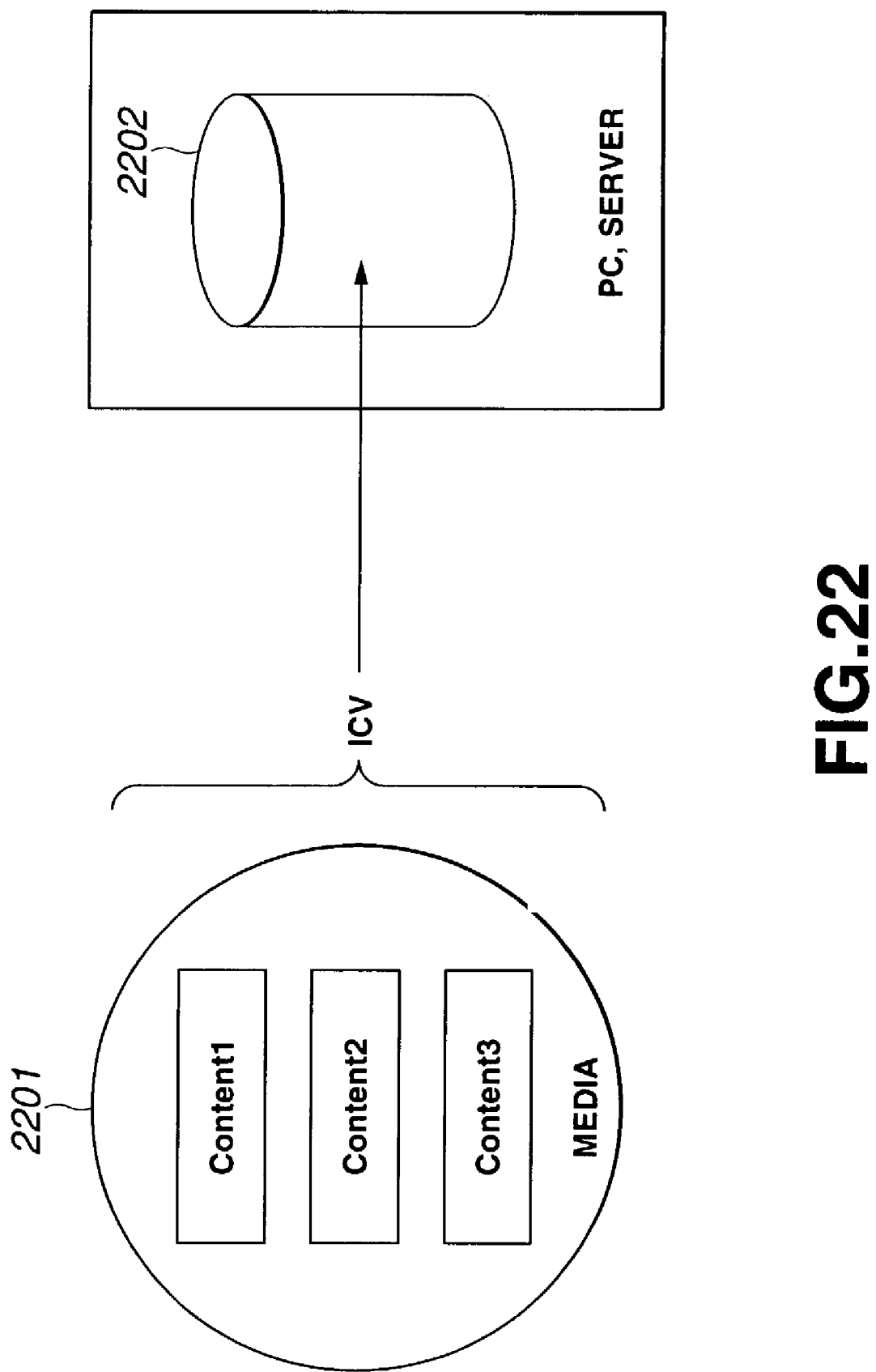
FIG. 22 is a view for illustrating the control of an applicable content integrity check value (ICV) separately from a content storage medium in the present invention.

The above arrangement is shown in FIG. 22. In FIG. 22, contents are stored in a medium 2201, which takes no measures for preventing copying such as read only media or normal MO. The integrity check values (ICV) in connection with these contents are stored in a safe media 2202 on a host machine to which a user is not allowed to get access to prevent invalid rewriting of the integrity check value (ICV) by the user. If, a device on which media 2201 is mounted executes reproducing of the media 2201, a PC or a server, which is a host machine, check the ICV to judge the propriety of reproducing. Thus, reproducing of an invalid copy can be prevented.

As described above, encrypted data (e.g., a content key, an authentication key, an ICV producing key or a program code, data or the like) are encrypted along with an enabling key block and are distributed. The EKB comprise keys representing node keys and leaf keys of a hierarchical tree structure as shown in FIG. 3. Now a a description will be made of an arrangement in which the node and leaves of a hierarchical tree structure are associated with categories.

Figure 23:
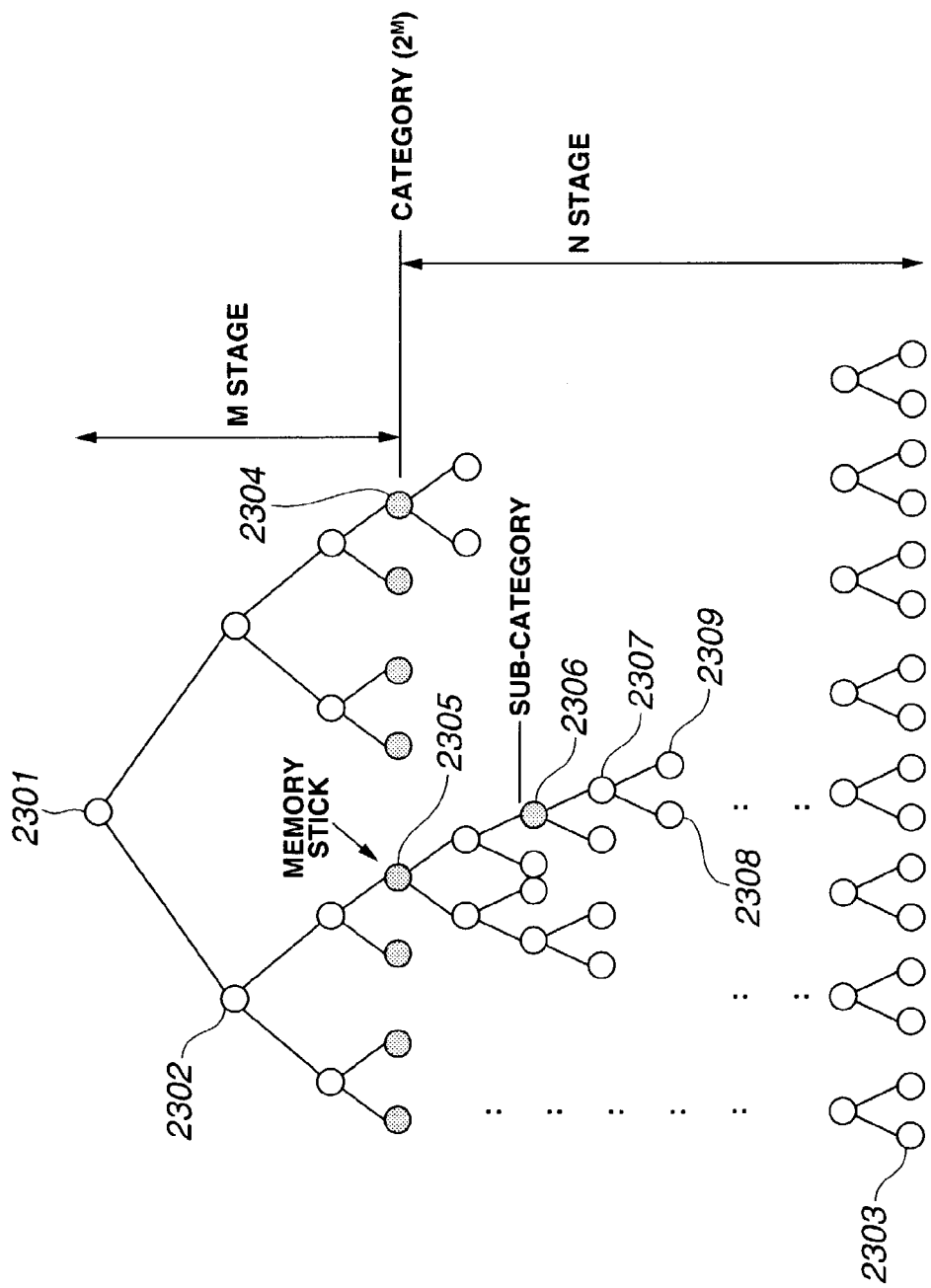
FIG. 23 is a view illustrating a hierarchical tree structure in the information processing system of the present invention.

FIG. 23 shows one example of a category classification scheme for a hierarchical tree structure. In FIG. 23, a root key Kroot 2301 is set on the uppermost stage of the hierarchical tree structure, a node key 2302 is set in the intermediate stage, and a leaf key 2303 is set in the lowest stage. Each device holds a respective individual leaf key, and a series of node keys from the leaf key to a root key, and the root key.

In this example, each of nodes on the M stage is set as a device setting node of a specific category. Nodes and leaves lower than the M+1 stage are taken as nodes and leaves in connection with devices contained in the category thereof with one node in the M stage as a top.

For example, a category [Memory stick (trademark)] is set to node 2305 in the M stage of FIG. 23. As a result, nodes and leaves lower than node 2305 are now set as nodes or leaves containing various devices using the memory stick.

Further, a stage at a level below several stages from the M stage can be set as a sub-category. For example, node 2306 is set as a node of [Reproducing exclusive-use unit], a sub-category node contained in the category of the device using the memory stick. Node 2306 is two stages below the category [memory stick] as shown in the figure. Further, a node 2307 associated with a telephone with a music reproducing function would now be contained in the category associated with node 2306 (the reproducing exclusive-use unit) as a sub-category node. Similarly, a [PHS] node 2308 and a [Portable telephone] node 2309 under node 2307 would now be contained in the category of the telephone with a music reproducing function.

Further, the category and sub-categories can be set not only with the kind of devices, but also represents device independent categories. For example, as makers, a content provider, a settlement organization or the like, (these will be generally called entity). For example, if one category node is set as a game machine XYZ exclusive-use top node (sold by game machine makers), a node key and a leaf key in the lower stage below the top node can be stored in any actual sold game machine XYZ. After which, distribution of encrypted contents, or distribution of various keys, and renewal processing are distributed through an enabling key block (EKB) comprising node keys and leaf keys below the top node key. Thus, data can be distributed only for use by the devices below the top node.

An arrangement can also be provided in which the node below a set top node is defined as an associated node of the category or sub-categories defined, whereby makers, a content provider or the controlling top node in the category stage or sub-category stage independently produce an enabling key block. The EKB can be distributed to the devices belonging to those below the top node, and key renewal can be executed without affecting devices belonging to nodes of other categories not belonging to the top node.

Figure 24A:
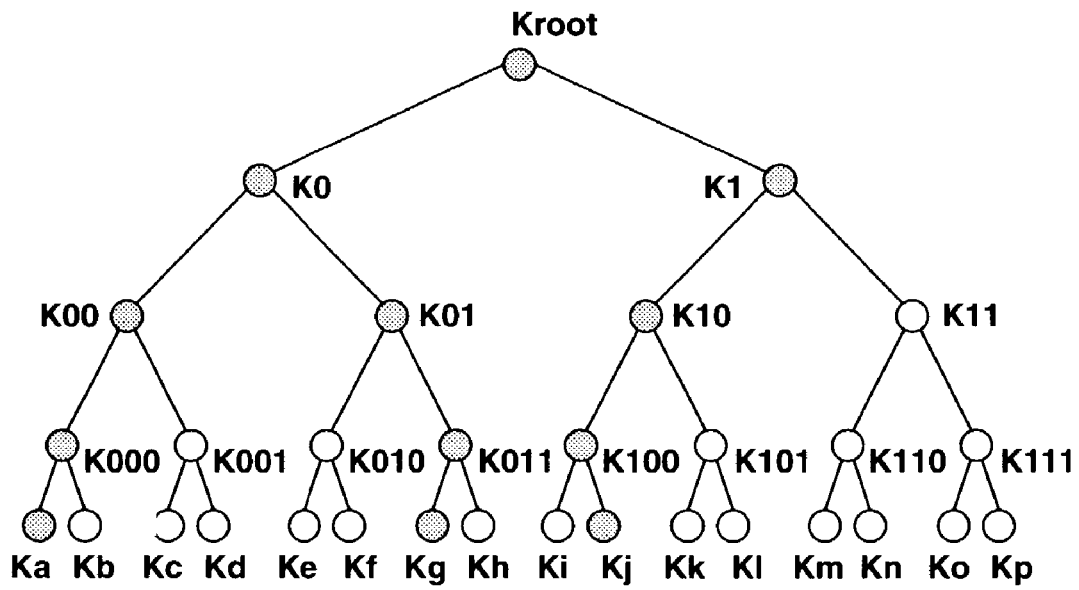
FIGS. 24A and 24B are views for use in explaining the production of a simplified enabling key block (EKB) in the information processing system of the present invention.

For example, in the tree structure shown in FIG. 24A, a key, for example, a content key, is to be transmitted to devices a, g, j [associated with leaf nodes Ka, Kg and Kj]. In this regard, a decodable enabling key block (EKB) is produced in the nodes Ka, Kg and Kj and distributed.

Figure 24B:
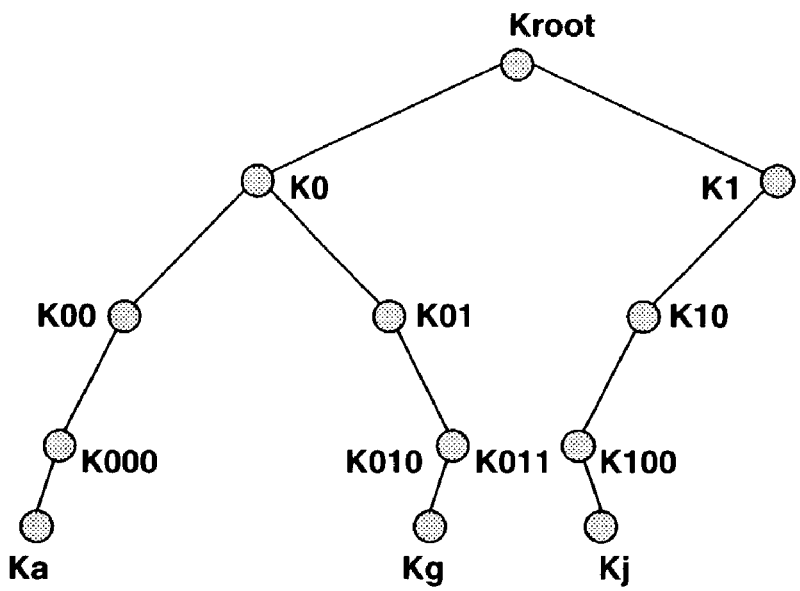

It is also contemplated that, for example, a content key, K(t)con, is subjected to encrypting processing by a renewal root key, K(t)root, to distribute it along with EKB. In this case, the devices a, g, j execute processing to decrypt the received EKB using a leaf key and a node key shown in FIG. 24B to obtain the renewed K(t)root. Once the latter is obtained, each device decrypts Enc (K(t)00, K(t)con to obtain the content key.

Figures 25A, 25B:
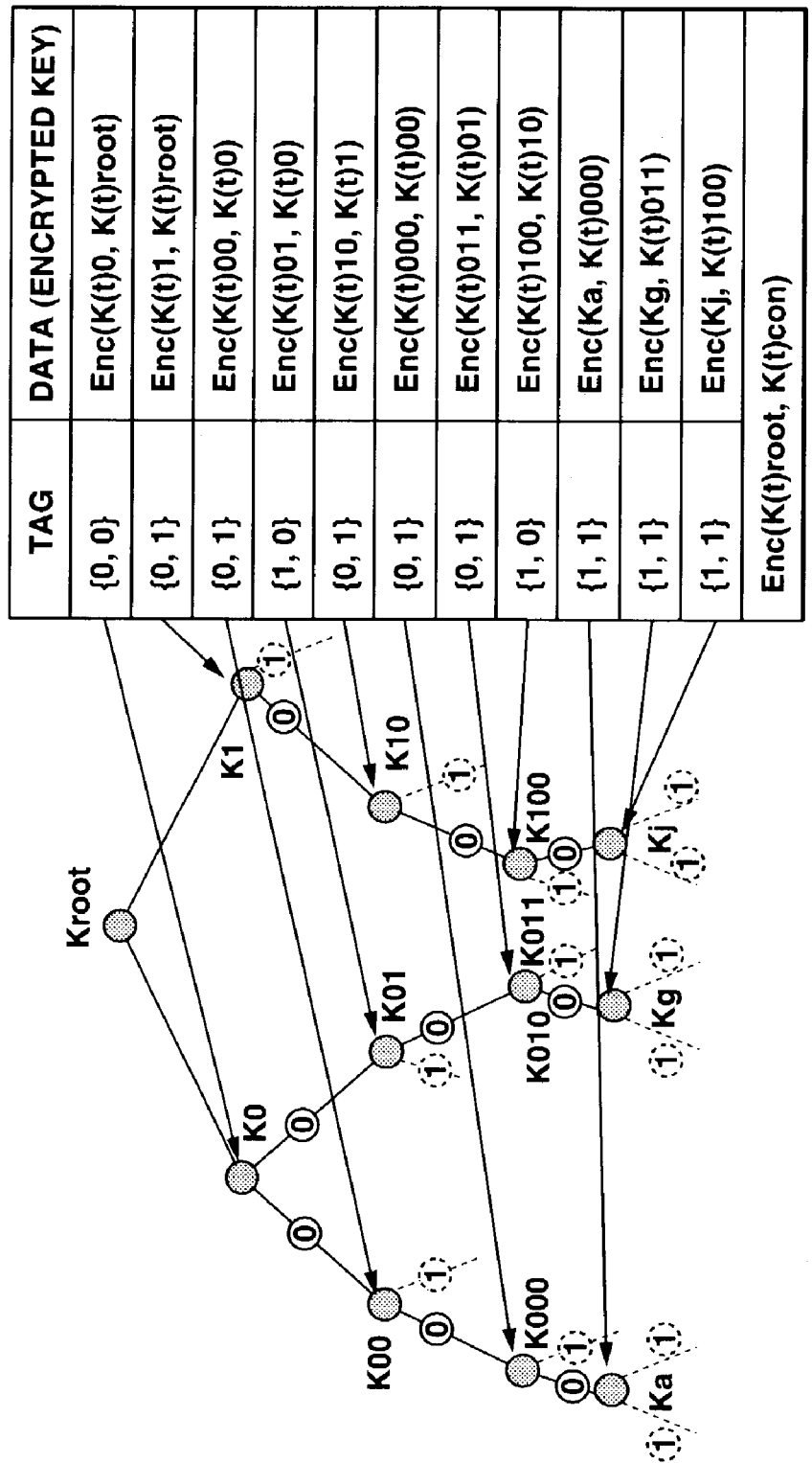
FIGS. 25A and 25B are views for use in explaining the production of an enabling key block (EKB) in the information processing system of the present invention.

The arrangement of the enabling key block (EKB) provided in this case is as shown in FIG. 25. The format of the enabling key block EKB shown in FIG. 25 is in accordance with the format of the enabling key block (EKB) explained previously with reference to FIG. 6.

As described before, a device which receives the enabling key block (EKB) sequentially executes decrypting process of the encrypted keys on the basis of an encrypted key of the enabling key block (EKB) and the tag to obtain a renewal key of an upper node. As can be observed from FIG. 25, in the enabling key block (EKB), the more the number of stages (depth) from a root to a leaf of a tree, the larger the depth. In addition, the number of stages (depth) increases according to the number of devices (leaf). Thus, the size of an EKB further increases.

An arrangement for reducing the size of an enabling key block (EKB) will be described below. FIGS. 26A and 26B show an example in which the enabling key block (EKB) is simplified according to the key distribution device.

Similar to the example of FIG. 25, a key, for example, a content key is transmitted to devices a, g, j associated with respective leaf nodes. As shown in FIG. 26A, a new simplified tree is constructed, based on the tree structure shown in FIG. 24B. No branch is present from Kroot to Kj—so only one branch will suffice, and from K root to Ka and Kg, a 2-branch arrangement is constructed merely by having a branch point at K0.

The enabling key block (EKB) for the renewal key distribution is produced on the basis of this simplified tree. The tree shown in FIG. 26A is a re-constructed hierarchical tree that omits unnecessary nodes.

The enabling key block (EKB) described previously with reference to FIG. 25 stores data having all keys from leaf a, g, j to Kroot, but the simplified EKB stores encrypted data with respect to only the nodes of the simplified tree. As shown in FIG. 26B, the tag has a 3-bit structure. A first bit and a second bit have meaning similar to that of the example of FIG. 25, in which if data are present in the directions of left (L) and right (R), it indicates 0, and if not, 1. A third bit is a bit for indicating whether or not an encrypted key is contained in the EKB, and if data is stored, 1 appears, and if not, 0 appears.

Thus, an enabling key block (EKB) provided for a device (leaf) stored in a data communication network or a memory medium is considerably reduced in size as shown in FIG. 26B, as compared with the EKB shown in FIG. 25. Each device which receives the enabling key block (EKB) shown in FIGS. 26A and 26B sequentially decrypts only data in a portion where 1 is stored in the third bit of the tag. For example, the device a decrypts Enc(Ka, K(t)0) by a leaf key Ka to obtain a node key K(t)0, and decrypts encrypted data Enc(K(t)0, K(t)root) by a node key K(t)0 to obtain K(t)root. The device j decrypts encrypted data Enc(Kj, K(t)root) by a leaf key Kj to obtain K(t)root.

As described above, the enabling key block (EKB) is produced using only a simplified new tree to thereby enable producing an enabling key block (EKR) with less size, whereby the data distribution of the enabling key block (EKB) can be executed efficiently.

An arrangement will now be described in which the enabling key block (EKB) produced on the basis of the simplified tree shown in FIGS. 26A and 26B are further simplified to enable a further reduction of EKB size and allow for more efficient processing.

As described above, with reference to FIGS. 26A and 26B a simplified tree is constructed by omitting unnecessary nodes. The structure of the enabling key block (EKB) for distributing a renewal key is based on this simplified tree.

The simplified hierarchical tree shown in FIG. 26A distributes the enabling key block (EKB) shown in FIG. 26B to enable devices a, g and j to obtain the renewal root key Kroot. In processing the enabling key block (EKB) of FIG. 26B, the device j is possible to obtain the root key, K(T)root, by a one time decrypting process of Enc(Kj, K(t)root). However, the device a and g obtain K(t)0 by first decrypting Enc(Kg, K(t)0), and then decrypting Enc(K(t)0, K(t)root) to finally obtain the root key K(t)root. That is, devices a and g execute the decrypting process twice.

In the simplified, hierarchical tree of FIGS. 26A and 26B, where the node K0 executes its own control as a control node of lower leaves Ka and Kg, for example, node K0 executes control as a sub-root node. It may be effective to confirm that the devices a and g obtained the renewal key. However, where the node K0 does not carry out control of the lower leaf, or where even if the control is carried out, distribution of a renewal key from an upper node is allowed, the simplified tree shown in FIG. 26A may be further simplified to omit the key of node K0.

Figures 27A, 27B:
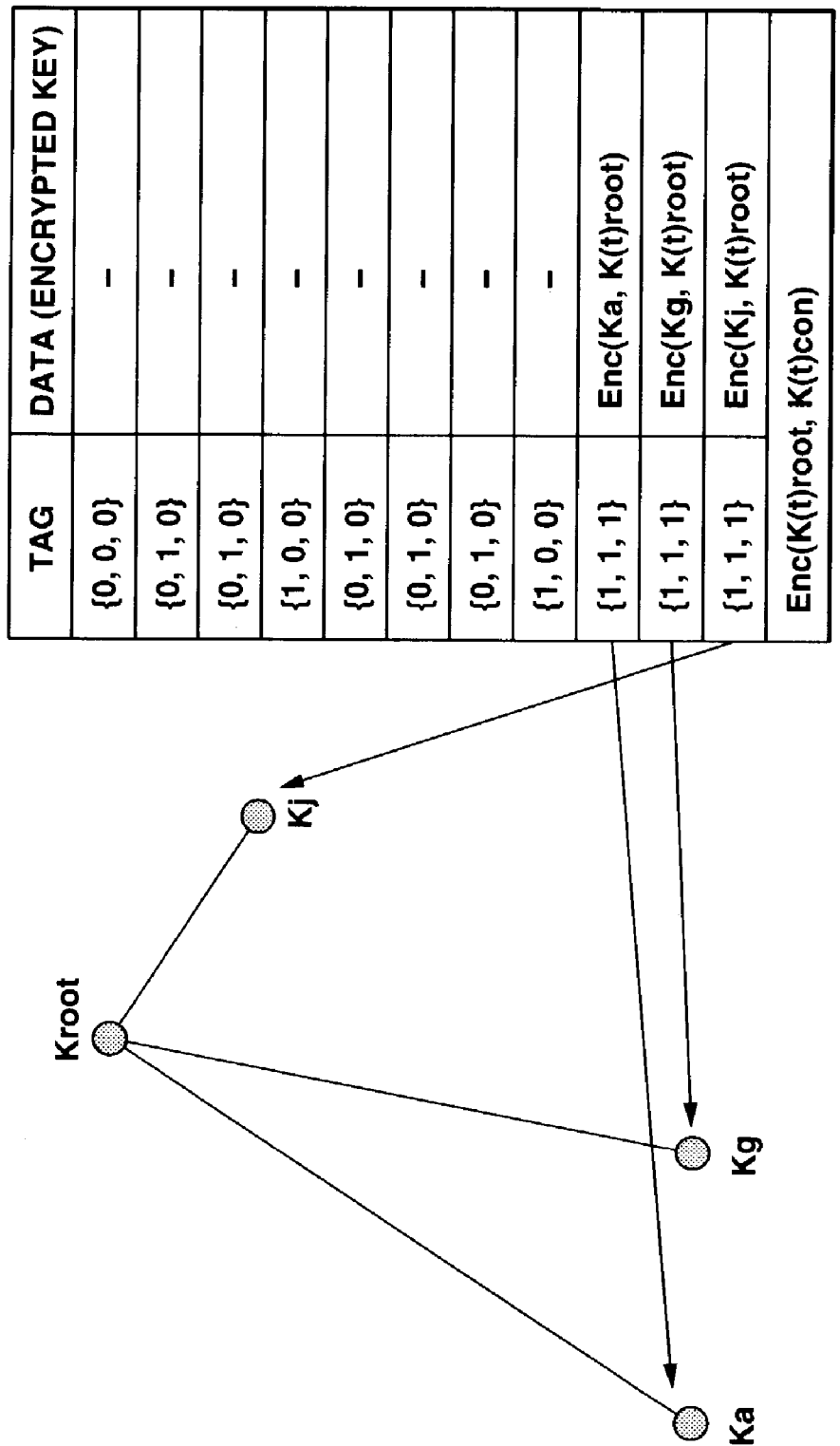
FIGS. 27A and 27B are additional views for use in explaining a simplified enabling key block (EKB) in the information processing system of the present invention.

FIGS. 27A and 27B show the further simplified tree and a structure of the resulting enabling key block (EKB), respectively. It is again assumed a key, for example, a content key, is transmitted to the devices a, g and j. As shown in FIG. 27A, a simplified tree is constructed in which a root Kroot and leaf nodes Ka, Kg and Kj are connected directly.

As shown in FIG. 27A, a further simplified tree with the node K0 omitted from the re-constructed hierarchical tree shown in FIG. 26A is produced. The enabling key block (EKB) for distributing a renewal key is produced on the basis of this simplified tree. The tree shown in FIG. 27A is re-constructed merely for directly connecting a decodable leaf and a root. The enabling key block (EKB) for distributing a renewal key is formed on the basis of a key corresponding to a leaf of the re-constructed hierarchical tree.

Although the example of FIG. 27A is an example of the arrangement in which a terminal is a leaf, it is possible, in the case of distributing keys to the uppermost node or a plurality of middle and lower nodes, to produce the enabling key block (EKB) on the basis of the simplified tree in which the uppermost node and the middle and lower nodes are directly connected to execute key distribution. As described above, the simplified tree has a structure in which a top node is directly connected to a terminal node or leaf node. In the simplified tree, it is possible to structure it as a tree having not only two branches from the top node, but a multi-branch arrangement of not less than three branches according to the number of distribution nodes or leaves.

As described above, the enabling key block (EKB) of FIG. 25 comprises encrypted data for all keys from each leaf Ka, Kg and Kj to Kroot. In contrast, the enabling key block (EKB) based on the simplified hierarchical tree shown in FIG. 27A omits a key of node K0, and therefore, the size of the enabling key block (EKB) of FIG. 27B is smaller than that shown in FIG. 25B.

The enabling key block (EKB) shown in FIG. 27B has a tag of 3 bits similar to the enabling key block (EKB) shown in FIG. 26B. In the first and the second bits, if data are present in the directions of left (L) and right (R), it indicates 0, and if not, a 1. A third bit is for indicating whether or not an encrypted key is stored within the EKB, and where data is stored, a 1 appears, and if not, a 0 appears.

In the enabling key block (EKB) of FIG. 27B, each device a, g and j may obtain a root key K(t)root by a one-time decrypting process of Enc(Ka, K(t)root), or Enc(Kg, K(t)root) Enc(Kj, K(t)root).

As described above, the enabling key block (EKB) produced on the basis of a simplified tree in which the uppermost node is directly connected to a terminal node or a leaf node are formed on the basis of only the key corresponding to the top node and the terminal node or the leaf node of the simplified tree.

As described above, the size of an EKB can be reduced by using a simplified tree as shown in either FIGS. 26A and 26B or FIGS. 27A and 27B.

The simplified hierarchical tree structure can be utilized effectively, particularly in the EKB control arrangement in an entity unit described below. An entity is a gathering block of a plurality of nodes or leaves of a tree. The entity is set as the gathering set according to the kind of devices, or set as the gathering of a variety of forms such as a processing unit, a control unit, or a service providing unit having a common point such as control units of a device providing maker, a content provider, a settlement organization or the like. Devices classified into categories are gathered in a single entity. For example, a simplified tree similar to that described above is re-constructed by a top node (sub-roots) of a plurality of entities to produce an EKB thereby. This makes it possible to produce and distribute the decodable simplified enabling key block (EKB) belonging to the selected entity. The control structure of the entity unit will be described in detail later.

Such an enabling key block (EKB) as described above can be stored in an information recording medium such as an optical disk, DVD or the like. For example, an information recording medium stores an EKB and encrypted message data encrypted by a renewal node key that is stored in an enabling key bock (EKB). The EKB comprises the aforementioned encrypted key data and a tag part as position discrimination data for the associated hierarchical tree structure. A destination device sequentially extracts and decrypts the encrypted key data contained in the stored enabling key block (EKB) in accordance with the discrimination data of the tag part. Of course, there can be employed an arrangement in which the enabling key block (EKB) is distributed through a network such as an internet.

Next, a description will be made of an arrangement in which a node or a leaf of a tree is controlled by a block as a gathering of a plurality of nodes or leaves. The block as the gathering of a plurality of nodes or leaves will be hereinafter called an "entity." The entity is set as the gathering set according to the kind of devices or as the gathering of various forms such as a processing unit, a jurisdiction unit or a service providing unit having a common point such as device providing makers, a content provider or a settlement organization.

The entity will be described with reference to FIGS. 28A to 28C. FIG. 28A is a view for explaining the control arrangement of an entity unit of a tree. One entity is shown as a triangle in the figure. For example, a plurality of nodes are contained in one entity 2701. FIG. 28B shows the node structure within the entity 2701. The entity 2701 comprises a plurality of 2-branch type trees with one node as a top. The top node 2702 of entity 2701 will be hereinafter called a sub-root.

The terminal of the tree are represented by leaves as shown in FIG. 28C. Each terminal is a device. The device belongs to any entity of a tree having a top node which is a sub-root.

As can be observed from FIG. 28A, an entity has a hierarchical structure. This hierarchical structure will be described with reference to FIGS. 29A to 29C.

Figure 29A:
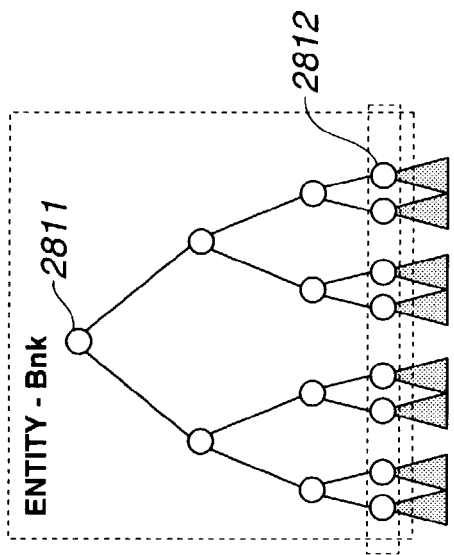
FIGS. 29A to 29C are views for use in explaining, in detail, entity control in the information processing system of the present invention.
Figure 29B:
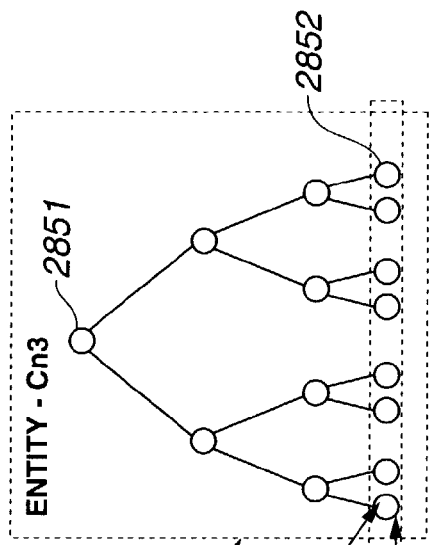

FIG. 29A is a view for explaining the hierarchical structure in a simplified form. Entities A01 to Ann are several stages below Kroot, entities B01 to Bnk are set below the entities A1 to An, and entities C1 to Cnq are set thereunder. Each entity has a tree shape comprising nodes and leaves, as shown in FIGS. 29B and 29C.

For example, the arrangement of the entity Bnk has a plurality of nodes to a terminal node 2812, and a sub-root 2811 as a top node. This entity has a discriminator Bnk, and the entity Bnk independently executes node key control corresponding to a node within the entity Bnk to thereby execute control of a lower (child) entity set with the terminal node 2812 as the top node. On the other hand, the entity Bnk is under the (host) entity Ann wherein the sub-root 2811 is a terminal node of entity Ann.

Figure 29C:
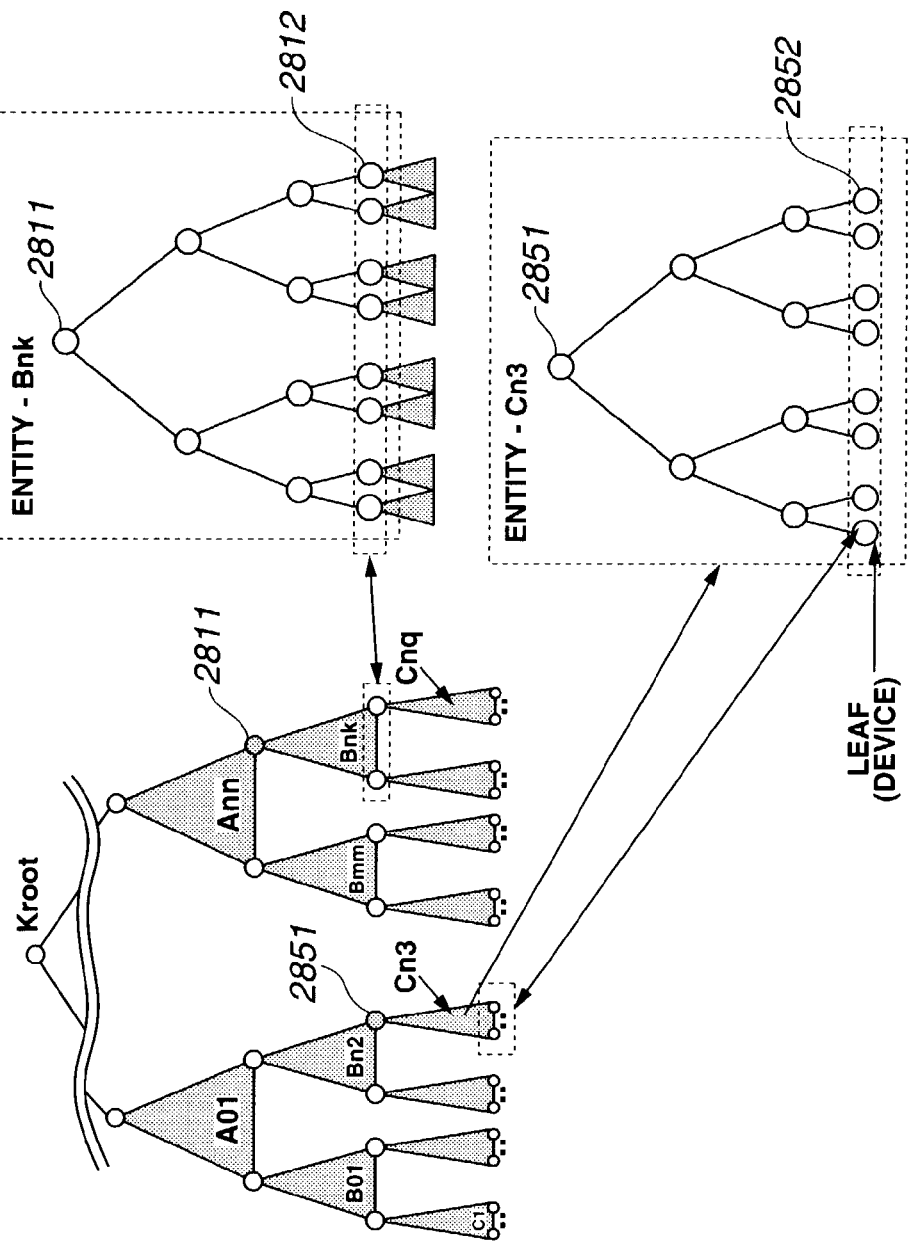

The arrangement of entity Cn3 has a plurality of nodes and leaves as shown in FIG. 29C of which node 2852 is a terminal node and sub-root 2851 is a top node. This entity has a discriminator Cn3, the entity Cn3 independently executes control of a node key and a leaf key within the entity Cn3 to thereby execute control of a leaf (device) corresponding to the terminal node 2852. On the other hand, the entity Cn3 is under the (host) entity Bn2, wherein the sub-root 2851 is a terminal node thereof. The key control in each entity is, for example, a key renewing process, a revoke process and the like, which will be described in detail later.

A device, which is a leaf of the lowest entity, stores a node key of each node and a corresponding leaf key positioned in a pass from the leaf key of the device to a sub-root node, which is a top node of the entity to which the device belongs. For example, the device of the terminal node 2852 stores keys from the terminal node (leaf) 2852 to the sub-root node 2851.

An entity will be further described with reference to FIGS. 30A and 30B. The entity is able to have a tree structure having by a variety of stage numbers. The stage number, that is, the depth, can be set according to the number of child entities corresponding to the terminal node (or leaf node (device)) controlled by the entity.

Figure 30B:
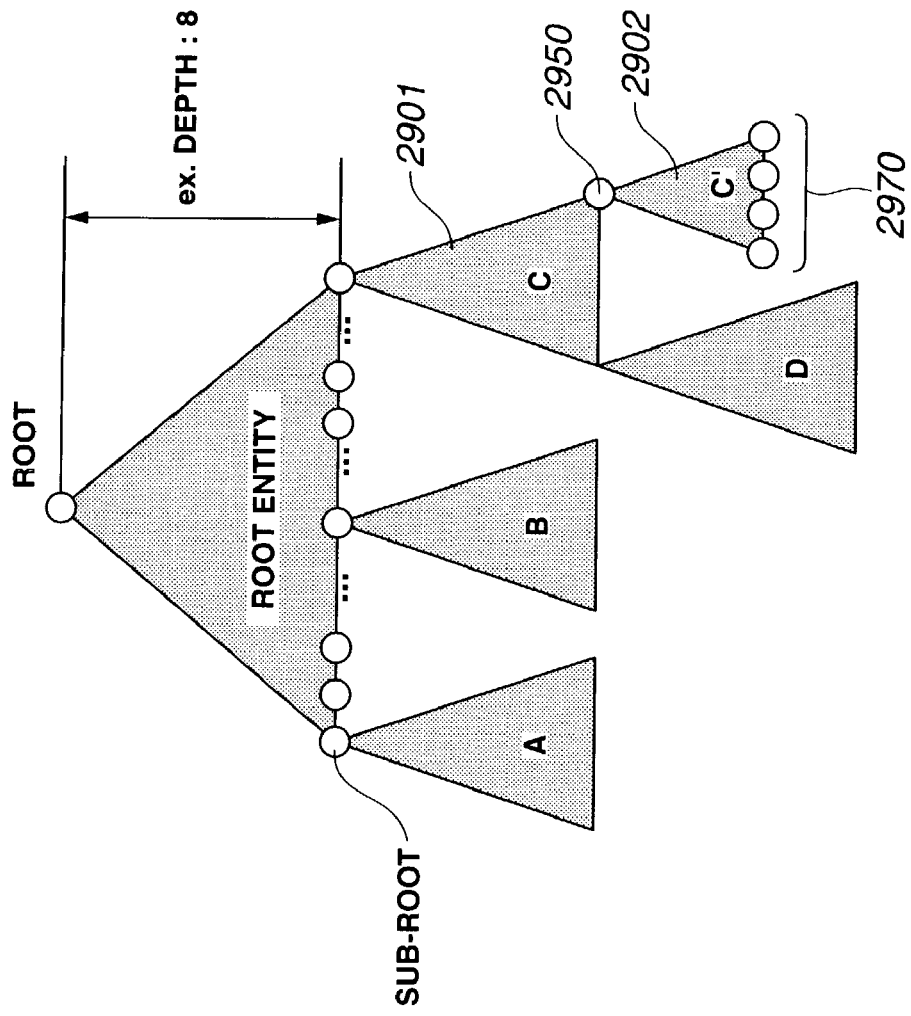
FIGS. 30A and 30B are additional views for use in explaining entity control in the information processing system of the present invention.
Figure 30A:
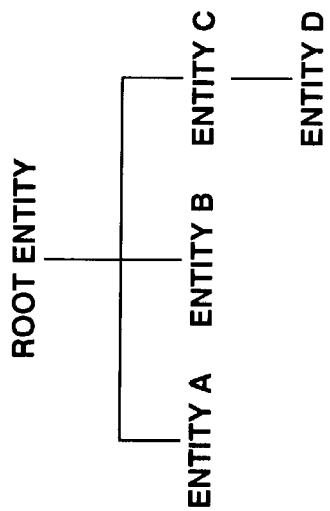

An arrangement of host and child entities is shown in FIG. 30A and FIG. 30B, The root entity is an entity in the uppermost stage having a root key. Entities A, B, C are set as a plurality of child entities in the terminal node of the root entity, and an entity D is set as a child entity of entity C. An entity (e.g., C2901) has not less than one terminal node as a sub-node (e.g., node 2950). Entity control may be increased. For example, an entity C'2902 having plural stages of trees is newly installed with a reserve node 2950 as a top node to thereby provide control of terminal nodes 2970. As can be observed, and a child entity can be added to a terminal node.

Figure 31:
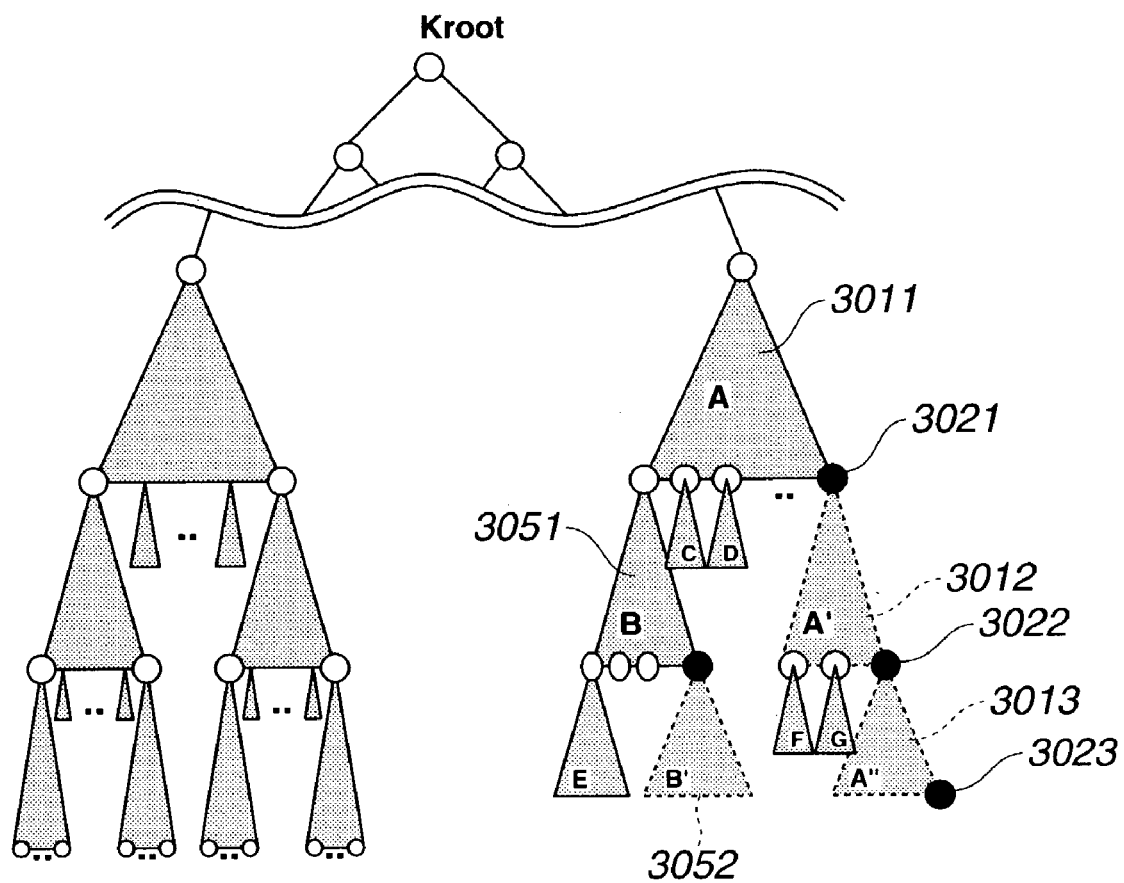
FIG. 31 is a view for use in explaining a reserve node of a hierarchical tree structure in the information processing system of the present invention.

A reserve node will be further described with reference to FIG. 31. Entity A, 3011, controls child entities B, C, D . . . , and has one reserve node 3021. Where it is desired to increase the number of child entities that are controlled, a child entity e.g., A', 3012, is set to the reserve node, e.g., 3021. Similarly, child entities F and G to be controlled can be further set to the terminal node of the child entity A', 3012. Also in the child entity A', 3012, at least one of the terminal nodes is set as a reserve node 3022 whereby another child entity e.g., A"3013 can be further set. One, or more, reserve nodes are secured also in the terminal node of the child entity A"3013. This use of reserve nodes allows child entities to be increased endlessly. With respect to the reserve node, not only one terminal node but a plurality of nodes may be set as a reserve node.

In the respective entities, the enabling key block (EKB) is formed in the entity unit, and key renewing and revoke processing are to be executed in the entity unit. As shown in FIG. 31, the enabling key block (EKB) of an individual entity is set to a plurality of entities A, A', A", but these can be collectively controlled, for example, by device makers who controls the entities A, A', A" in common.

Figure 32:
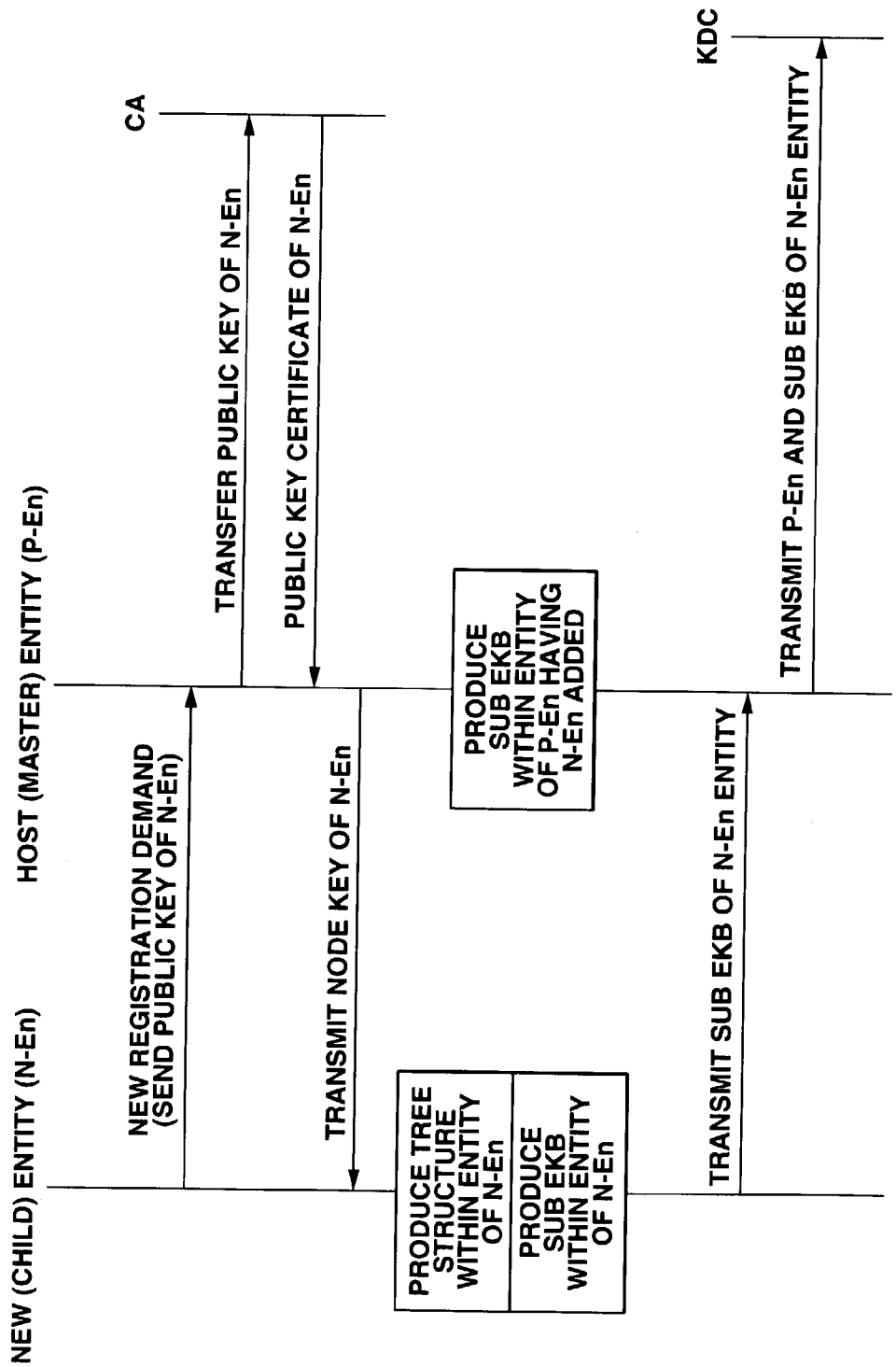
FIG. 32 is a view for use in explaining a new entity registration sequence in the information processing system of the present invention.

Next, the registration process of new entities will be described. FIG. 32 shows a registration processing sequence. A newly added (child) entity(N-En) provides a request for a new registration to a host entity (P-En). Each entity holds a public key in accordance with a public key encryption system, and a new entity sends its own public key to the host entity (P-En) when a registration request is made.

The host entity (P-En), which receives the registration request, transfers the received public key of the new (child) entity to a certificate authority (CA) and receives back a public key certificate for the new (child) entity (N-En) to which a signature of CA is added. These procedures are carried out as a procedure for mutual authentication between the host entity (P-En) and the new (child) entity (N-En).

When the authentication procedure is successfully terminated, the host entity (P-En) transmits a node key (of the new (child) entity (N-En)) to the new (child) entity (N-En). This node key is a node key of the terminal node of the host entity (P-En) which corresponds to a top node of the new (child) entity (N-En), that is, a sub-root key.

When the transmission of the node key is finished, the new (child) entity (N-En) constructs the tree structure of the new (child) entity (N-En), sets a sub-root key of a top node received to a top of the constructed tree, and sets node and leaf keys to produce an enabling key block (EKB) within the entity. The enabling key block (EKB) within one entity is called a sub-EKB.

On the other hand, the host entity (P-En) produces the sub-EKB within the host entity(P-En) to which is added a terminal node to be enabled by the addition of the new (child) entity (N-En).

When the sub-EKB comprises a node key and a leaf key within the new (child) entity (N-En) is produced, the new (child) entity (N-En) transmits it to the host entity (P-En).

The host entity (P-En) which receives the sub-EKB from the new (child) entity (N-En) transmits the received sub-EKB and a renewal sub-EKB of the host entity (P-En) to a key distribute center (KDC).

The key distribute center (KDC) is able to produce various EKBs, that is, an EKB that can be decrypted merely by a specific entity or device on the basis of sub-EKBs of all entities. An EKB to which such a decodable entity or device is set is distributed, for example, to a content provider, who encrypts a content key on the basis of the EKB to distribute it through a network or store it in a recording medium, thus enabling distribution of a content for use by a specific device.

The registration processing with respect to the key distribute center (KDC) of the sub-EKB of the new entity is not limited to a method for sequentially transferring the sub-EKB through the host entity. For example, the processing for registering the sub-EKB in the key distribute center (KDC) can be performed directly from the new registration entity without the intervention of the host entity. The correspondence of the host entity to a newly added child entity will be described with reference to FIG. 33. One terminal node 3201 of the host entity serves as a top node of the newly added child entity, whereby the child entity is added as an entity under the control of the host entity. This control includes the ability to perform remote processing with respect to the child.

Figure 33:
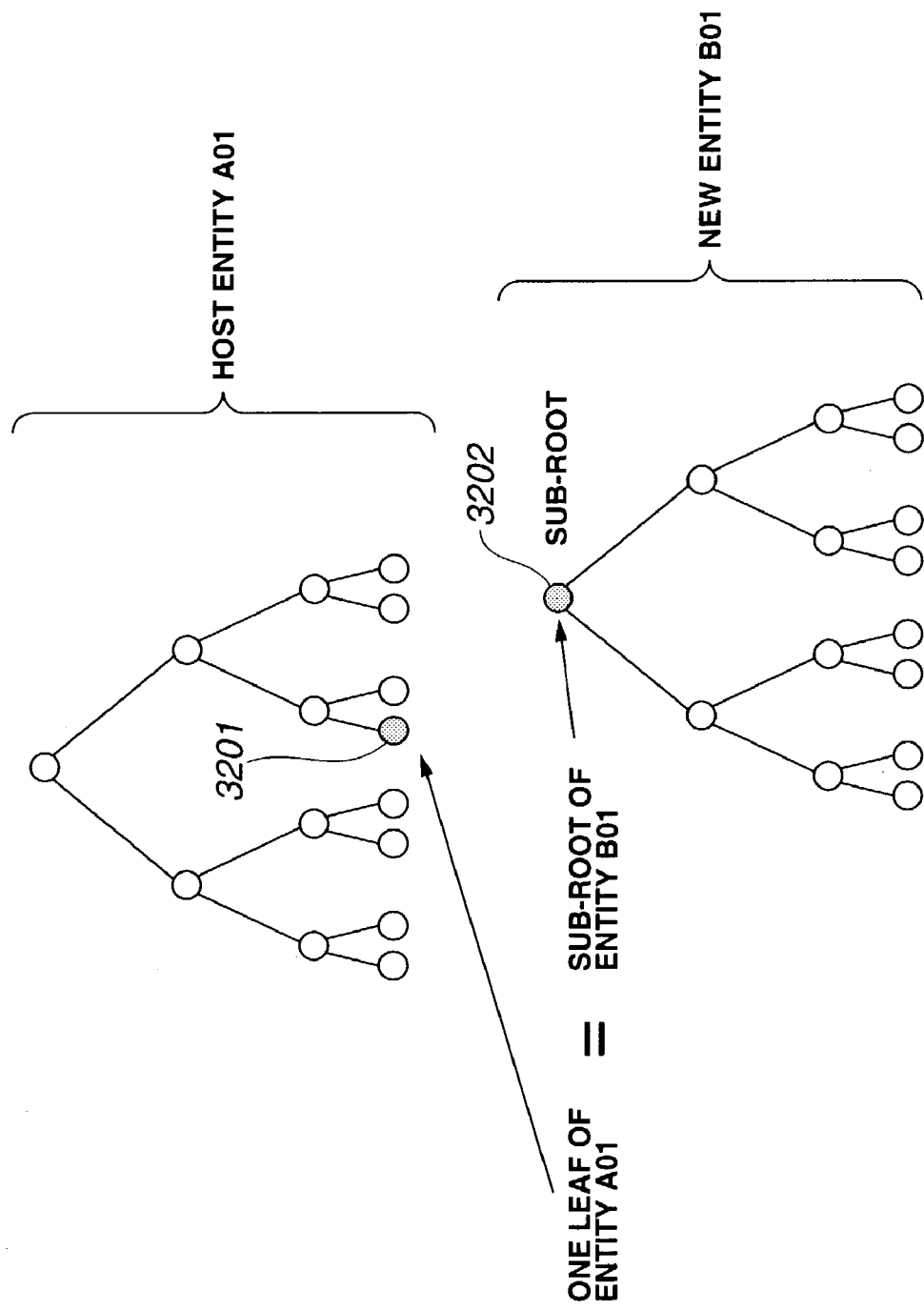
FIG. 33 is a view for use in explaining a relationship between a new entity and a host entity in the information processing system of the present invention.

As shown in FIG. 33, when a new entity is set to the host entity, one node of a terminal node (e.g., node 3201), which is a leaf node of the host entity and a top node (e.g., node 3202) of the newly added entity are set as equal nodes. That is, a terminal node, which is a leaf node of the host node, is set as a sub-root of the newly added entity. By being so set, the newly added entity is enabled under the whole tree structure.

Figure 34:
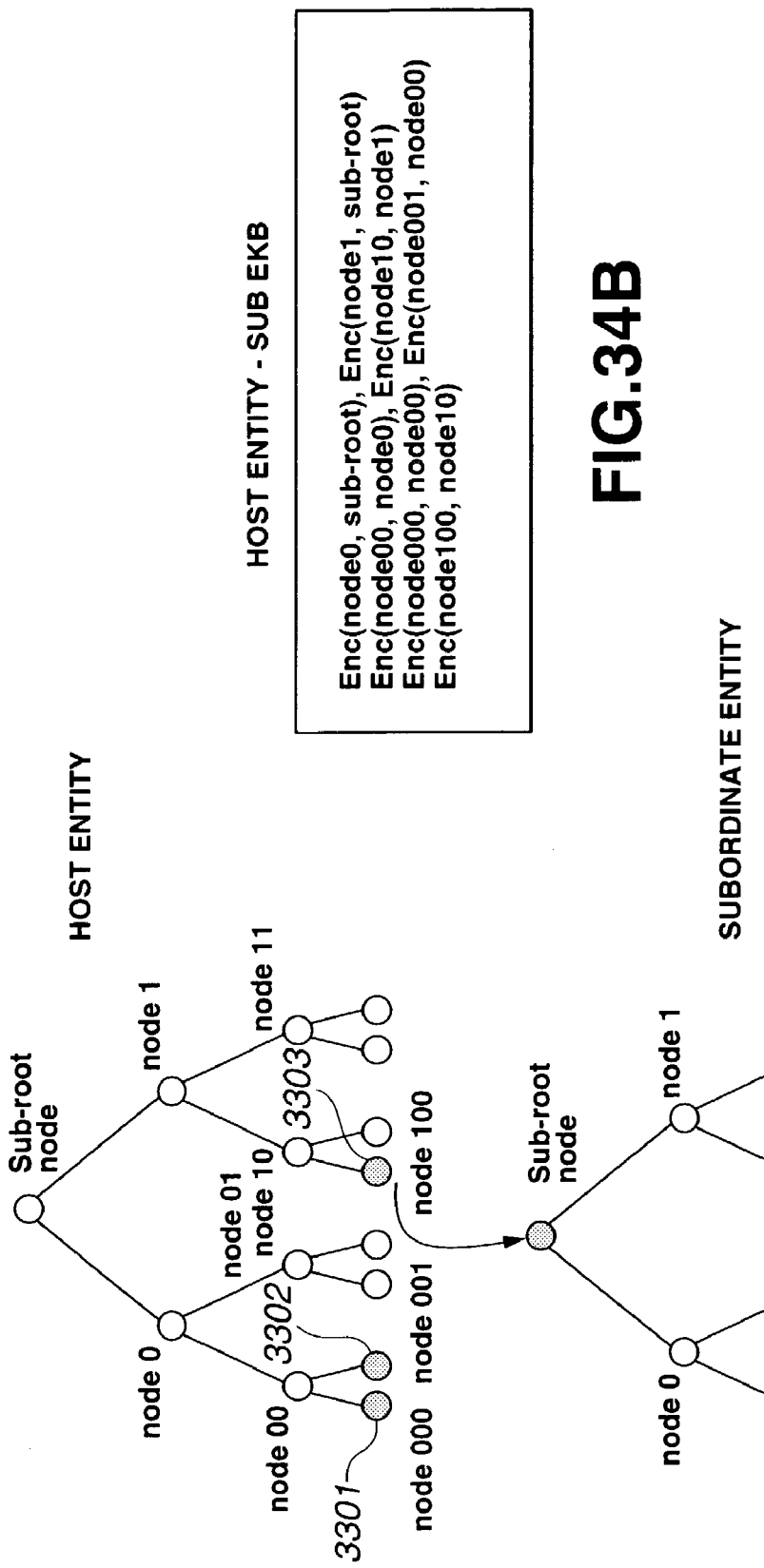
FIGS. 34A and 34B are views for use in explaining a sub-EKB in the information processing system of the present invention.

FIGS. 34A and 34B show examples of a renewal EKB that is produced by the host entity when the newly added entity is set. FIG. 34A shows an example of a sub-EKB produced by the host entity when a new entity is added to terminal node (node 100) 3303 of the host entity. In the arrangement shown in FIG. 34A, the host entity has a terminal node (node 000) 3301 and a terminal node (node 001) 3302.

The sub-EKB has the form as shown in FIG. 34B. The sub-EKB comprises a host node key (encrypted by a terminal node which has been effectively present), a further host node key (encrypted by a host node key), . . . and a sub-root key. Similar to FIG. 34B, each entity has and controls an EKB that is structured to have a host node encrypted by an effective terminal node or leaf key, a further host node key encrypted by a host node key, and a sub-root key.

Next, a description will be made of the revoke processing of a device or an entity in an arrangement in which the key distribution tree structure is controlled as an entity unit. As described earlier with respect to FIGS. 3 and 4, it is possible to revoke a device and distribute an EKB that is only decodable by the valid destination device. The revoke processing described with respect to FIGS. 3 and 4 is the processing for revoking a specific device out of the whole tree. However, entity control makes it possible to execute revoke processing for every entity.

A description will be made hereinafter of revoke processing with respect to entity control with reference to FIGS. 35A to 35D and drawings continuous thereto.

Figure 35:
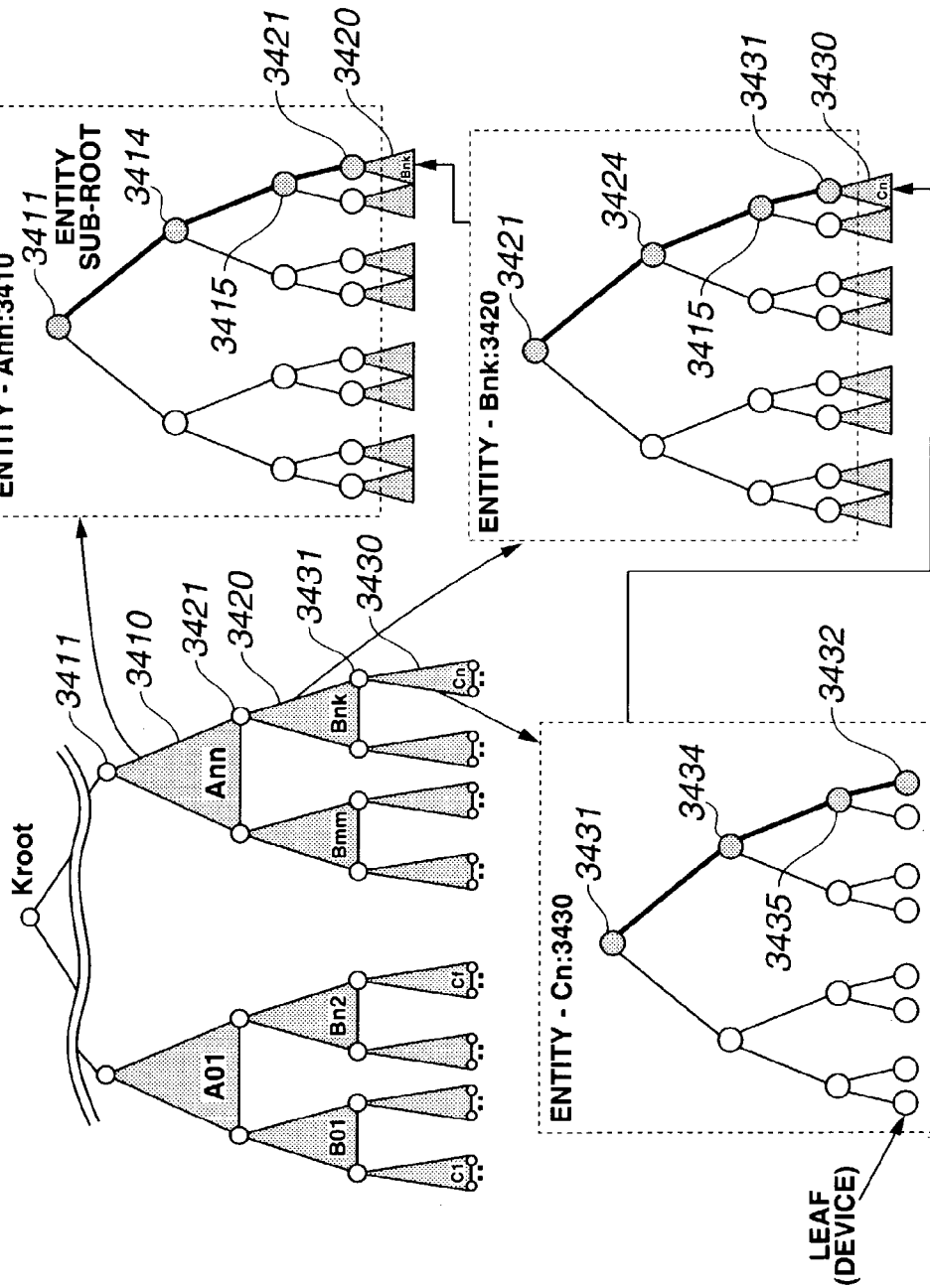
FIGS. 35A to 35D are views for use in explaining device revoke processing in the information processing system of the present invention.

FIG. 35A shows the key distribution tree structure comprising entities. A root node is set to the uppermost part of the tree to which are coupled entities A01 to Ann. Entities B01 to Bnk are below the entities A01 to Ann, and the lowest stage comprises entities C1 to Cn. In the lowest entity, the terminal nodes (leaves) are individual devices, for example, a recording and reproducing unit, a reproducing exclusive-use unit or the like. The revoke processing is independent in each entity. For example, in the entities C1 to Cn, the revoke processing of a device is executed. FIG. 35B shows the tree structure of an entity Cn, 3430, which is one of the entities in the lowest stage. The entity Cn, 3430, has a top node 3431, and leaves (terminal nodes) associated with a plurality of devices.

Assume that a device is to be revoked, for example, a device 3432 of the entity Cn 3430. The latter produces an enabling key block (sub-EKB) having a node key and a leaf key in the independently renewed entity Cn. This enabling key block is a key block comprising an encrypted key that cannot be decrypted in the revoked device 3432. A controller of the entity Cn produces this renewed sub-EKB. The renewed sub-EKB comprises an encrypted key which renews node keys of nodes 3431, 3434, and 3435 on the path from the sub-root to revoked device 3432. As such only a leaf device other than the revoked device 3432 can decrypt the renewal sub-EKB. This processing corresponds to the processing described in association with FIGS. 3 and 4.

The enabling key block (sub-EKB) renewed by the entity Cn, 3430 is transmitted to the host entity. In this case, the host entity is an entity Bnk, 3420, in which terminal node 3431 serves as the top node of the entity Cn, 3430.

The entity Bnk, 3420, receives the enabling key block(sub-EKB) from the child entity Cn, 3430, sets the terminal node 3431 of the entity Bnk, 3420, (corresponding to the top node 3431 of the entity Cnk, 3430 contained in the key block) to a key renewed in the child entity Cn, 3430, and executes the renewal processing of sub-EKB for itself. FIG. 35C shows the tree of entity Bnk, 3420. In the entity Bnk, 3420, a node key to be renewed is a node key on a path from the sub-root 3421 in FIG. 35C to the terminal node 3431, which is associated with the entity containing the revoked device. In this example, node keys of the nodes 3421, 3424, and 3425. These node keys are renewed to produce a new renewal sub-EKB of the entity Bnk, 3420.

Further, the enabling key block (sub-EKB) renewed by the entity Bnk, 3420 is transmitted to the host entity. In this case, the host entity is the entity Ann, 3410, in which terminal node 3421 serves as the top node of the entity Bnk, 3420.

The entity Ann, 3410, receives the enabling key block (sub-EKB) from the child entity Bnk, 3420, sets the terminal node 3421 of the entity Ann, 3410 (corresponding to the top node 3421 of the entity Bnk, 3420 contained in the key block) to a key renewed in the child entity Bnk, 3420, and executes the renewal processing of sub-EKB for itself. FIG. 35D shows the tree of entity Ann, 3410. In the entity Ann, 3410, node keys to be renewed are node keys 3411, 3414, 3415 on a path from the sub-root 3411 in FIG. 35D to the terminal node 3421, which is associated with the entity containing the revoked device. These node keys are renewed to produce a new renewal sub-EKB of the entity Ann, 3410.

These processes sequentially execute in the host entity to the root entity described in association with FIG. 30B. The revoke processing of devices is completed by a series of processes as described. The sub-EKB renewed in the entity is finally transmitted to the key distribute center (KDC) and stored therein. The key distribute center (KDC) produces various EKBs on the basis of the renewal sub-EKB of all entities. The renewal EKB is an encrypted key block that cannot be decrypted by the revoked device.

Figure 36:
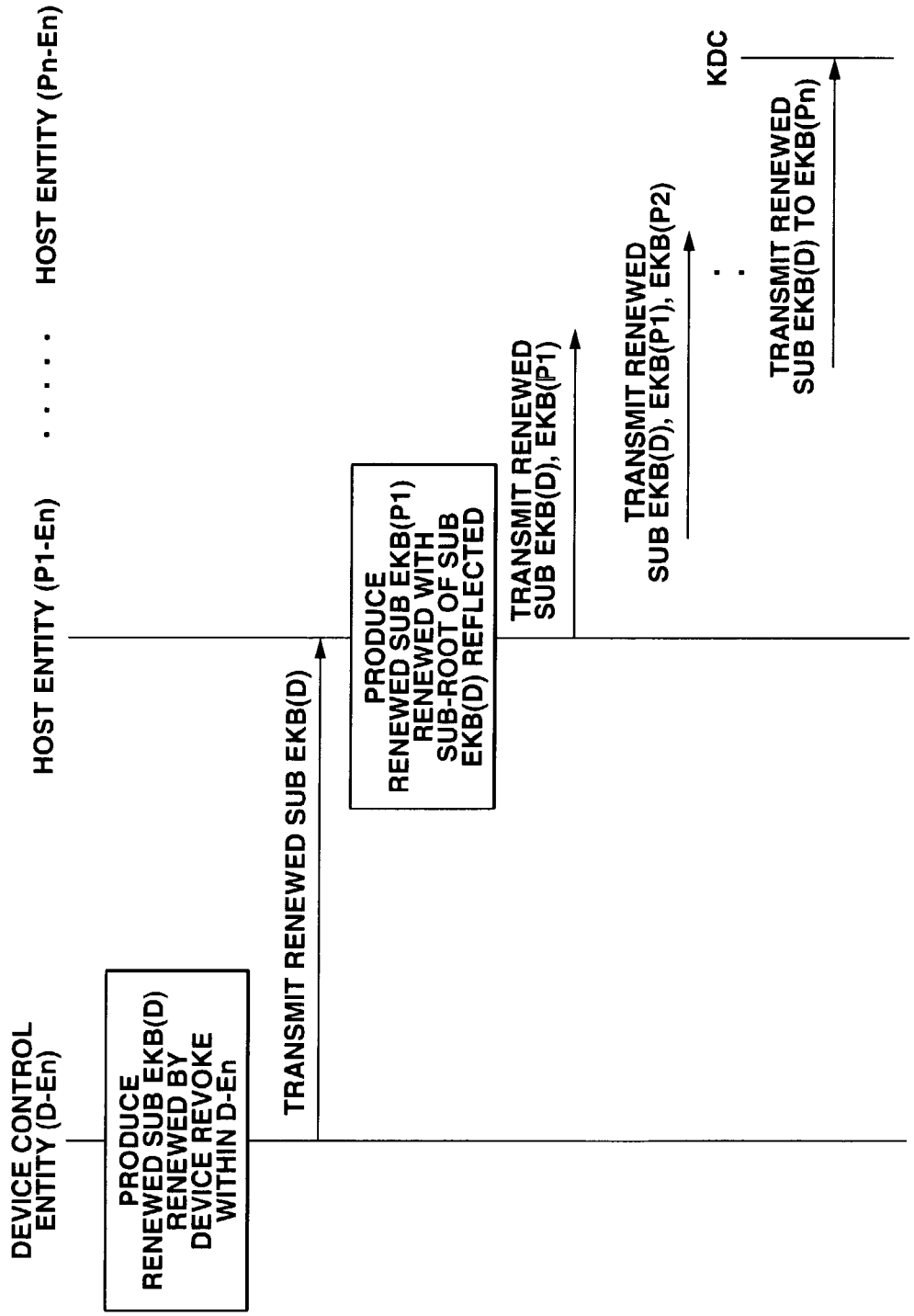
FIG. 36 is another view for use in explaining device revoke processing in the information processing system of the present invention.

FIG. 36 shows a revoked process sequenceFirst, the device control entity (D-En) in the lowest stage of the tree carries out a key renewal necessary for revoking a leaf in the device control entity (D-En) to produce a new sub-EKB of the device control entity (D-En). The sub-EKB is sent to the host entity. The host entity (P1-En), which received the renewal sub-EKB (D), produces a renewal sub-EKB (P1) in which a terminal node key (corresponding to a renewal top node of the renewed sub-EKB (D)) is renewed along with node keys on a pass from the terminal node to the sub-root. These processes are sequentially executed in the host entity, and all sub-EKBs finally renewed are stored and controlled by the key distribute center (KDC).

FIGS. 37A and 37B show an example of an enabling key block (EKB) to be produced as a result of revoking a device.

FIGS. 37A and 37B are views for explaining an example of an EKB produced in the host entity, which received a renewal sub-EKB from a child entity containing a revoked device. In FIG. 37A, a top node of the child entity containing the revoked device corresponds to a terminal node (node 100) 3601 of the host entity.

The host entity renews those node keys that are present in a pass (path) from the sub-root of the host entity to the terminal node (node 100) 3601 to produce a new renewed sub-EKB. The renewed sub-EKB is as shown in FIG. 37B. A renewed key is shown in FIG. 37B with an underline and ['] attached thereto.

Next, revoke processing of entity will be described.

FIG. 38A shows a key distribution tree structure under entity control. A root node is set to the uppermost part of the tree, and entities A01 to Ann have several stages thereunder. In particular, entities B01 to Bnk represent the stage below entities A01 to Ann, and entities C1 to cn represent the stage below entities B01 to Bnk. In the lowest entity, the terminal node (leaf) is an individual device, for example, such as recording and reproducing unit, a reproducing exclusive-use unit or the like.

Now, a description is made of the situation in which the revoke processing is carried out with respect to the entity Cn, 3730. The entity Cn, 3730 has a top node 3731, and a plurality of devices are provided on leaves (terminal nodes), as shown in FIG. 38B.

The revoking of the entity Cn, 3730, provides the ability to revoke all devices belonging to the entity Cn, 3730 from the tree structure. The revoke processing of the entity Cn, 3730 is executed in the entity Bnk, 3720, which is the host entity of the entity Cn, 3730. The entity Bnk, 3720, is an entity in which a terminal node 3731 is a top node of the entity Cn, 3730.

Where revoking of the child entity Cn, 3730 is executed, the entity Bnk, 3720 renews a terminal node 3731 of the entity Bnk, 3720, corresponding to the top node 3731 of the entity Cnk, 3730, and further carries out renewing of node keys on a path from the revoked entity 3730 to the sub-root of the entity Bnk, 3720, to produce a renewed sub-EKB. That is, nodes 3721, 3724, 3725 and 3731 are objects to be renewed. These node keys are renewed to produce a new renewed sub-EKB of the entity Bnk, 3720.

Alternatively, in performing revocation in a child entity, Cn, 3730, the entity Bnk, 3720 does not renew the terminal node 3731 corresponding to the top node of the entity Cnk, 3730, and only renews nodes 3721, 3724, and 3731 to produce a renewal sub-EKB.

Further, the enabling key block (sub-EKB) renewed by the entity Bnk, 3720 is transmitted to the host entity. In this case, the host entity is an entity Ann, 3710, which is an entity having a top node 3721 of the entity Bnk, 3720 as a terminal node.

When an enabling key bock (sub-EKB) is received from the child entity Bnk, 3720, the entity Ann, 3710, sets the terminal node, 3721, of the entity Ann, 3710, (corresponding to the top node 3721 of the entity Bnk, 3720) to a key renewed in the child entity Bnk, 3720 and executes renewal processing of the sub-EKB for itself. FIG. 38D shows the tree structure of the entity Ann, 3710. In the entity Ann, 3710, the node key to be renewed is a node key of each node 3711, 3714, and 3715 constituting a path from the sub-root 3711 to the node 3721 of the entity having transmitted the renewal sub-EKB. These node keys are renewed to produce a new renewal sub-EKB of the entity Ann, 3710.

These processes are sequentially executed in the host entity described with reference to FIG. 30B, above. The revoke processing is completed by a series of processes. The sub-EKB renewed in the respective entity is finally transmitted to the key distribute center (KDC) and stored. The key distribute center (KDC) produces various EKBs on the basis of the renewal sub-EKB of all entities. The renewal EKB is an encrypted key block that cannot be decrypted by the device belonging to the entity revoked.

Figure 39:
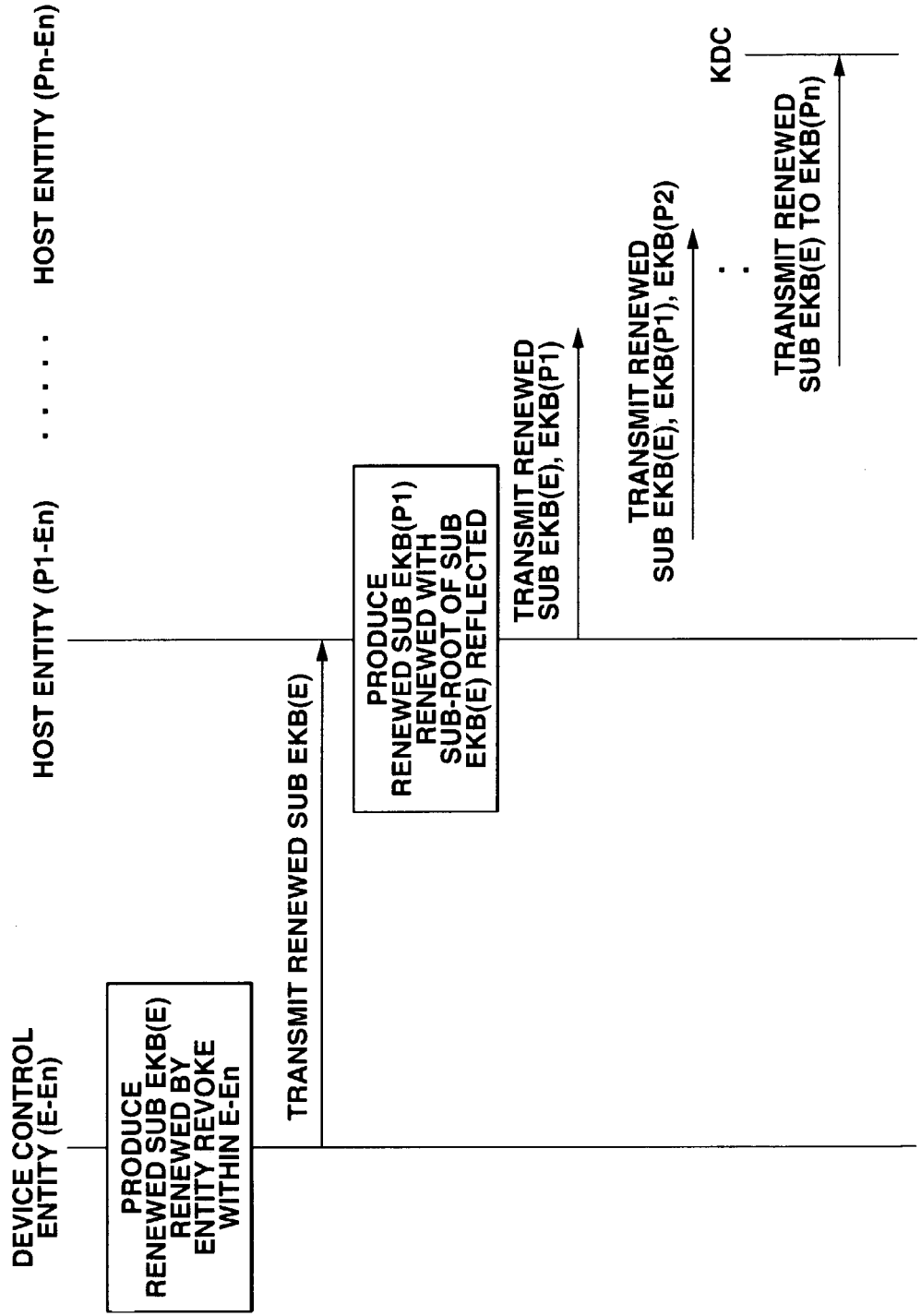
FIG. 39 is another view for use in explaining entity revoke processing in the information processing system of the present invention.

FIG. 39 shows a revoke processing sequence for an entity. First, the entity control entity (E-En) produces a renewed sub-EKB which revokes a terminal node. The renewed sub-EKB is sent to the host entity. The host entity (P1-En), which received the renewed sub-EKB, produces a renewed sub-EKB (P1) in which a terminal node key (corresponding to a renewal top node of the entity (E-En)) is renewed and node keys on a path from the terminal node to the sub-root are also renewed. These processes are sequentially executed in the host entity, and all sub-EKBs finally renewed are stored and controlled by the key distribute center (KDC). The key distribute center (KDC) produces various EKB on the basis of the renewal EKB of all entities. The renewal EKB is an encrypted key block that cannot be decrypted by a device belonging to a revoked entity.

Figure 40:
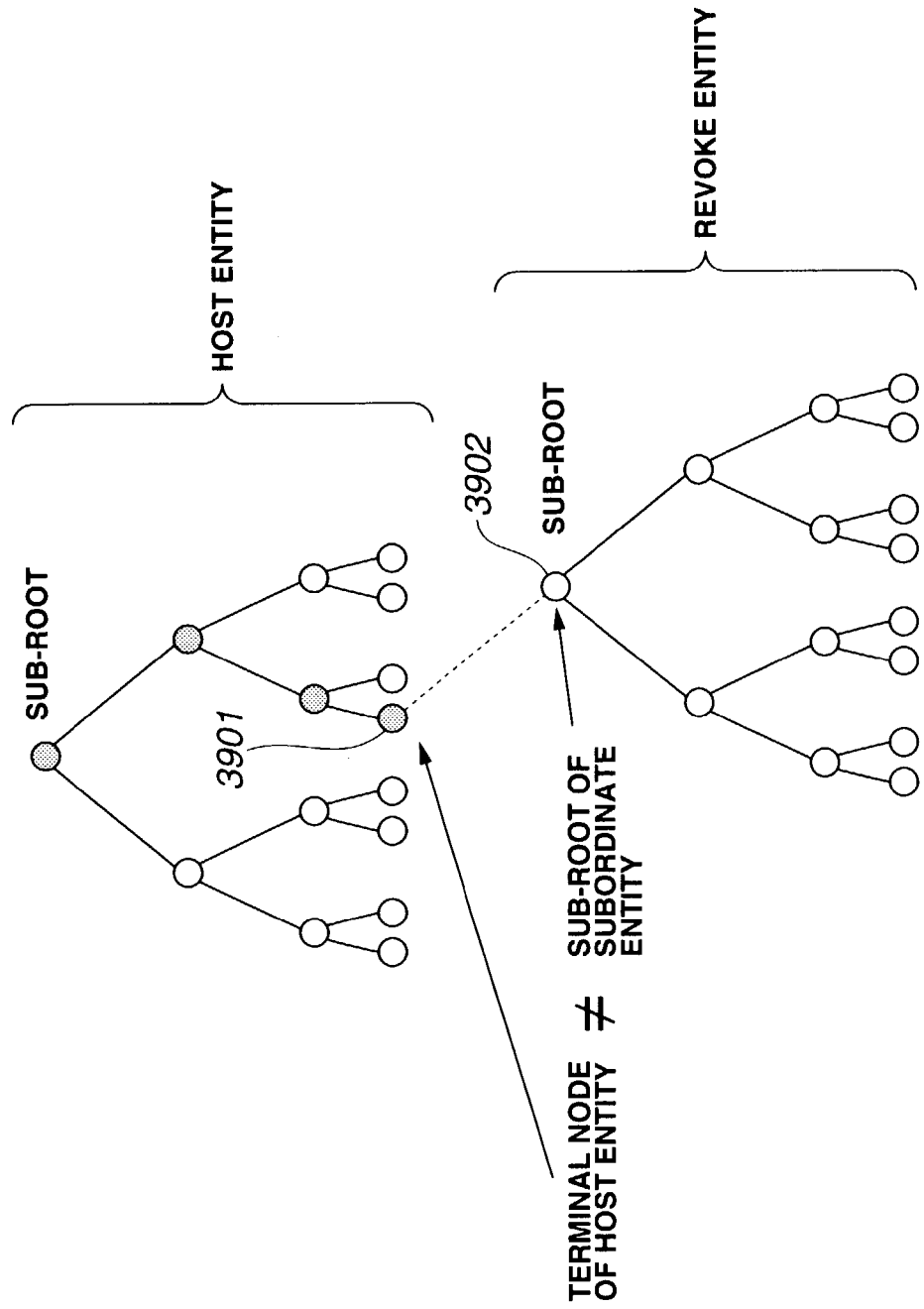
FIG. 40 is a view illustrating a relationship between a revoke entity and a host entity in the information processing system of the present invention.

FIG. 40 is a view illustrating the correspondence of a revoked child entity to the host entity which carried out the revoking process. In performing the revoking process, the host entity renews terminal node 3901 and also renews those node keys that are present in a path from the terminal node 3901 to the sub-root in the tree of the host entity to produce a new sub-EKB. As a result, the node key of the top node 3902 of the revoked child entity does not coincide with the node key of the terminal node 3901 of the host entity. After revoking of the entity, an EKB produced by the key distribute center (KDC) is produced on the basis of the renewed terminal node. Therefore, the device corresponding to the leaf of the child entity not holding the renewal key is disabled from decrypting those subsequent EKBs produced by the key distribute censer (KDC).

While in the foregoing, the revoking process has been described in the context of revoking the entity in the lowest stage, processing for an entity in the middle stage of the tree is also enabled by a similar process. By revoking an entity in the middle stage, a plurality of entities and devices belonging to lower levels of the tree can be collectively revoked.

As described above, the process for revoking an entity is similar to that for revoking a single device.

Next, a description will be made of a processing arrangement in which content distribution is carried out by an entity in accordance with a capability. The term "capability" refers to, for example, a defined data processing ability of a device. For example, whether decrypting of specific compressed voice data is enabled, whether a specific voice reproducing system is enabled, whether specific image processing program can be performed, or whether a device is capable of processing a content or a program.

Figure 41:
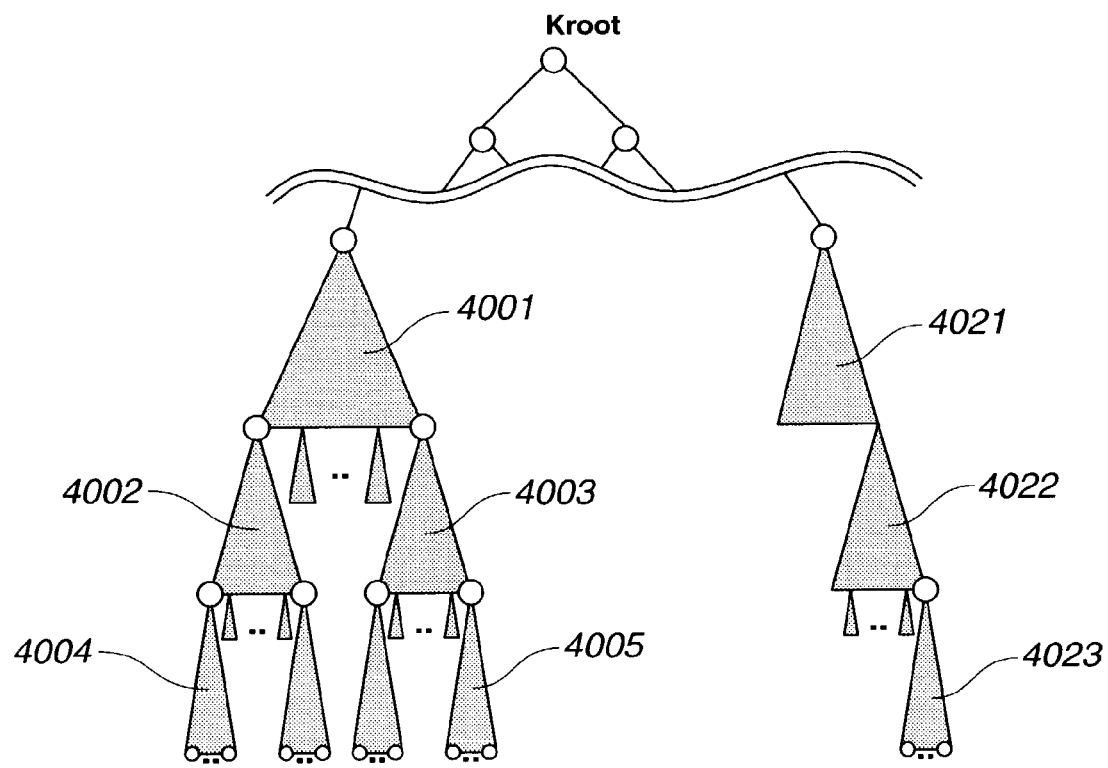
FIG. 41 is a view for use in explaining capability setting in the information processing system of the present invention.

FIG. 41 shows an example of an entity arrangement which has defined capabilities. This is a tree in which a root node is positioned at the uppermost top of the key distribution tree, a plurality of entities are connected to the lower layer, and each node has a 2-branch. Here, for example, an entity 4001 is defined as an entity having the capability to enable either voice reproducing systems A, B or C.

Similarly, entity 4002, entity 4003, entity 4004, and entity 4005 are respectively defined as entities having the capability of using voice reproducing system B or C, voice reproducing system A or B, voice reproducing system B, and voice reproducing system C, respectively.

On the other hand, an entity 4021 is defined as an entity having the capability to enable image reproducing systems p, q and r. An entity 4022 and an entity 4023 are respectively defined as entities having the capability to use image reproducing system p.

The capability information of the entities as described is controlled in the key distribute center (KDC). For example, where a content provider desires to distribute music data compressed by a specific compression program to various devices, an enabling key block (EKB) (decodable with respect to only the device which can reproduce the specific compression program) can be produced on the basis of the capability information of each entity. The content provider distributes a content key encrypted by the enabling key block (EKB), which is produced on the basis of the capability information, and also distributes compressed voice data encrypted by the content key to the devices. As such, it is possible to accurately provide data only to a device capable of processing that data.

Figure 42:
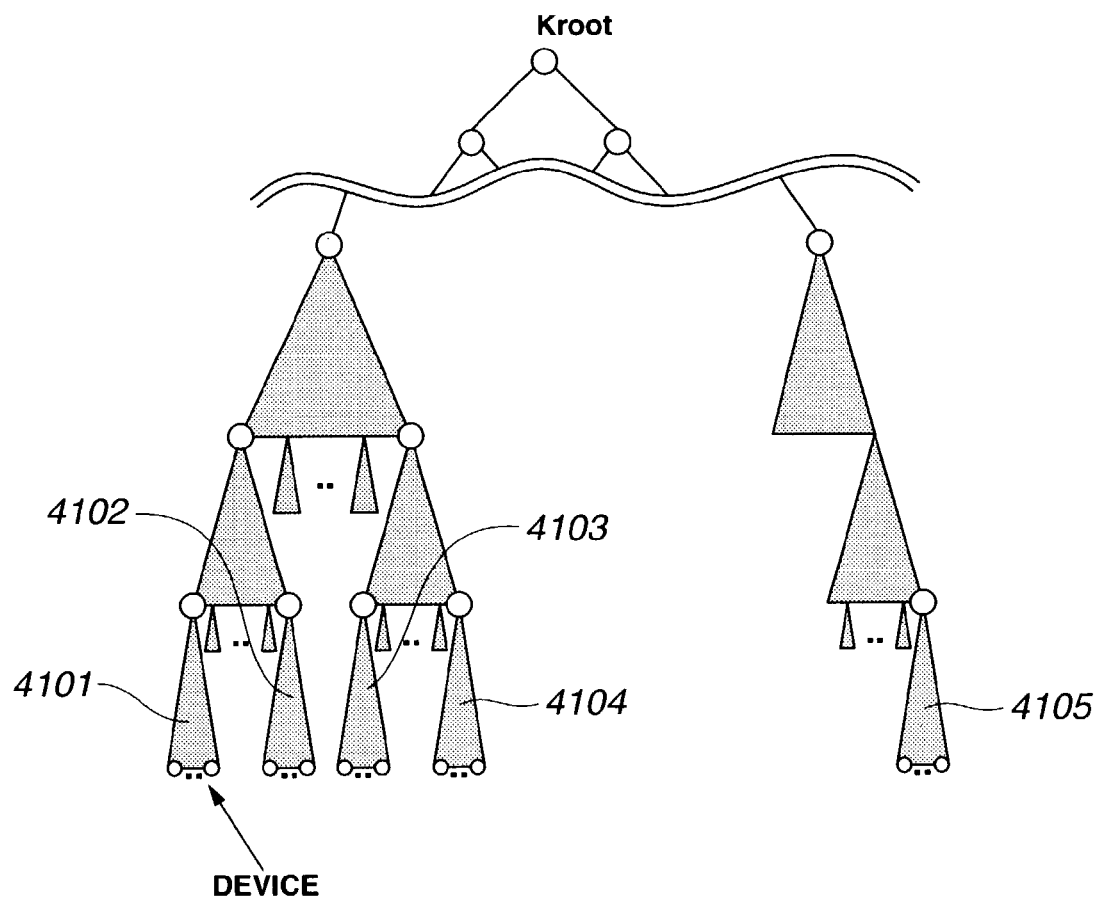
FIG. 42 is another view for use in explaining capability setting in the information processing system of the present invention.

While in FIG. 41, it is noted that it is not necessary to define the capability information with respect to all the entities, but, as shown in FIG. 42, capability may be defined with respect to only the entity in the lowest stage to which the device belongs. The capability of the device belonging to the entity in the lowest stage is controlled in the key distribute center (KDC), and the enabling key block (EKB) is produced on the basis of capability information defined in the entity in the lowest stage. FIG. 42 shows an arrangement in which the capability in entity 4101, is defined at the terminal node for which the device is associated. The capabilities with respect to these entities is controlled in the key distribute center (KDC). For example, to the entity 4101 belong devices capable of processing a system B with respect to voice reproducing and a system r with respect to image reproducing, respectively. To the entity 4102 belong devices capable of processing a system A with respect to voice reproducing and a system q with respect to image reproducing, respectively.

Figure 43:
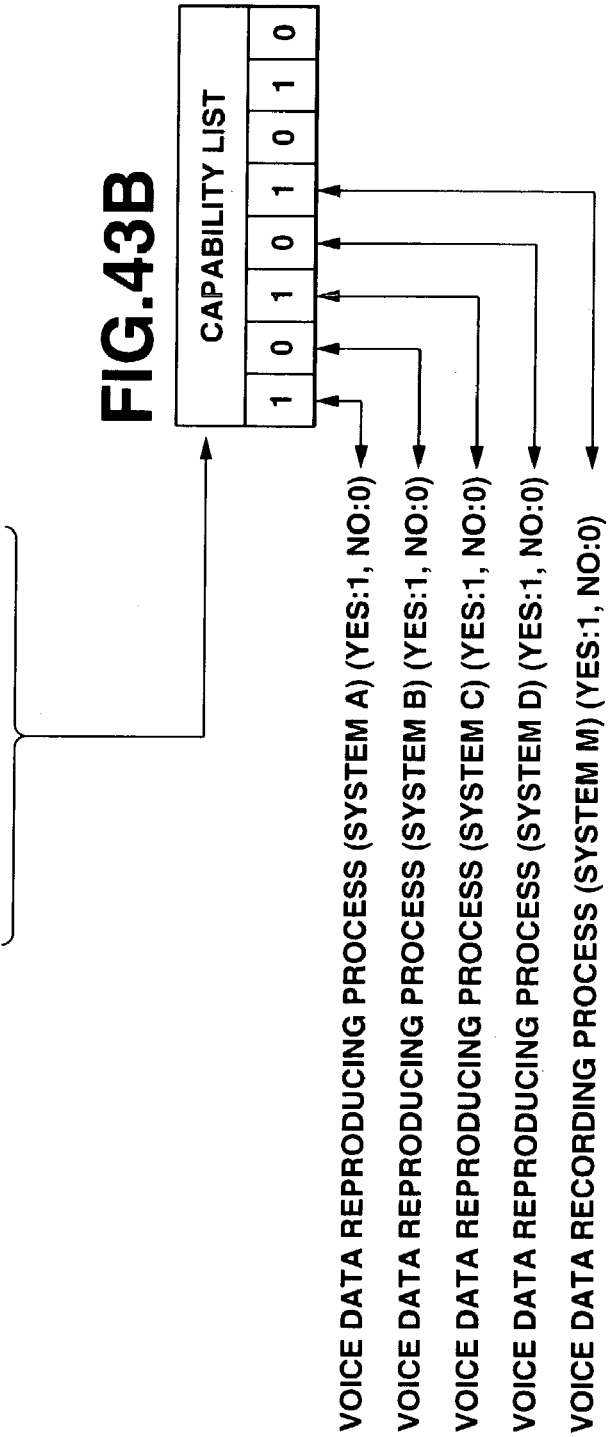
FIGS. 43A and 43B are views illustrating a capability control table for controlling a key issuing center (KDC) in the information processing system of the present invention.

FIGS. 43A and 43B show an example of a capability control table controlled in the key distribute center (KDC). Each row of the capability control table comprises a capability test, an entity ID, an EKB, and sub-root information. In the capability list, for example, if a voice data reproducing processing system (A) can be processed, [1] appears, if not, [0] appears, and if a voice data reproducing processing system (B) can be processed, [1] appears, if not, [0] appears. The method of setting capability is not limited to such a form as described, but other arrangements may be employed.

For each capability test, corresponding entity ID, sub-EKB (which may be stored in a separate data base), and sub-root information is stored.

Figure 44:
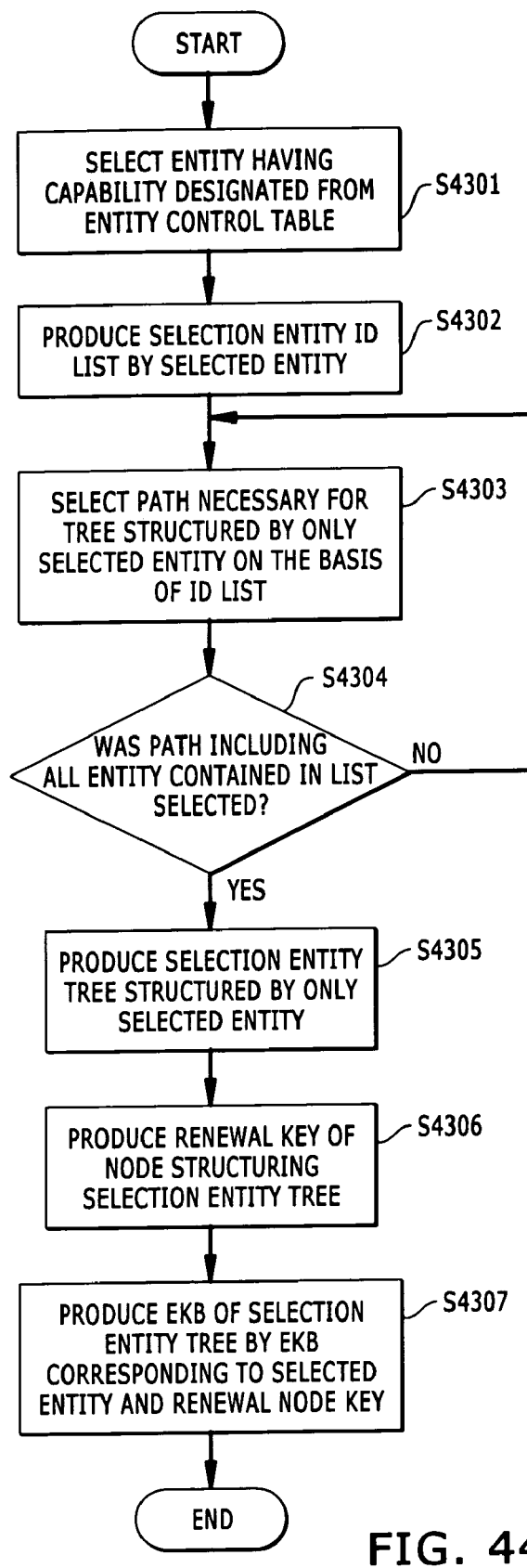
FIG. 44 shown an illustrative EKB producing processing flowchart in the information processing system of the present invention.

In the key distribute center (KDC), EKBs are produced such that only devices capable of reproducing specific content can decode the respective enabling key block (EKB)s. The processing for producing the enabling key block on the basis of capability information will be described with reference to FIG. 44.

First, in Step S4301, the key distribute center (KDC) selects those entities having the designated capability from the capability control table. For example, where a content provider desires to distribute reproducible data on the basis of the voice data reproducing processing system A, an entity, is selected from the capability control table of FIG. 43A in which the corresponding bit on the capability list associated with voice data producing processing system A is set to [1].

Next, in Step S4302, a list of those selected entity IDs is produced. Next, in Step S4303, a path necessary for a tree comprising the selected entity ID is selected. In Step S4304, a check is made to determine if all paths have been selected.

When all path selections are completed, the procedure proceeds to Step S4305 to form a key distribution tree structure for the selected entities.

Next, in Step S4306, renewing of node keys of the tree structure produced in Step S4305 is carried out to produce renewed node keys. Further, the sub-EKB information of the selected entities is taken out of the capability control table, and an enabling key block (EKB) is produced on the basis of the sub-EKB and the renewed node key produced in Step S4306. The enabling key block (EKB) thus produced is utilized only in the device having the specific capability. For example, a content key is encrypted by the enabling key block (EKB), and content compressed on the basis of a specific program in the content key is distributed to the device, whereby the content is utilized only in the specific device selected by the key distribute center (KDC).

As described above, in the key distribute center (KDC), the capability control table is used to select only those devices capable of reproducing the specific content and only those selected devices can decode the enabling key block (EKB). Accordingly, where a new entity is registered, it is necessary to obtain the capability of a newly registered entity. This process will be described with reference to FIG. 45.

FIG. 45 shows a sequence for providing capability notice for a new entity.

The new (child) entity (N-En) added to the tree executes a new registration request with respect to the hose entity (P-En). Each entity holds a public key in accordance with the public key encryption system, and the new entity sends its own public key to the host entity (P-En) when the registration request takes place.

The host entity (P-En) which received the registration request, transfers the received public key of the new (child) entity (N-En) to the certificate authority (CA), and receives therefrom a public key of the new (child) entity (N-En) to which a signature of CA is added. These procedures are carried out as the procedure of mutual authentication between the host entity (P-En) and the new (child) entity (N-En).

When the authentication of the new registration request entity is finished, the host entity (P-Ne) grants the registration of the new (child) entity (N-En) and transmits a node key of the new (child) entity (N-En) to the new (child) entity (N-En). This node key is one node key of the terminal node of the host entity (P-En) and corresponds to a top node of the new (child) entity (N-En), that is, a sub-root key.

When transmission of this node key is finished, the new (child) entity (N-En) constructs the tree of the new (child) entity (N-En), sets the sub-root key to the top of the constructed tree, sets keys of each node and leaf, and produces the enabling key block (sub-EKB) in the entity. On the other hand, the host entity (P-En) also produces the sub-EKB in the host entity (P-En) to which is added a terminal node resulting from the addition of the new (child) entity (N-En).

When the new (child) entity (N-En) produces the sub-EKB, the new (child) entity (N-En) transmits it to the host entity (P-En), and further provides to the host entity capability information in connection with devices controlled by entity (N-En).

The host entity (P-En), which received the sub-EKB and the capability information from the new (child) entity (N-En), transmits the received sub-EKB, the received capability information, and the renewed sub-EKB of the host entity (P-En) to the key distribute center (KDC).

The key distribute center (KDC) registers the received sub-EKB and received capability information of the new entity in the capability control table described with reference to FIGS. 43A and 43B, and renews the capability control table. The key distribute center (KDC) can produce various forms of EKBs, that is, an EKB that can be decrypted only by the entity having a specific capability or device.

The present invention has been described in detail with reference to the specific embodiments. However, it is obvious that those skilled in art may amend or replace the embodiments within the scope not departing from the subject matter of the present invention. That is, the present invention has been disclosed in the form of illustration and should not be interpreted narrowly. For judging the subject matter of the present invention, reference should be made to the claims described herein after.

As described above, according to the information processing system and method according to the present invention, in the production of an enabling key block (EKB) (that can be applied as the encrypting processing key block such as a content key, an authentication key, a content check value producing key, a program data or the like), the hierarchical key distribution tree is reconstructed according to the distribution device, and the enabling key block (EKB) is produced on the basis of the node and leaf contained in a simplified tree. Therefore, a considerable reduction in the size of the enabling key block (EKB) is realized.

Further, according to the information processing system and method according to the present invention, the enabling key block (EKB) is formed on the basis of a simplified tree, and data is contained in a tag as a position discriminator of encrypted key data in the EKB. Therefore, a considerable reduction in data quantity of the EKB is realized, and extraction of encrypted key data using a tag in the device which received the EKB is facilitated to make the EKB decrypting process in the device more effective.

The invention claimed is:

1. A device for use in an information processing system that distributes encrypted message data, the device comprising:
   a receiver for receiving the encrypted message data and an enabling key block (EKB), the EKB including encrypted keys and a tag, the encrypted keys including at least one renewed key and the tag including position discrimination data that associates each of the encrypted keys with nodes and leaves of a hierarchical tree structure;
   a memory for storing a key set, the key set including at least one key corresponding to a node or leaf of the hierarchical tree structure; and
   an encryption processor operable to (a) decrypt the encrypted keys of the received EKB using the stored key set and the position discrimination data of the received EKB to recover the at least one renewed key and (b) decrypt the received encrypted message using the at least one recovered renewed key,
   the encrypted keys of the EKB including keys corresponding to a simplified tree structure, the simplified tree structure being constructed from the hierarchical tree structure by selecting one or more paths between a top node and an end point node or a leaf of the hierarchical tree structure and not including one or more unnecessary nodes being in the selected one or more paths, such that the encrypted keys of the EKB do not include a key corresponding to the one or more unnecessary nodes in the selected one or more paths.

2. The device of claim 1, wherein the at least one renewed key is associated with a predetermined node of the hierarchical tree structure and is encrypted using a key associated with a node or leaf of the hierarchical tree structure which is subordinate to the predetermined node.

3. The device of claim 1, wherein the encrypted keys of the EKB comprise only keys corresponding to a node or leaf of a simplified tree structure, the simplified tree structure being constructed by selecting only paths between a top node and a terminal node or leaf of the hierarchical tree structure, and wherein the position discrimination data of the EKB indicates whether an encrypted key corresponding to a node is included in the EKB.

4. The device of claim 1, wherein the encryption processor is operable to sequentially (a) extract the encrypted keys from the received EKB using the position discrimination data from the tag, (b) decrypt the extracted encrypted keys to obtain the renewed key, and (c) decrypt the received encrypted message using the renewed key.

5. The device of claim 1, wherein the encrypted message data represents a content key that can be used as a decryption key for decrypting encrypted content.

6. The device of claim 1, wherein the encrypted message data represents an authentication key used in an authentication process.

7. The device of claim 1, wherein the encrypted message data represents a key for generating an integrity check value (ICV) of content.

8. The device of claim 1, wherein the encrypted message data represents program code.

9. The device of claim 1, wherein the encrypted keys of the EKB comprise only keys corresponding to a node or leaf of a simplified tree structure, the simplified tree structure being constructed from the hierarchical tree structure by selecting only paths between a top node and a terminal node or leaf of the hierarchical tree structure, and wherein the position discrimination data of the EKB further indicates whether an encrypted key corresponding to a predetermined node is included in the EKB and, if included, the position discrimination data indicates whether that encrypted key is at a left or right node position of the simplified tree structure which is subordinate to the predetermined node.

10. The device of claim 9, wherein the simplified tree structure comprises a sub-root that is a top node of an entity.

11. The device of claim 1, wherein the encrypted keys of the EKB comprise only keys corresponding to a top node and a terminal node of a simplified tree structure, the simplified tree being constructed from the hierarchical tree structure by selecting only paths between the top node and the terminal node of the hierarchical tree structure, and wherein the position discrimination data of the EKB indicates whether an encrypted key corresponding to a node is included in the EKB.

12. The device of claim 11, wherein the simplified tree structure is a tree having not less than three branches connecting the top node with the terminal node.

13. An information processing system, comprising:
   means for receiving encrypted message data and an enabling key block (EKB), the EKB including encrypted keys and a tag, the encrypted keys including at least one renewed key and the tag including position discrimination data that associates each of the encrypted keys with nodes and leaves of a hierarchical tree structure;
   means for storing a key set, the key set including at least one key corresponding to a node or leaf of the hierarchical tree structure; and
   means for decrypting the encrypted keys of the received EKB using the stored key set and the position discrimination data of the received EKB to recover the at least one renewed key and for decrypting the received encrypted message using the at least one recovered renewed key,
   the encrypted keys of the EKB including keys corresponding to a simplified tree structure, the simplified tree structure being constructed from the hierarchical tree structure by selecting one or more paths between a top node and an end point node or a leaf of the hierarchical tree structure and not including one or more unnecessary nodes being in the selected one or more paths, such that the encrypted keys of the EKB do not include a key corresponding to the one or more unnecessary nodes in the selected one or more paths.

14. The information processing system according to claim 13, wherein the at least one renewed key is associated with a predetermined node of the hierarchical tree structure and is encrypted using a key associated with a node or leaf of the hierarchical tree structure which is subordinate to the predetermined node.

15. The information processing system according to claim 13, wherein the encrypted keys of the EKB comprise only keys corresponding to a node or leaf of a simplified tree structure, the simplified tree structure being constructed by selecting only paths between a top node and a terminal node or leaf of the hierarchical tree structure and wherein the position discrimination data of the EKB indicates whether an encrypted key corresponding to a node is included in the EKB.

16. The information processing system according to claim 13, wherein the encrypted keys of the EKB comprise only keys corresponding to a node or leaf of a simplified tree structure, the simplified tree structure being constructed from the hierarchical tree structure by selecting only paths between a top node and a terminal node or leaf of the hierarchical tree structure, and wherein the position discrimination data of the EKB further indicates whether an encrypted key corresponding to a predetermined node is included in the EKB and, if included, the position discrimination data indicates whether that encrypted key is at a left or right node position of the simplified tree structure which is subordinate to the predetermined node.

17. The information processing system according to claim 13, wherein the decrypting means sequentially (a) extracts the encrypted keys from the received EKB using the position discriminates data from the tag, (b) decrypts the extracted encrypted keys to obtain the renewed key, and (c) decrypts the received encrypted message using the renewed key.

18. An information processing method for use in decrypting encrypted message data, the method comprising:

receiving an enabling key block (EKB) including encrypted keys and a tag, the encrypted keys including at least one renewed key and the tag including position discrimination data that associates each of the encrypted keys with nodes and leaves of a hierarchical tree structure;

extracting the encrypted keys from the received EKB in accordance with the positional discrimination data from the tag; and decrypting the extracted encrypted keys to obtain the at least one renewed key, the encrypted keys of the EKB including keys corresponding to a simplified tree structure, the simplified tree structure being constructed from the hierarchical tree structure by selecting one or more paths between a top node and an end point node or a leaf of the hierarchical tree structure and not including one or more unnecessary nodes being in the selected one or more paths, such that the encrypted keys of the EKB do not include a key corresponding to the one or more unnecessary nodes in the selected one or more paths.

19. The information processing method according to claim 18, wherein the decrypting step includes using a stored key set to decrypt the extracted encrypted keys, the stored key set including at least one key corresponding to a node or leaf of the hierarchical tree structure.

20. The information processing method according to claim 18, further comprising decrypting encrypted message data using the at least one obtained renewed key.

21. The information processing method according to claim 20, wherein the encrypted message data represents a content key that can be used as a decryption key for decrypting encrypted content.

22. The information processing method according to claim 20, wherein the encrypted message data represents an authentication key used in an authentication process.

23. The information processing method according to claim 20, wherein the encrypted message data represents a key for generating an integrity check value (Icv) of content.

24. The information processing method according to claim 20, wherein the encrypted message data represents program code.

* * * * *